United States Patent
Tsuji

(10) Patent No.: US 11,274,753 B2
(45) Date of Patent: Mar. 15, 2022

(54) VALVE DEVICE

(71) Applicant: DENSO CORPORATION, Kariya (JP)

(72) Inventor: Ryuki Tsuji, Kariya (JP)

(73) Assignee: DENSO CORPORATION, Kariya (JP)

( * ) Notice: Subject to any disclaimer, the term of this patent is extended or adjusted under 35 U.S.C. 154(b) by 12 days.

(21) Appl. No.: 16/710,315

(22) Filed: Dec. 11, 2019

(65) Prior Publication Data

US 2020/0109787 A1      Apr. 9, 2020

Related U.S. Application Data

(63) Continuation of application No. PCT/JP2018/022769, filed on Jun. 14, 2018.

(30) Foreign Application Priority Data

| Jun. 14, 2017 | (JP) | JP2017-116601 |
| Jul. 3, 2017 | (JP) | JP2017-130360 |
| Jul. 24, 2017 | (JP) | JP2017-142759 |
| Jul. 24, 2017 | (JP) | JP2017-142808 |
| Aug. 30, 2017 | (JP) | JP2017-166230 |
| Dec. 12, 2017 | (JP) | JP2017-237662 |
| Dec. 12, 2017 | (JP) | JP2017-237663 |
| Dec. 22, 2017 | (JP) | JP2017-246016 |

(Continued)

(51) Int. Cl.
*F16K 11/076* (2006.01)
*F01P 7/14* (2006.01)
(Continued)

(52) U.S. Cl.
CPC ............. *F16K 11/076* (2013.01); *F01P 7/14* (2013.01); *F16K 11/10* (2013.01);
(Continued)

(58) Field of Classification Search
CPC .... F16K 11/076; F16K 11/10; F16K 11/0856; F16K 27/00; F16K 27/067; F16K 11/0873; F01P 7/14; F01P 2007/146; F01P 11/04
See application file for complete search history.

(56) References Cited

U.S. PATENT DOCUMENTS

| 2004/0173167 A1 | 9/2004 | Chanfreau et al. |
| 2006/0201455 A1 | 9/2006 | Chanfreau et al. |

(Continued)

FOREIGN PATENT DOCUMENTS

| DE | 102016110318 | 6/2017 |
| EP | 2 295 757 | 3/2011 |

(Continued)

OTHER PUBLICATIONS

U.S. Appl. No. 16/711,799, filed Dec. 12, 2019, Valve Device.

(Continued)

*Primary Examiner* — Michael R Reid
(74) *Attorney, Agent, or Firm* — Nixon & Vanderhye P.C.

(57) ABSTRACT

A housing, a valve, a pipe member, and a pipe fastening member are provided. The pipe fastening member is passed through a pipe-side fastening hole to be screwed into a housing-side fastening hole to fix a pipe-side fixing part to a housing-side fixing part. The housing-side fixing part define a housing gap between the housing-side fixing part and the outer wall of a housing main body.

22 Claims, 55 Drawing Sheets

(30) Foreign Application Priority Data

Feb. 8, 2018 (JP) .............................. JP2018-021003
May 31, 2018 (JP) .............................. JP2018-105523

(51) Int. Cl.
- *F16K 11/10* (2006.01)
- *F16K 11/085* (2006.01)
- *F16K 27/00* (2006.01)

(52) U.S. Cl.
CPC ..... *F01P 2007/146* (2013.01); *F16K 11/0856* (2013.01); *F16K 27/00* (2013.01)

(56) References Cited

U.S. PATENT DOCUMENTS

| | | |
|---|---|---|
| 2012/0012210 A1 | 1/2012 | Yu |
| 2013/0221116 A1 | 8/2013 | Tsuchiya et al. |
| 2015/0075452 A1 | 3/2015 | Oikawa et al. |
| 2015/0122359 A1 | 5/2015 | Tsuchiya et al. |
| 2016/0010536 A1 | 1/2016 | Murakami et al. |
| 2016/0167481 A1 | 6/2016 | Makihara et al. |
| 2016/0281585 A1 | 9/2016 | Muizelaar et al. |
| 2017/0009894 A1 | 1/2017 | Seko et al. |
| 2018/0149073 A1* | 5/2018 | Shen .................. F16K 11/0876 |
| 2018/0230891 A1 | 8/2018 | Sato |
| 2018/0340618 A1 | 11/2018 | Seko et al. |
| 2019/0003370 A1 | 1/2019 | Nomura et al. |
| 2019/0219179 A1 | 7/2019 | Sato |

FOREIGN PATENT DOCUMENTS

| | | |
|---|---|---|
| JP | 10-317967 | 12/1998 |
| JP | 2012-026288 | 2/2012 |
| JP | 2015-59615 | 3/2015 |
| WO | 2018/230499 | 12/2018 |
| WO | 2018/230664 | 12/2018 |
| WO | 2019/021918 | 1/2019 |
| WO | 2019/021920 | 1/2019 |
| WO | 2019/117151 | 6/2019 |
| WO | 2019/117157 | 6/2019 |
| WO | 2019/124385 | 6/2019 |
| WO | 2019/156184 | 8/2019 |

OTHER PUBLICATIONS

U.S. Appl. No. 16/710,315, filed Dec. 11, 2019, Valve Device.
U.S. Appl. No. 16/745,785, filed Jan. 17, 2020, Valve Device and Cooling System.
U.S. Appl. No. 16/711,779 to Kanzaki, entitled "Valve Device", filed Dec. 12, 2019 (148 pages).
U.S. Appl. No. 16/745,785 to Kanzaki, entitled "Valve Device and Cooling System", filed Jan. 17, 2020 (31 pages).

\* cited by examiner

LOWER ←— VERTICAL DIRECTION —→ UPPER

LOWER ←— VERTICAL DIRECTION —→ UPPER

LOWER ←――――――――→ UPPER
VERTICAL DIRECTION

UPPER ↑
VERTICAL
DIRECTION
LOWER ↓

VALVE DEVICE

CROSS REFERENCE TO RELATED APPLICATION

The present application is a continuation application of International Patent Application No. PCT/JP2018/0022769 filed on Jun. 14, 2018, which designated the U.S. and claims the benefit of priority from Japanese Patent Application No. 2018-105523 filed on May 31, 2018. The present application further claims the benefit of priority from Japanese Patent Applications No. 2017-130360 filed on Jul. 3, 2017, No. 2017-142759 filed on Jul. 24, 2017, No. 2017-142808 filed on Jul. 24, 2017, No. 2017-166230 filed on Aug. 30, 2017, No. 2017-237662 filed on Dec. 12, 2017, No. 2017-237663 filed on Dec. 12, 2017, No. 2017-246016 filed on Dec. 22, 2017, No. 2018-21003 filed on Feb. 8, 2018, and No. 2017-116601 filed on Jun. 14, 2017. The entire disclosures of all of the above applications are incorporated herein by reference.

TECHNICAL FIELD

The present disclosure relates to a valve device.

BACKGROUND

Conventionally, a valve device having a rotating valve body is known.

SUMMARY

<1-1>

According to one aspect of the present disclosure, a valve device is configured to control cooling water in a heating element of a vehicle. The valve device includes a housing, a valve, a pipe member, and a pipe fastening member.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
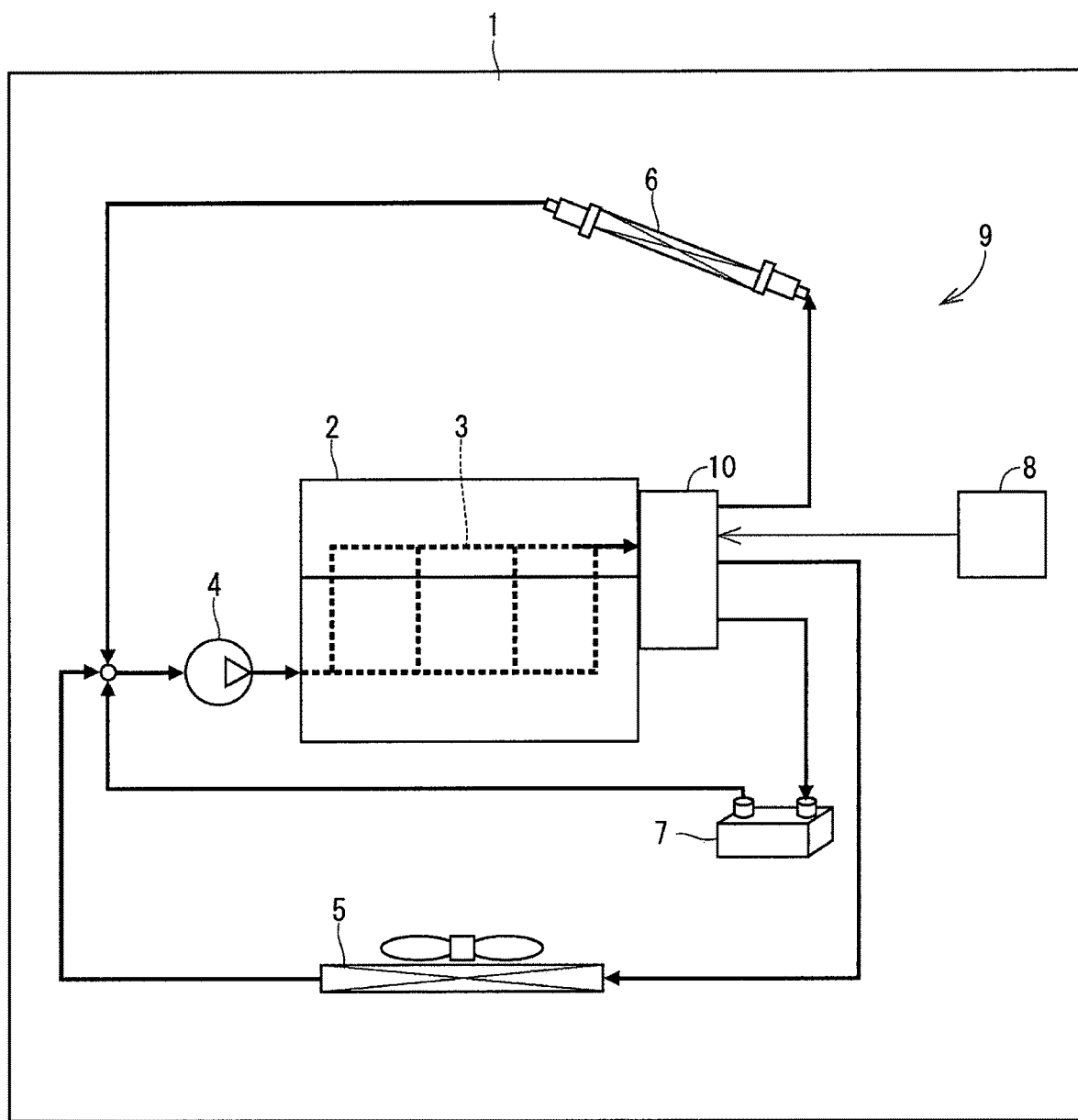
FIG. 1 is a schematic diagram showing a cooling system to which a valve device of a first embodiment is applied.

To begin with, one assumable example of the present disclosure will be described below. According to this assumable example, a valve device includes a pipe member defining a flow path is fixed to a housing. In the pipe member, a fixing part is fixed to the housing with a fastening member. Note that in the assumable example, when the pipe member is fastened to the housing with the fastening member, a crack may occur on the housing side. In this case, cooling water may be leaked from the crack of the housing.

Another example of the present disclosure will be described hereinafter. A valve device configured to control cooling water in a heating element of a vehicle includes a housing, a valve, a pipe member, and a pipe fastening member. The pipe fastening member is passed through a pipe-side fastening hole, and is screwed into a housing-side fastening hole, thereby to fix a pipe-side fixing part to a housing-side fixing part. The housing-side fixing part defines a gap between the housing-side fixing part and an outer wall of a housing main body. Accordingly, when the pipe member is fastened to the housing with the fastening member, even though a crack arises in the housing-side fixing part, the configuration enables to suppress the crack from extending to the housing main body. This configuration enables to suppress leakage of the cooling water caused by fastening of the pipe member to the housing.

Hereinbelow, a valve device according to multiple embodiments will be described based on the drawings. Note that in the multiple embodiments, substantially the same constituent parts will have the same reference numerals, and explanations of the parts will be omitted. Further, in the multiple embodiments, substantially the same constituent parts have the same or similar operational advantages.

First Embodiment

FIG. 1 shows a valve device and a cooling system according to a first embodiment. A valve device 10 is applied to a cooling system 9 in a vehicle 1. An internal combustion engine (hereinbelow, referred to as "engine") 2 as a heating element, the cooling system 9, a heater 6, a device 7, and the like, are mounted in the vehicle 1.

<Cooling System>

The cooling system 9 is provided with the valve device 10, a water pump 4, a radiator 5, an electronic control unit (hereinbelow, referred to as "ECU") 8, and the like. The water pump 4 pumps cooling water toward a water jacket 3 of the engine 2. The valve device 10 is provided at e.g. an exit of the water jacket 3, and controls the flow rate of the cooling water to be fed to the radiator 5, the heater 6, and the device 7.

The radiator 5 is a heat exchanger which performs heat exchange between the cooling water and air, to lower the temperature of the cooling water. The heater 6 and the device 7 are provided between the valve device 10 and the water pump 4. Note that the device 7 includes e.g. an oil cooler, an EGR cooler, an ATF (Automatic Transmission Fluid) cooler, and the like.

When the cooling water is fed through the heater 6, heat exchange is performed between the air in the vehicle 1 and the cooling water. When the cooling water is fed through the device 7, heat exchange is performed between the fluid (oil, EGR gas, and the like) flowing through the device 7 and the cooling water. The ECU 8 is configured to control the operation of the valve device 10, and controlling the flow rate of the cooling water to be fed to the radiator 5, the heater 6, and the device 7.

<Valve Device>

Figure 3:
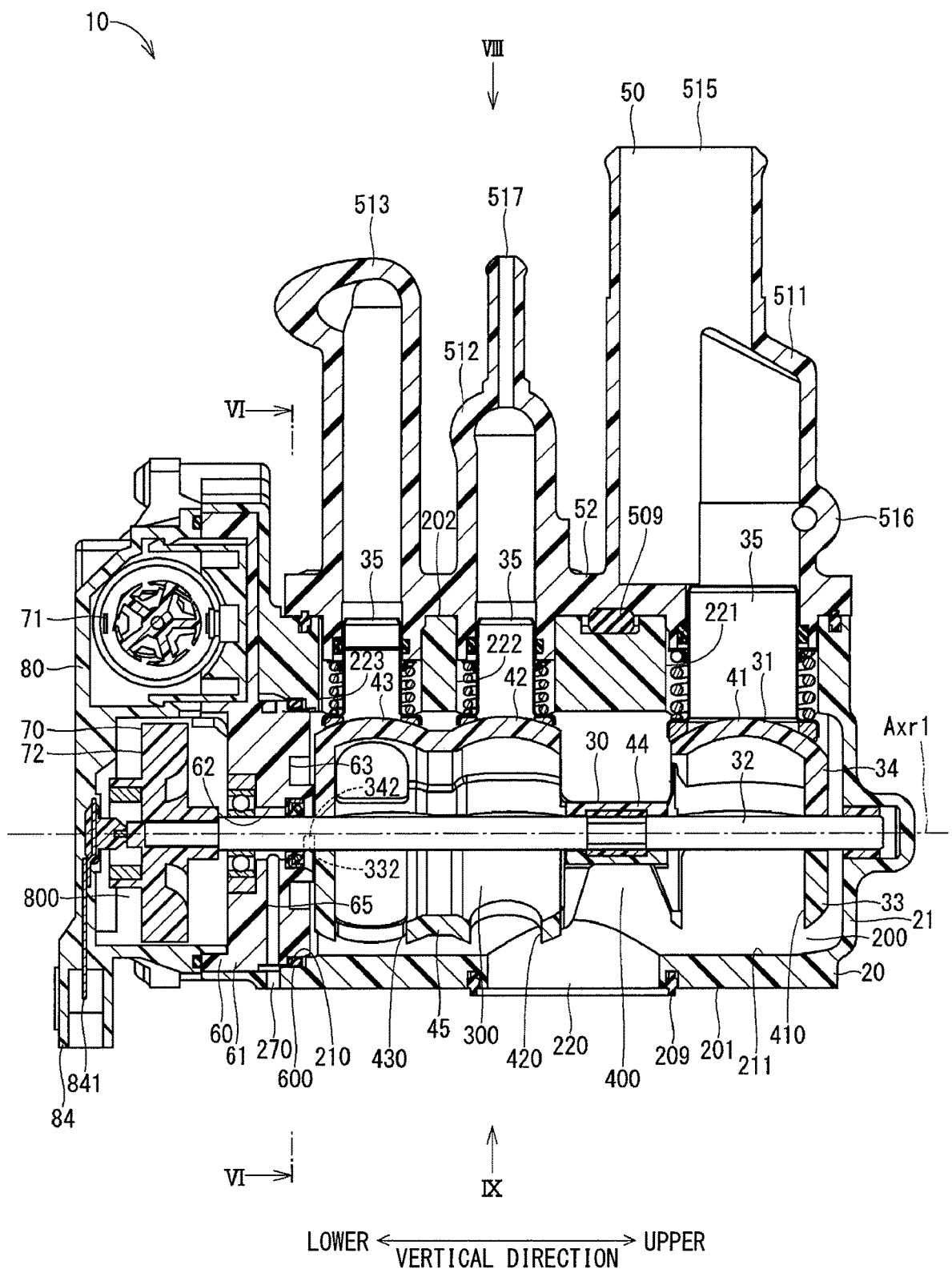
FIG. 3 is a cross-sectional view showing the valve device of the first embodiment.

As shown in FIG. 3, the valve device 10 is provided with a housing 20, a valve 30, a seal unit 35, a pipe member 50, a partition part 60, a driving part 70, a driving part cover 80, and the like.

The housing 20 has a housing main body 21, and the like. The housing main body 21 is formed of e.g. resin, and inner space 200 is formed inside the housing main body. A planar mounting surface 201 is formed on an outer wall of the housing main body 21. A planar pipe mounting surface 202 is formed on an outer wall of the housing main body 21 opposite to the mounting surface 201. Note that the mounting surface 201 is formed to be approximately parallel to the pipe mounting surface 202.

A housing opening 210 connecting the inner space 200 to the outside of the housing main body 21 is formed in the housing main body 21. Further, the housing main body 21 has a cylindrical housing inner wall 211, one end of which is connected to the housing opening 210, and which forms the inner space 200. Note that the housing inner wall 211 is formed to have an axis approximately parallel to the mounting surface 201 and the pipe mounting surface 202.

The housing 20 has an inlet port 220 which is opened in the mounting surface 201, and which connects the inner space 200 to the outside of the housing main body 21. The opening of the inlet port 220 in the mounting surface 201 has a round shape. Note that the inlet port 220 corresponds to a "port" and a "first port". The housing 20 has outlet ports 221, 222, and 223 which are opened in the pipe mounting surface 202, and which connect the inner space 200 to the outside of the housing main body 21. Note that the outlet ports 221, 222, and 223 correspond to the "port" and a "second port".

Figure 8:
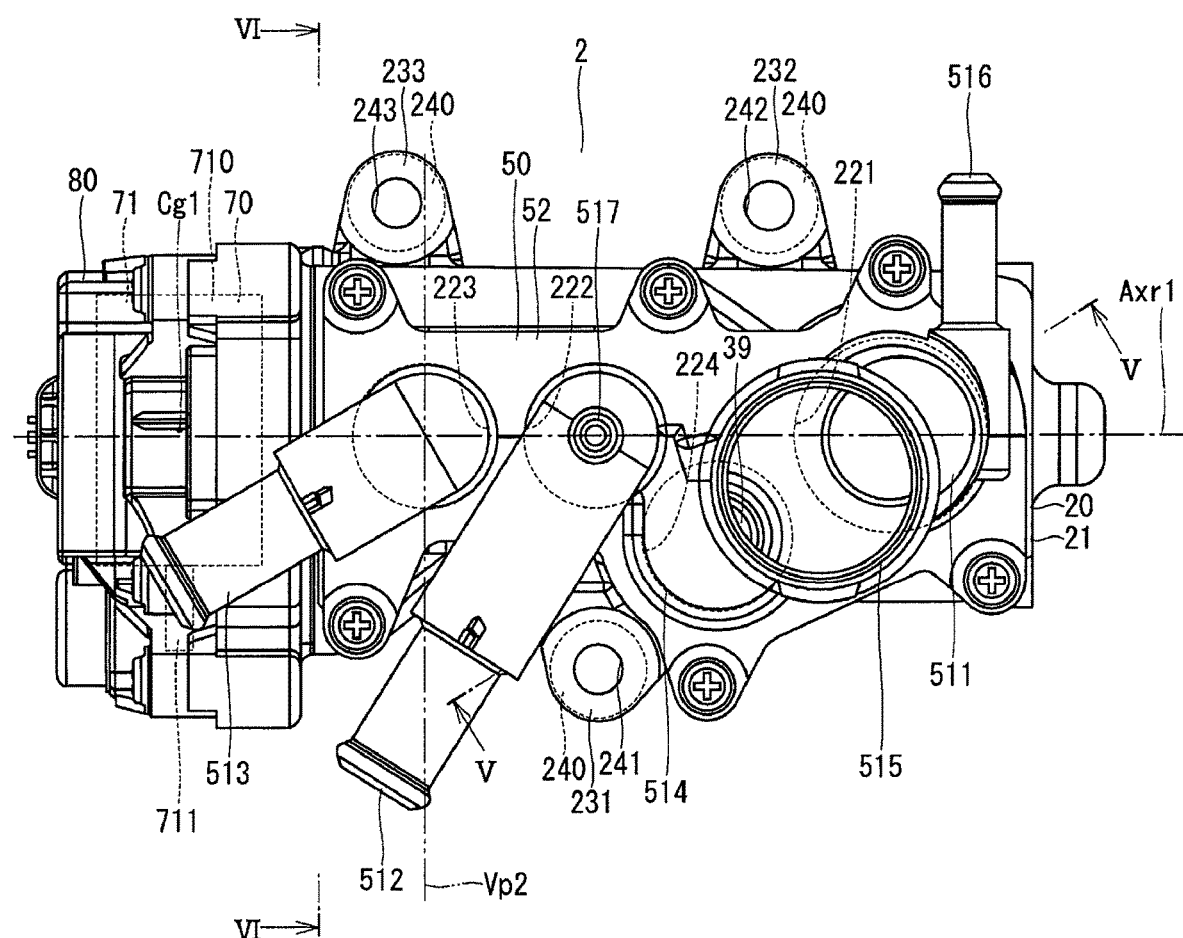
FIG. 8 is a diagram of FIG. 3 viewed along an arrow VIII direction.

As shown in FIG. 8, the housing 20 has a relief port 224 which is opened in the pipe mounting surface 202, and which connects the inner space 200 to the outside of the housing main body 21.

The outlet ports 221, 222, and 223 are formed to be arrayed, in this order, from the end of the housing main body 21 opposite to the housing opening 210 toward the housing opening 210 side. The inner diameter of the outlet port 221 is larger than the inner diameter of the outlet ports 222 and 223.

The valve 30 has a valve body 31, a shaft 32, and the like. The valve body 31 is formed of e.g. resin. The valve body 31 is provided rotatably about a rotational axis Axr1 in the inner space 200. Note that the rotational axis Axr1 is set to be approximately parallel to the axis of the housing inner wall 211. The valve body 31 has a first split body 33 and a second split body 34 divided into two in a virtual plane Vp1 including the rotational axis Axr1. The first split body 33 and the second split body 34 are bonded in respective bonding surfaces (see FIG. 6).

The valve body 31 has ball valves 41, 42, and 43, a cylindrical connection part 44, and a cylindrical valve connection part 45. Note that the ball valves 41, 42, and 43 respectively correspond to a "first ball valve", a "second ball valve", and a "third ball valve". Further, the cylindrical valve connection part 45 corresponds to a "cylindrical part". The ball valves 41, 42, and 43 are respectively formed in an approximately spherical shape, and a valve body flow path 300 is formed inside the ball valves. The outer peripheral wall of the ball valves 41, 42, and 43 is formed in a spherical shape convex toward radially outside of the rotational axis Axr1. The inner peripheral wall of the ball valves 41, 42, and 43 is formed in a spherical shape dented toward radially outside of the rotational axis Axr1.

The cylindrical connection part 44 is formed in a cylindrical shape so as to connect the ball valve 41 and the ball valve 42. The cylindrical valve connection part 45 is formed in a cylindrical shape so as to connect the ball valve 42 and the ball valve 43. Note that the valve body flow path 300 is formed inside the cylindrical valve connection part 45. The ball valve 41, the cylindrical connection part 44, the ball valve 42, the cylindrical valve connection part 45, and the ball valve 43, in this order, are integrally formed with each other.

Valve body openings 410, 420, and 430 to connect the valve body flow path 300 to the outside of the valve body 31 are formed respectively in the ball valves 41, 42, and 43. Space between valves 400 is formed between the ball valve 41 and the ball valve 42 on the radially outside of the cylindrical connection part 44. The space between valves 400 communicates with the respective valve body flow paths 300 of the ball valves 41 and 42.

The valve body 31 is provided in the inner space 200 such that the valve body opening 410 corresponds to the position of the outlet port 221, the space between valves 400 corresponds to the position of the inlet port 220, the valve body opening 420 corresponds to the positions of the outlet port 222 and the inlet port 220, and the valve body opening 430 corresponds to the position of the outlet port 223, in the direction of the rotational axis Axr1.

The shaft 32 is formed of e.g. metal in a bar shape, and is provided on the rotational axis Axr1. Note that the shaft 32 is provided integrally with the valve body 31. The shaft 32 is capable of rotating about the rotational axis Axr1 together with the valve body 31.

The pipe member 50 is formed of e.g. resin. As shown in FIG. 3 and FIG. 8, the pipe member 50 has pipes 511 to 517, a pipe connection part 52, and the like. The pipes 511 to 517 are respectively formed in a cylindrical shape. The pipe 511 is provided such that one end is positioned inside the outlet port 221. The pipe 512 is provided such that one end is positioned inside the outlet port 222. The pipe 513 is provided such that one end is positioned inside the outlet port 223. The pipe 514 is provided such that one end corresponds to the position of the relief port 224.

The pipe 515 is provided such that one end is connected to the pipe 511 and the pipe 514. The pipe 516 is provided such that one end is connected to the pipe 511. The pipe 517 is provided such that one end is connected to the pipe 512.

The pipe connection part 52 is formed so as to connect the one end side of the pipes 511 to 515. The pipe member 50 is fixed to the housing main body 21 such that the pipe connection part 52 abuts on the pipe mounting surface 202. A gasket 509 configured to seal fluid-tightly between the pipe member 50 and the housing main body 21 is provided between the pipe connection part 52 and the pipe mounting surface 202.

The other ends of the pipes 511, 514, and 515 are connected via a hose or the like to the radiator 5. The other end of the pipe 512 is connected via a hose or the like to the heater 6. The other end of the pipe 513 is connected via a hose or the like to the device 7. The other end of the pipe 516 is connected via a hose or the like to an unshown reservoir tank. The other end of the pipe 517 is connected via a hose or the like to an unshown throttle.

Figure 4:
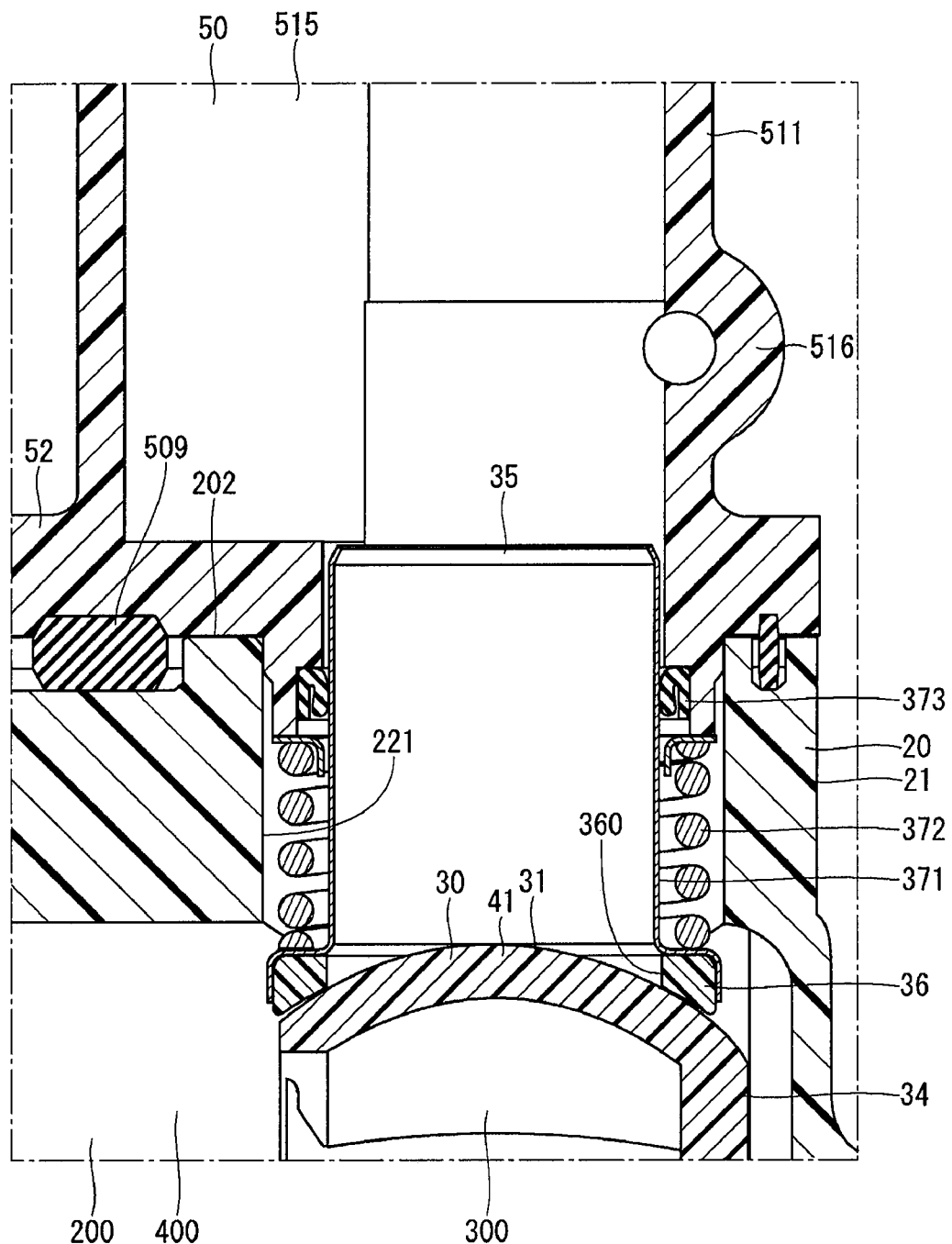
FIG. 4 is a cross-sectional view showing a vicinity of a seal unit in the valve device of the first embodiment.

The seal unit 35 is provided respectively in the outlet ports 221, 222, and 223. As shown in FIG. 4, the seal unit 35 has a valve seal 36, a sleeve 371, a spring 372, and a seal member 373. The valve seal 36 is formed of e.g. resin in an approximately ring shape, and has a seal opening 360 inside. The valve seal 36 is provided such that one surface abuts on the outer peripheral wall of the valve body 31, and is configured to seal fluid-tightly between the valve seal and the outer peripheral wall of the valve body 31.

The sleeve 371 is formed of e.g. metal in a cylindrical shape, and holds the valve seal 36 at one end. The other end of the sleeve 371 is positioned inside of one end of the pipe 511. The spring 372 is provided between the one end of the sleeve 371 and the one end of the pipe 511, and pushes, together with the sleeve 371, the valve seal 36 to the valve body 31 side. The seal member 373 is formed of e.g. rubber in a ring shape. The seal member 373 is provided between the one end of the pipe 511 and the outer peripheral wall of the sleeve 371, and is configured to seal fluid-tightly between the pipe 511 and the sleeve 371.

The seal unit 35 provided at the outlet ports 222 and 223 also has a similar configuration to that of the seal unit 35 provided at the outlet port 221, accordingly, explanation of the seal unit will be omitted. The three seal units 35 are respectively assembled to the one ends of the pipes 511, 512, and 513.

The partition part 60 is formed of e.g. resin. The partition part 60 is formed separately from the housing main body 21. The partition part 60 has a partition part main body 61, and the like. The partition part main body 61 is formed in an approximately disc shape. The partition part 60 is provided in the housing main body 21 such that the partition part main body 61 covers the housing opening 210. The partition part 60 has a shaft insertion hole 62 formed through the center of the partition part main body 61 in a plate thickness direction. The valve 30 is provided such that one end of the shaft 32 is inserted through the shaft insertion hole 62. In the shaft 32, one end is bearing-supported with the partition part main body 61, and the other end is bearing-supported with the housing main body 21.

The driving part cover 80 is provided on the opposite side to the inner space 200 with respect to the partition part 60. The driving part cover 80 forms driving part space 800 between the driving part cover 80 and the partition part 60.

The driving part 70 is provided in the driving part space 800, and is capable of rotate-driving the valve body 31 via one end of the shaft 32. The driving part 70 has a motor 71, a gear part 72, and the like. The gear part 72 is connected to one end of the shaft 32. When the ECU 8 controls supply power to the motor 71, the driving force of the motor 71 is transmitted via the gear part 72 to the shaft 32. With this configuration, the valve body 31 is rotate-driven.

Figure 5:
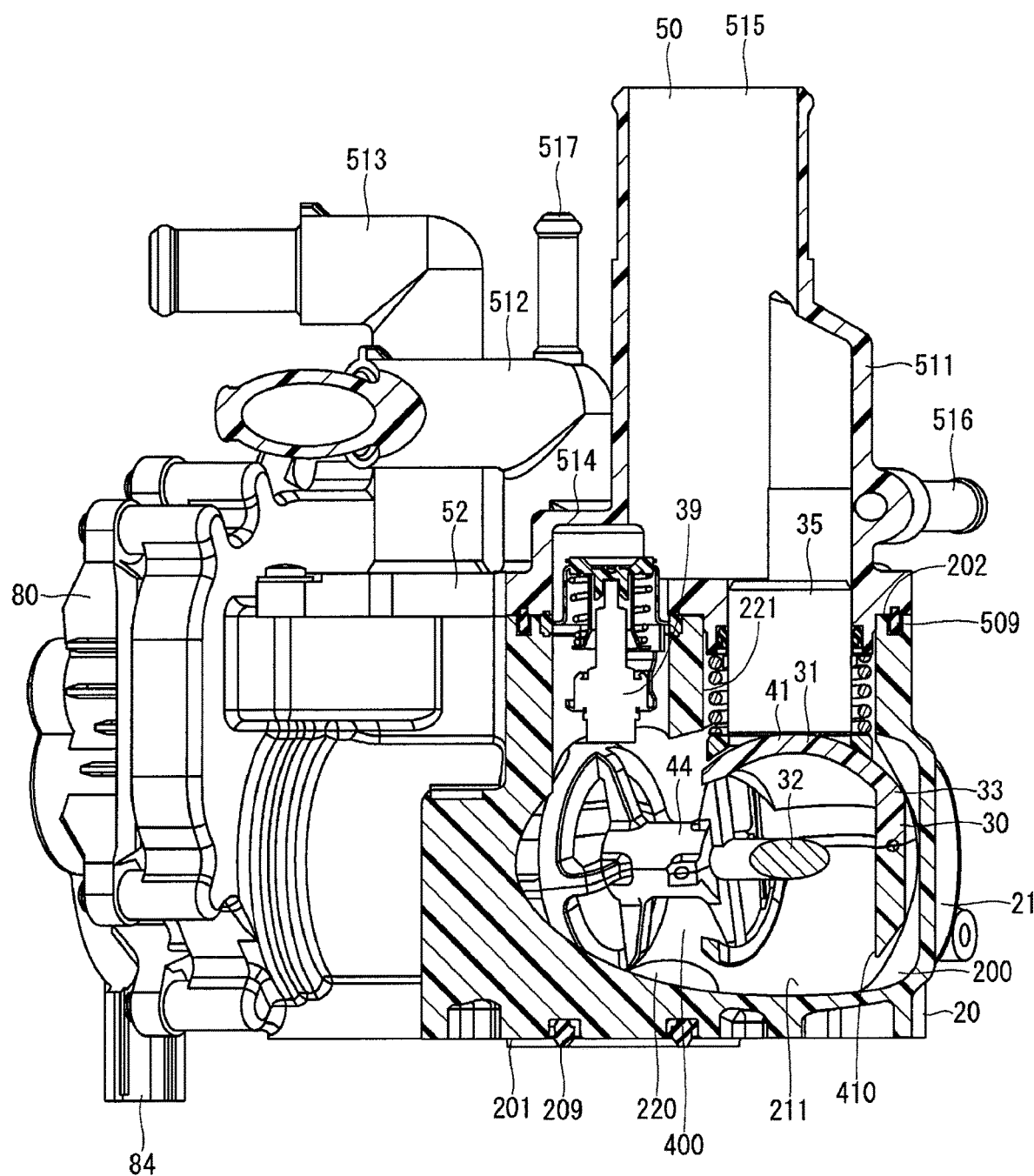
FIG. 5 is a cross-sectional perspective view showing the valve device of the first embodiment.

As shown in FIG. 5. the relief port 224 is provided with a relief valve 39. The relief valve 39 is opened when a predetermined condition is satisfied, e.g., when the temperature of the cooling water is equal to or higher than a predetermined temperature. The relief valve 39 allows communication between the inner space 200 and the outside of the housing main body 21 i.e. the space inside the pipe 515 via the relief port 224. When the temperature of the cooling water is lower than the predetermined temperature, the relief valve 39 blocks the above-described communication.

Figure 6:
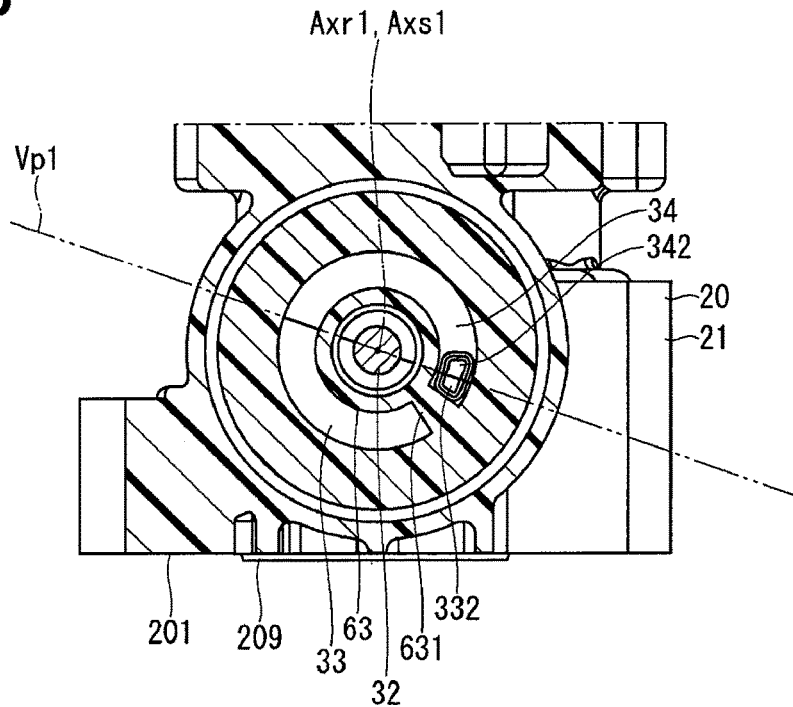
FIG. 6 is a cross-sectional view along a line VI-VI in FIG. 3.

As shown in FIG. 3 and FIG. 6, a C-shaped regulation recess 63, dented from the surface of the partition part main body 61 on the inner space 200 side to the driving part 70 side, is formed in the partition part 60. A regulating part 631 is formed between ends of the regulation recess 63 in a circumferential direction. As shown in FIG. 3 and FIG. 6, a first regulation convex member 332 and a second regulation convex member 342, extending from the end surface on the driving part 70 side to the regulation recess 63 side, with an end positioned in the regulation recess 63, are formed in the valve body 31. Accordingly, when the first regulation convex member 332 comes into contact with the regulating part 631, and when the second regulation convex member 342 comes into contact with the regulating part 631, the rotation of the valve body 31 is regulated. That is, the valve body 31 is rotatable within a range from the position where the first regulation convex member 332 comes into contact with the regulating part 631 to the position where the second regulation convex member 342 comes into contact with the regulating part 631.

The valve device 10 is attached to the engine 2 such that the inlet port 220 is connected to the exit of the water jacket 3. Accordingly, the cooling water flowing from the inlet port 220 into the inner space 200 flows via the space between valves 400 into the valve body flow path 300. Further, when the valve body openings 430, 420, and 410 overlap with the respective seal openings 360 with the rotation of the valve body 31, the cooling water flows from the valve body flow path 300 via the valve body openings 430, 420, and 410, to the device 7, the heater 6, and the radiator 5, in correspondence with overlap areas.

The ECU 8 controls the operation of the motor 71 and controls the rotational position of the valve body 31, thus feeds the cooling water through the device 7 to perform heat exchange in the device 7. Accordingly, it is possible to cool the engine oil and the EGR gas, to improve the fuel consumption. Further, it is possible to feed the cooling water through the heater 6 to perform heat exchange between the air in the vehicle 1 and the cooling water. Accordingly, it is possible to warm the inside of the vehicle 1.

Figure 7:
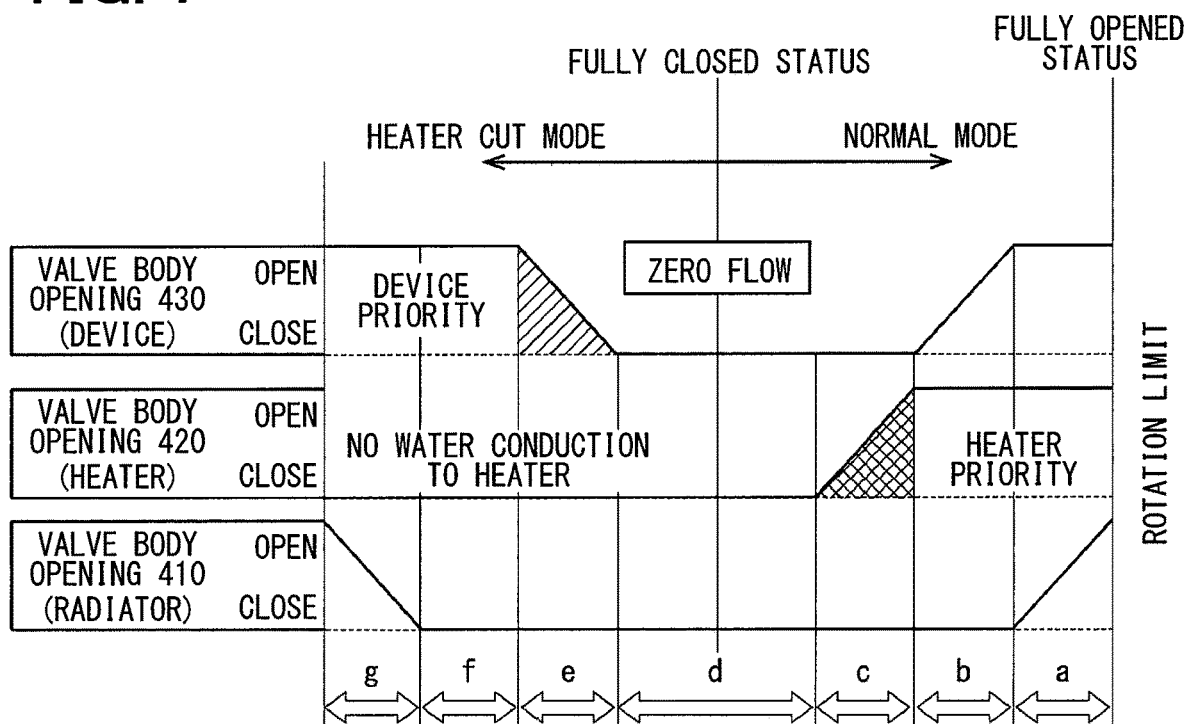
FIG. 7 is a diagram showing the relationship between a rotational position of a valve body and an open/closed status of a valve body opening in the valve device of the first embodiment.

FIG. 7 is a diagram showing the relationship between the rotational position (horizontal axis) of the valve body 31 and the open/closed status (vertical axis) of the valve body openings 430, 420, and 410, i.e., the relationship of the overlap areas between the valve body openings 430, 420, and 410, and the respective seal openings 360. Note that the overlap areas between the valve body openings 430, 420, and 410 and the respective seal openings 360 correspond to the flow path areas to the device 7, the heater 6, and the radiator 5.

The ECU 8 selects a "normal mode" used when there is a request to feed the cooling water through the heater 6 (heater request), or a "heater cut mode" used when there is no heater request, and rotates the valve body 31. The "normal mode" and the "heater cut mode" partition off a region (region d) when all the valve body openings 430, 420, and 410 are closed with the outer peripheral wall of the valve body 31 (all closed status: see FIG. 3), and the flow rate of the cooling water to the device 7, the heater 6, and the radiator 5 is zero. In the region d, the flow of the cooling water to the device 7, the heater 6, and the radiator 5 is blocked.

In the "normal mode", the water conduction to the heater 6 has the highest priority. In FIG. 7, when the valve body 31 is rotated in a direction advancing rightward from the region d, the rotational position of the valve body 31 moves to a region adjacent to the region d (region c). In the region c, the valve body opening 420 begins to open, and the cooling water begins to flow through the heater 6. When the valve body 31 is further rotated, the valve body opening 420 is fully opened, and the rotational position of the valve body 31 moves to a region adjacent to the region c (region b). In the region b, the valve body opening 430 begins to open, and the cooling water begins to flow through the device 7. When the valve body 31 is further rotated, the valve body opening 430 is fully opened, and the rotational position of the valve body 31 moves to a region adjacent to the region b (region a). In the region a, the valve body opening 410 begins to open, and the cooling water begins to flow through the radiator 5. When the valve body 31 is further rotated, the valve body opening 410 is fully opened (fully opened status). Note that the rotational position of the valve body 31 where the valve body opening 410 is fully opened corresponds to the rotation limit of the valve body 31. At this time, the first regulation convex member 332 is in contact with the regulating part 631 (see FIG. 6).

In the "heater cut mode", the water conduction to the heater 6 is not performed. The priority of the water conduction to the device 7 is higher than the water conduction to the radiator 5. In FIG. 7, when the valve body 31 is rotated in a direction advancing leftward from the region d, the rotational position of the valve body 31 moves to a region adjacent to the region d (region e). In the region e, the valve body opening 430 begins to open, and the cooling water begins to flow through the device 7. When the valve body 31 is further rotated, the valve body opening 430 is fully opened, and the rotational position of the valve body 31 moves to a region adjacent to the region e (region f). In the region f, only the valve body opening 430 is opened, and the cooling water flows only through the device 7. When the valve body 31 is further rotated, the rotational position of the valve body 31 moves to a region adjacent to the region f (region g). In the region g, the valve body opening 410 begins to open, and the cooling water begins to flow through the radiator 5. When the valve body 31 is further rotated, the valve body opening 410 is fully opened. The ECU 8 can achieve both of the fuel consumption and air conditioning performance by rotate-driving the valve body 31 based on the "normal mode" and the "heater cut mode" shown in FIG. 7.

Figure 2:
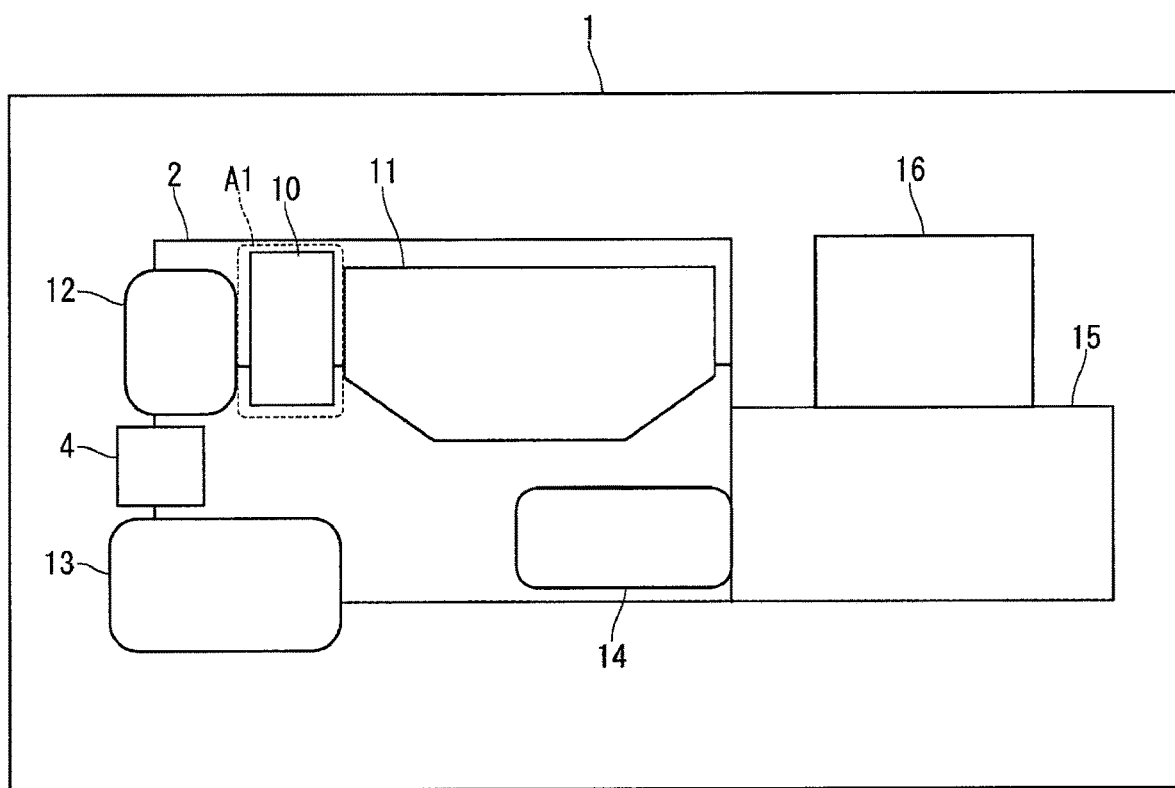
FIG. 2 is a schematic diagram showing an arrangement of the valve device of the first embodiment in a vehicle.

As shown in FIG. 2, an intake manifold 11, an alternator 12, the water pump 4, a compressor 13, a starter 14, a transmission 15, and the like, are assembled to the engine 2. The valve device 10 is attached to the engine 2 in narrow space A1 between the alternator 12 and the intake manifold 11. Note that the valve device 10 is attached to the engine 2 such that the driving part 70 side is faced downward in a vertical direction. Accordingly, air of vapor or the like occurred in the inner space 200 moves to the upper side in the vertical direction, and is discharged via the pipe 516 to the reservoir tank.

<1-2>

Figure 9:
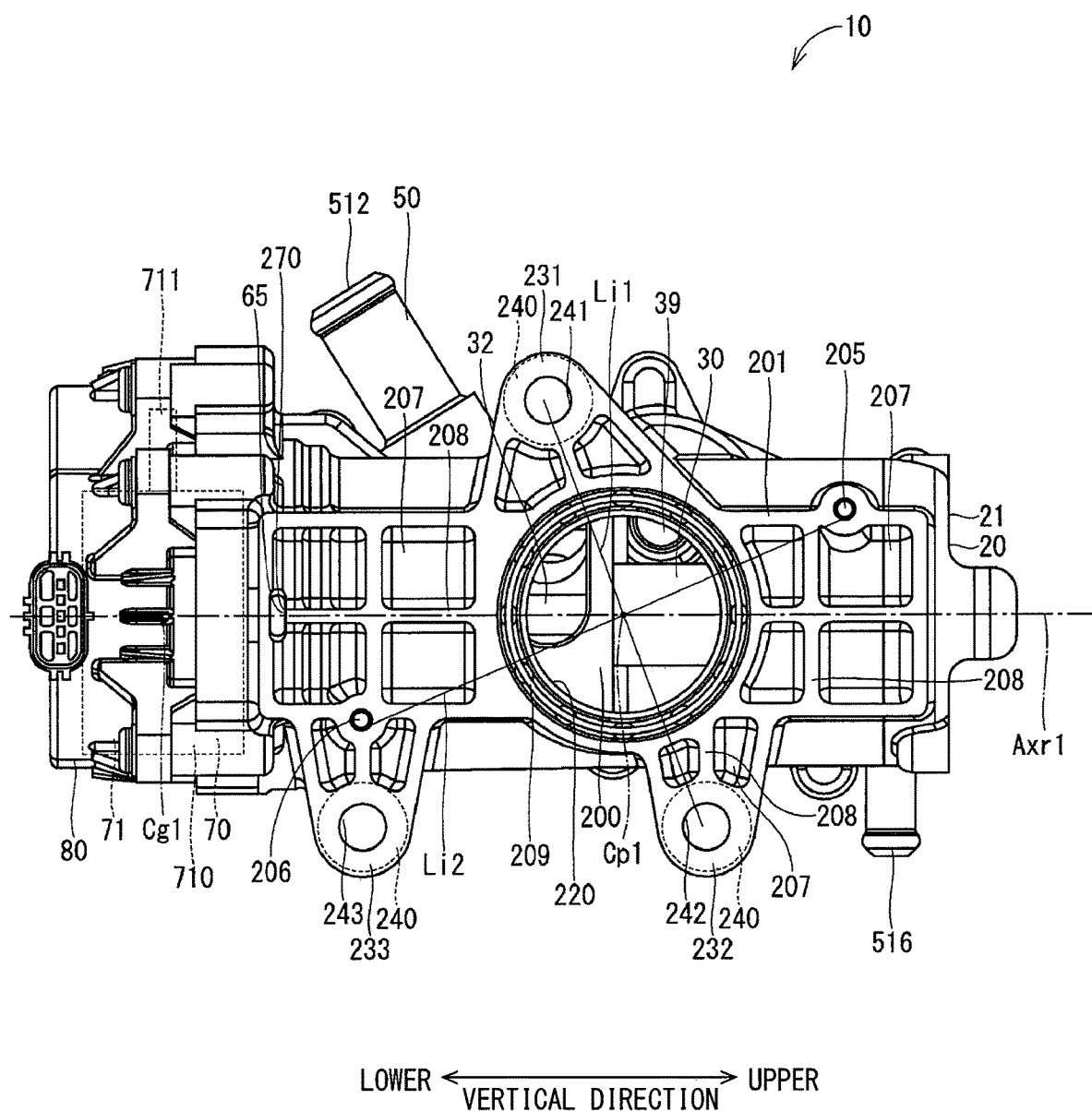
FIG. 9 is a diagram of FIG. 3 viewed along an arrow IX direction.
Figure 10:
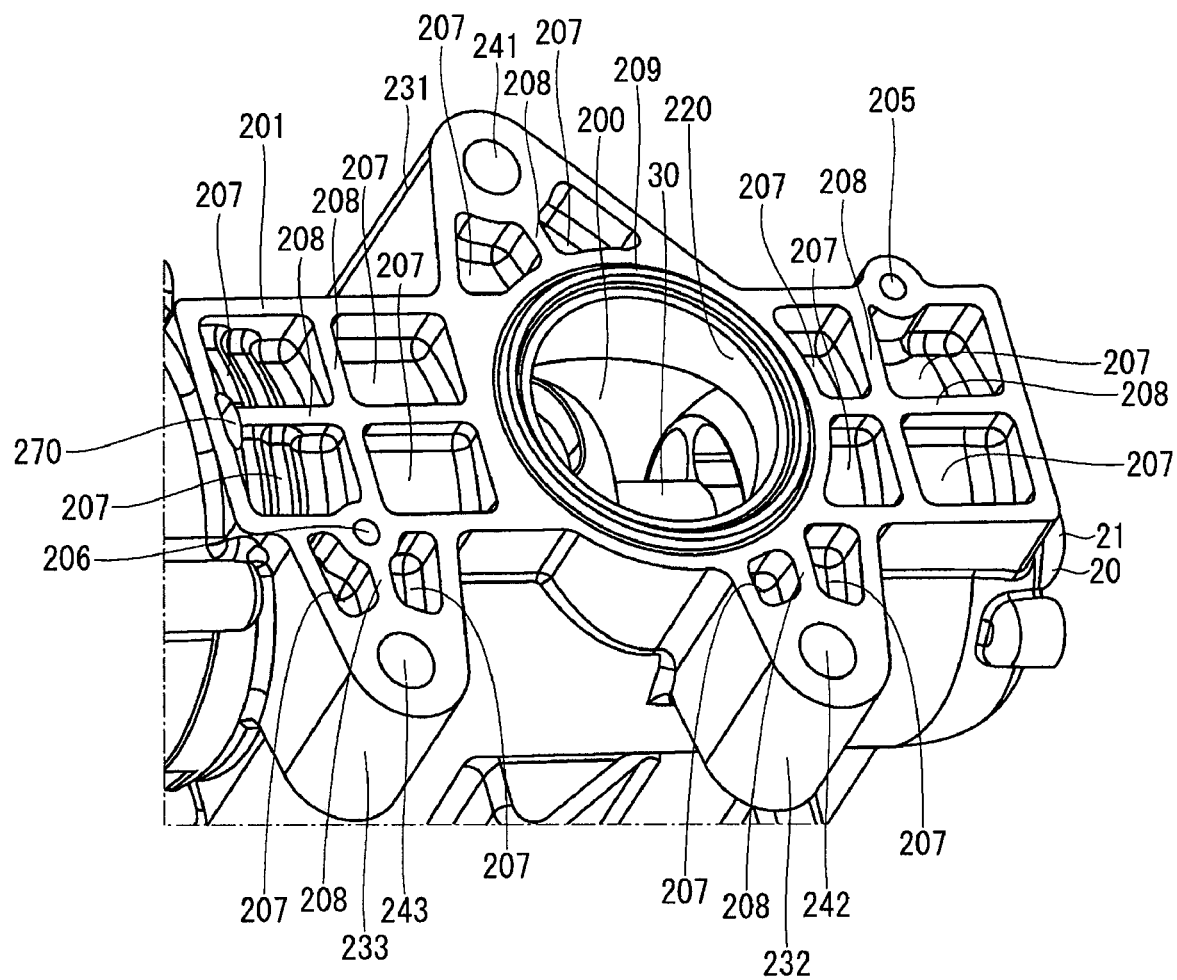
FIG. 10 is a perspective view showing a part of the valve device of the first embodiment.

As shown in FIG. 8, FIG. 9 and FIG. 10, the housing 20 has fastening parts 231, 232, and 233 formed integrally with the housing main body 21. The fastening parts 231, 232, and 233 are formed so as to project from the end of the housing main body 21 on the mounting surface 201 side in a surface direction of the mounting surface 201. Further, the housing 20 has fastening holes 241, 242 and 243 formed in correspondence with the respective fastening parts 231, 232, and 233. Note that the fastening holes 241, 242, and 243 respectively correspond to a "first fastening hole", a "second fastening hole", and a "third fastening hole.

A fastening member 240 is inserted through the fastening holes 241, 242, and 243, and is fastened to the engine 2. With this configuration, the valve device 10 is attached to the engine 2. A ring-shaped rubber port seal member 209 is provided on the radially outside of the inlet port 220 of the mounting surface 201. In the status where the valve device 10 is attached to the engine 2, the port seal member 209 is compressed with an axial force of the fastening member 240. With this configuration, the port seal member 209 holds a fluid-tight status between the mounting surface 201 and the engine 2, and can suppress leakage of the cooling water from the inlet port 220 via the position between the mounting surface 201 and the engine 2.

As shown in FIG. 9 and FIG. 10, the fastening hole 241 is formed radially outside of the opening of the inlet port 220 in the mounting surface 201. The fastening hole 242 is formed so as to hold the opening of the inlet port 220 between the fastening hole 242 and the fastening hole 241. The fastening hole 243 is formed on the driving part 70 side with respect to the fastening holes 241 and 242.

<1-2>

As described above, the present embodiment relates to the valve device 10 configured to control the cooling water in the engine 2 of the vehicle 1. The valve device 10 is provided with the housing 20, the valve 30, the partition part 60, and the driving part 70.

The housing 20 has the housing main body 21 defining the inner space 200 therein, the mounting surface 201 which is formed on the outer wall of the housing main body 21 and which is opposite to the engine 2 in a status where the mounting surface is attached to the engine 2, the inlet port 220 which is opened in the mounting surface 201, and which connects the inner space 200 to the outside of the housing main body 21, the multiple fastening parts (231, 232, and 233) integrally formed with the housing main body 21, and the multiple fastening holes (241, 242, and 243) formed in correspondence with the respective plural fastening parts.

The valve 30 has the valve body 31 rotational about the rotational axis Axr1 in the inner space 200, the valve body flow path 300 which is formed inside the valve body 31 and which is communicable with the inlet port 220, and the shaft 32 provided on the rotational axis Axr1.

The partition part 60 partitions the inner space 200 from the outside of the housing main body 21.

The driving part 70 is provided on the opposite side to the inner space 200 with respect to the partition part 60, and is capable of rotate-driving the valve body 31 via the shaft 32.

The housing main body 21 is fastened, with the fastening member 240 passed through the fastening holes (241, 242, and 243) and screwed into the engine 2, to the engine 2.

The fastening hole includes a first fastening hole (241) formed on the radially outside of the opening of the inlet port 220, a second fastening hole (242) formed so as to hold the opening of the inlet port 220 between the second fastening hole and the first fastening hole, and a third fastening hole (243) formed on the driving part 70 side with respect to the first fastening hole and the second fastening hole.

Accordingly, in a case where the ring-shaped port seal member 209 of an elastic member is provided around the inlet port 220, when the housing main body 21 is fixed to the engine 2 with the fastening member 240 passed through the fastening hole 241 and the fastening hole 242, the port seal member 209 can be compressed in well balance. This configuration enables to effectively ensure the sealability around the inlet port 220.

Further, it is possible to suppress the influence of the vibration of the engine 2 on the driving part 70 by fixing the fastening part 233 to the engine 2 with the fastening member 240 passed through the fastening hole 243.

<1-2-1>

A center Cp1 of the opening of the inlet port 220 is positioned on a first straight line Li1 that is a straight line connecting the fastening hole 241 to the fastening hole 242.

Accordingly, it is possible to compress the port seal member 209 in better balance.

<1-2-2>

The distance between the center Cp1 of the opening of the inlet port 220 and the fastening hole 241 is the same as the distance between the center Cp1 and the fastening hole 242.

Accordingly, it is possible to compress the port seal member 209 in better balance.

<1-2-3>

The distance between the fastening hole 243 and the driving part 70 is shorter than the distance between the fastening hole 243 and the center Cp1 of the opening of the inlet port 220.

Accordingly, it is possible to further suppress the influence of the vibration of the engine 2 on the driving part 70.

<1-2-4>

The fastening hole 243 is formed so as to be positioned on the driving part 70 side with respect to the virtual plane Vp2 the center of which is passed through the center of the outlet port 223 and is orthogonal to the rotational axis Axr1 (see FIG. 8). Note that the motor 71 is provided such that, when viewed along the axial direction of the fastening hole 243, a center of gravity Cg1 is positioned on the fastening hole 243 side with respect to the rotational axis Axr1 (see FIG. 8 and FIG. 9).

Accordingly, it is possible to further suppress the influence of the vibration of the engine 2 on the driving part 70.

<1-3>

The fastening hole 241 and the fastening hole 242 are formed to be in point symmetry with respect to the center Cp1 of the opening of the inlet port 220.

Accordingly, it is possible to compress the port seal member 209 in better balance.

<1-3-1>

The fastening hole 241 and the fastening hole 242, in point symmetry with respect to the center Cp1 of the opening of the inlet port 220, are formed such that a straight line, which is vertical to the opening surface of the inlet port 220 and which is passed through the center Cp1 of the opening of the inlet port 220, is passed through the rotational axis Axr1.

Accordingly, it is possible to compress the port seal member 209 in better balance.

<1-4>

The housing 20 has positioning members 205 and 206, which are formed on the mounting surface 201 and engaged with another member, thus capable of positioning the housing main body 21. The positioning members 205 and 206 are formed to be dented in a round shape from the mounting surface 201. Note that the positioning members 205 and 206 respectively correspond to a "first positioning member" and a "second positioning member". Further, the above-described another member is e.g. a palette used in the manufacturing process of the valve device 10, the engine 2 as an attachment object of the valve device 10, or the like. The configuration enables to perform positioning of the housing main body 21 with respect to the palette or the engine 2 by engaging the positioning members 205 and 206 with projections or the like formed on the palette or the engine 2.

The positioning member 205 is formed on the radially outside of the opening of the inlet port 220. The positioning member 206 is formed so as to hold the opening of the inlet port 220 between the positioning member 206 and the positioning member 205.

Accordingly, it is possible to position the housing main body 21 with high accuracy in the manufacturing process, and to improve the processing accuracy. Further, upon attachment to the engine 2, it is possible to position the housing main body 21 with high accuracy, and perform control of the cooling water with the valve device 10 with high accuracy. Further, after the attachment to the engine 2, the position of the housing main body 21 with respect to the engine 2 is stabled. The configuration enables to improve the sealability with the port seal member 209.

<1-4-1>

The positioning member 205 and the positioning member 206 are formed such that a second straight line Li2 that is a straight line connecting the positioning member 205 and the positioning member 206 is orthogonal to the first straight line Li1 connecting the fastening hole 241 and the fastening hole 242.

Accordingly, it is possible to further stabilize the position of the housing main body 21 with respect to the engine 2.

<1-4-2>

The center of the first straight line Li1 and the center of the second straight line Li2 correspond with each other.

Accordingly, it is possible to further stabilize the position of the housing main body 21 with respect to the engine 2.

<1-5>

The housing 20 has a mounting surface recess 207 dented from the mounting surface 201 to the opposite side to the engine 2.

Accordingly, it is possible to insulate the heat of the engine 2 with the mounting surface recess 207, and suppress the influence of the heat from the engine 2 on the driving part 70.

<1-5-1>

A plurality of mounting surface recesses 207 are formed, and a rib between recesses 208 is formed between the multiple mounting surface recesses 207.

Accordingly, it is possible to ensure a contact area between the mounting surface 201 and the engine 2 while insulating the heat of the engine 2 with the mounting surface recess 207.

<1-1-5-1>

The housing main body 21 is formed of polyphenylene sulfide resin (PPS) including a filler. More particularly, the housing main body 21 is formed with "PPS-GF50" (PPS: 50%, glass fiber: 50%). As a filler, in addition to the glass fiber, a carbon fiber, silica, talc, silicon, and the like, may be adopted.

Accordingly, it is possible to improve heat resistance, water absorption resistance, strength, and dimensional accuracy of the housing main body 21.

<2-1>

Figure 11:
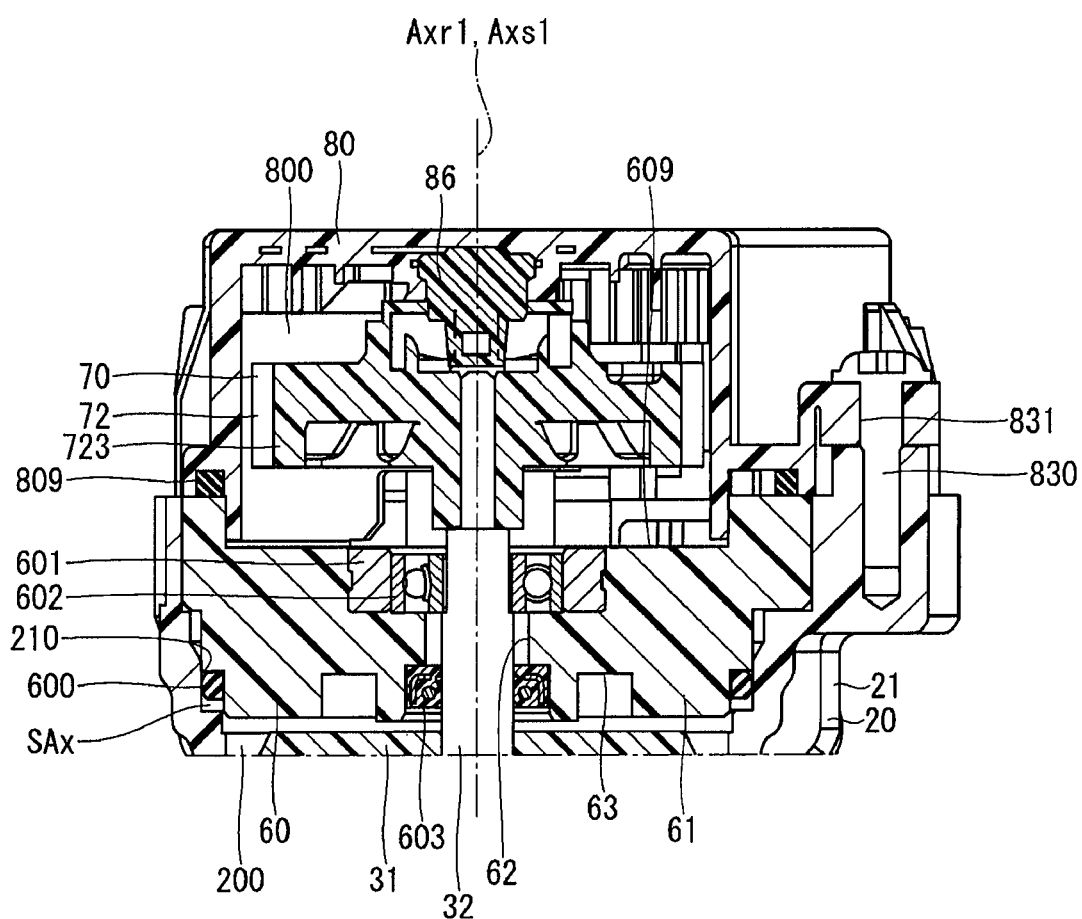
FIG. 11 is a cross-sectional view showing a vicinity of a driving part in the valve device of the first embodiment.

As shown in FIG. 11, the partition part 60 is provided at the housing opening 210 so as to partition the inner space 200 from the outside of the housing main body 21. The partition part 60 is capable of bearing-supporting the shaft 32. The driving part cover 80 is provided on the opposite side to the inner space 200 with respect to the partition part 60. The driving part cover 80 forms the driving part space 800 between the driving part cover 80 and the partition part 60. The driving part 70 is provided in the driving part space 800, and is capable of rotate-driving the valve body 31 via the shaft 32.

<2-1>

As described above, the present embodiment relates to the valve device 10 configured to control the cooling water in the engine 2 of the vehicle 1. The valve device 10 is provided with the housing 20, the valve 30, the partition part 60, the driving part cover 80, and the driving part 70.

The housing 20 has the housing main body 21 defining the inner space 200 therein, the ports (220, 221, 222, and 223) connecting the inner space 200 to the outside of the housing main body 21, and the housing opening 210 connecting the inner space 200 to the outside of the housing main body 21.

The valve 30 has the valve body 31 rotational about the rotational axis Axr1 in the inner space 200, the valve body flow path 300 formed inside the valve body 31, the valve body openings (410, 420, and 430) connecting the valve body flow path 300 to the outside of the valve body 31, and the shaft 32 provided on the rotational axis Axr1. The valve 30 is configured to change the communication status between the valve body flow path 300 and the ports (220, 221, 222, and 223) via the valve body openings (410, 420, and 430) with the rotational position of the valve body 31.

The partition part 60 is provided at the housing opening 210 so as to partition the inner space 200 from the outside of the housing main body 21. The partition part 60 is capable of bearing-supporting the shaft 32.

The driving part cover 80 is provided on the opposite side to the inner space 200 with respect to the partition part 60. The driving part cover 80 forms the driving part space 800 between the driving part cover 80 and the partition part 60.

The driving part 70 is provided in the driving part space 800, and is capable of rotate-driving the valve body 31 via the shaft 32.

In the present embodiment, there is no need for a member such as a joint between the driving part 70 and the shaft 32. Accordingly, it is possible to simplify the configuration around the driving part 70.

Further, it is possible to improve the coaxial accuracy between the driving part 70 and the valve body 31 by sharing the partition part 60 as a member to bearing-support the shaft 32 and a member to accommodate the driving part 70. Further, it is possible to reduce the number of parts.

<2-1-1>

The valve device 10 is provided between the housing opening 210 and the partition part 60, and is further provided with a ring seal member 600 configured to seal fluid-tightly between the housing opening 210 and the partition part 60. The ring seal member 600 is formed of an elastic member such as rubber in a ring shape.

In the housing opening 210, the inner wall is formed in a cylindrical shape. The partition part 60 has the partition part main body 61 which is positioned inside the housing opening 210 and the outer wall of which is formed in a cylindrical shape. The ring seal member 600 is provided between the housing opening 210 and the partition part main body 61. The difference between the inner diameter of the housing opening 210 and the outer diameter of the partition part main body 61 is smaller than the difference between the inner diameter and the outer diameter of the ring seal member 600 in a free status. Accordingly, the ring seal member 600 is compressed in the radial direction between the housing opening 210 and the partition part main body 61.

<2-2>

The ring seal member 600 is compressed in the radial direction between the housing opening 210 and the partition part 60.

Accordingly, the shaft 32 is aligned with the ring seal member 600. The configuration enables to improve the position accuracy of the valve body 31, and the detection accuracy of a rotation angle sensor 86 to be described later.

Further, it is possible to reduce a force from a fixing member 830 to be described later in the axial direction, and to reduce the number of the fixing members 830.

<2-2-1>

In the axial direction of the ring seal member 600, an axial direction gap SAx is formed between the ring seal member 600 and the housing main body 21.

Accordingly, it is possible to more effectively compress the ring seal member 600 in the radial direction between the housing opening 210 and the partition part 60.

<2-3>

The valve device 10 is further provided with the fixing member 830 capable of fixing the housing main body 21 and the driving part cover 80 in a status where the partition part 60 is held between the housing main body 21 and the driving part cover 80.

Accordingly, the position of the partition part 60 is stabilized. The configuration enables to improve the axis accuracy of the valve body 31.

Further, it is possible to assemble the partition part 60 and the driving part cover 80 to the housing main body 21 at once, and to simplify the assembly. Further, it is possible to reduce the number of parts.

The fixing member 830 is e.g. a screw. The fixing member 830 is screwed, through a cover fastening hole 831 formed in the driving part cover 80, into a fastening hole of the housing main body 21. With this configuration, the driving part cover 80 is fixed to the housing main body 21 in a status where the partition part 60 is held between the driving part cover 80 and the housing main body 21. Note that multiple cover fastening holes are formed in the driving part cover 80, and the fixing member 830 is inserted through the respective cover fastening holes. Note that a rubber ring-shaped cover seal member 809 is provided between the outer edge of the driving part cover 80 and the partition part 60. With this configuration, the driving part space 800 is held in an air-tight and fluid-tight status.

<2-4>

As shown in FIG. 11, the partition part 60 has the shaft insertion hole 62 through which one end of the shaft 32 can be inserted. The valve device 10 is provided with a metal ring 601 insert-molded in the partition part 60 in the shaft insertion hole 62. The metal ring 601 is formed of metal in a ring shape, and is provided coaxially with the shaft insertion hole 62. The valve device 10 is provided with a bearing 602 which is provided inside the metal ring 601 and which bearing-supports one end of the shaft 32. The bearing 602 is e.g. a ball bearing, and is press-inserted inside of the metal ring 601.

Accordingly, it is possible to suppress failure of holding the bearing 602 due to linear expansion difference between the resin (partition part 60) and the metal (bearing 602), degradation of the resin, and the like, and to maintain the bearing accuracy of the shaft 32.

<2-5>

Figure 12:
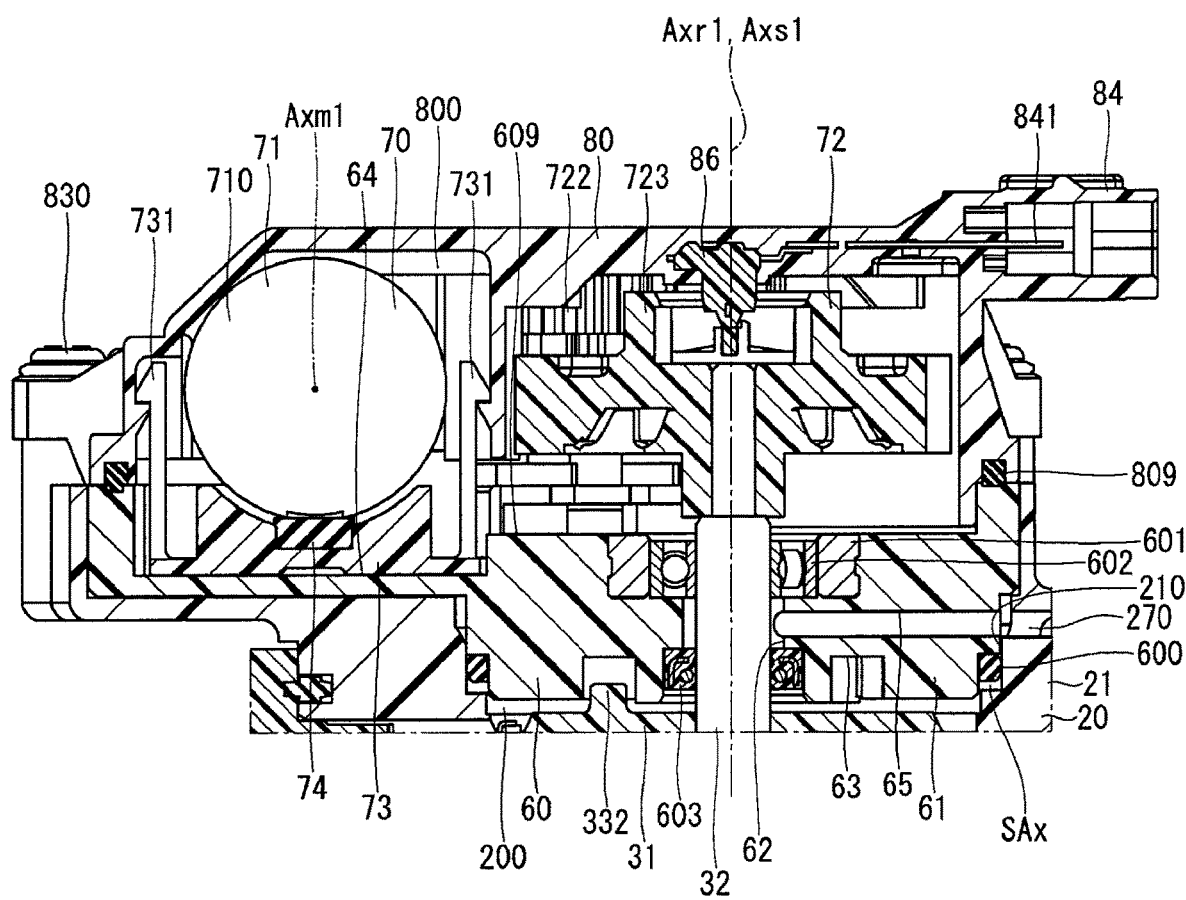
FIG. 12 is a cross-sectional view showing the vicinity of the driving part in the valve device of the first embodiment.

As shown in FIG. 12, the partition part 60 has a partition recess 64 dented from a surface 609 on the driving part cover 80 side to the opposite side to the driving part cover 80 on the radially outside of the metal ring 601. Note that the surface 609 is a planar part which is formed on the same plane of an end surface of the metal ring 601 on the driving part cover 80 side, on the driving part cover 80 side of the partition part 60.

Accordingly, it is possible to suppress sinkage or warp upon integral molding of the partition part 60, and deformation of the bearing 602 due to press-insertion. This configuration enables to improve the dimensional accuracy of the outer peripheral part of the partition part 60, and to improve the axis accuracy of the valve body 31.

<2-6>

As shown in FIG. 12, the driving part 70 has the motor 71 capable of rotate-driving the shaft 32.

<2-7>

Figure 13:
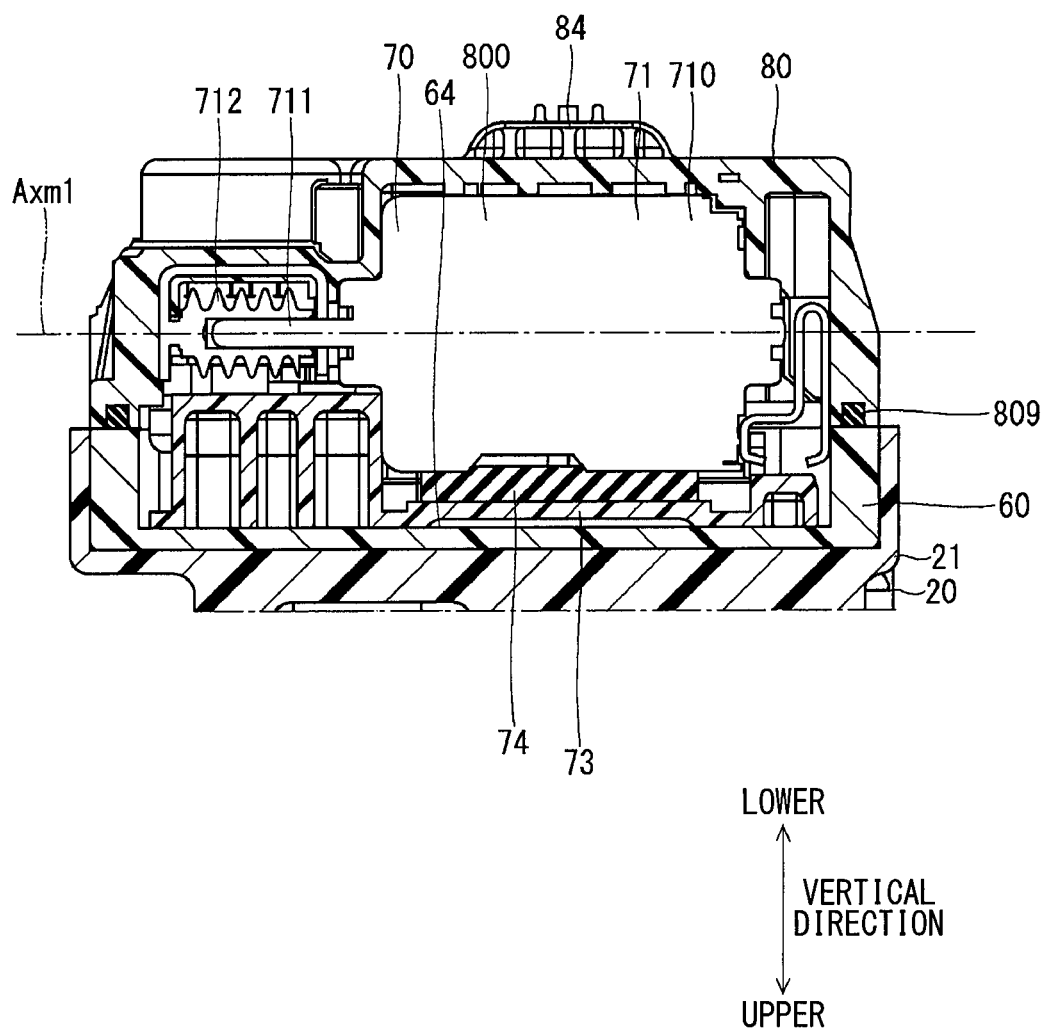
FIG. 13 is a cross-sectional view showing the vicinity of the driving part in the valve device of the first embodiment.

As shown in FIG. 12 and FIG. 13, the valve device 10 is further provided with an elastic member 74, provided in a compressed status between the motor 71 and the partition part 60. The elastic member 74 is formed of e.g. rubber.

Accordingly, by virtue of the damper effect with the elastic member 74, it is possible to attenuate vibration acting on the motor 71, to suppress contact failure, and to excellently maintain the operation status of the motor 71.

Further, it is possible to simplify the assembling of the motor 71, and to reduce the number of parts.

<2-8>

Figure 14:
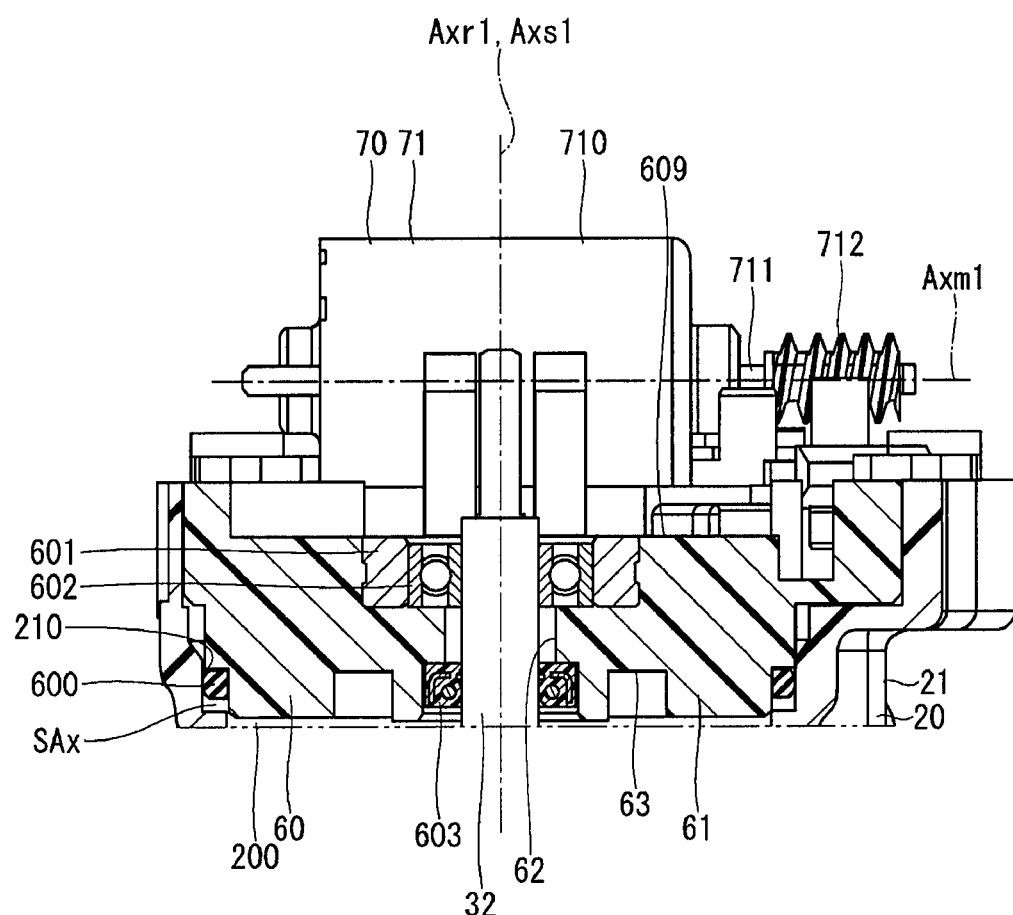
FIG. 14 is a cross-sectional view showing the vicinity of the driving part in the valve device of the first embodiment.
Figure 15:
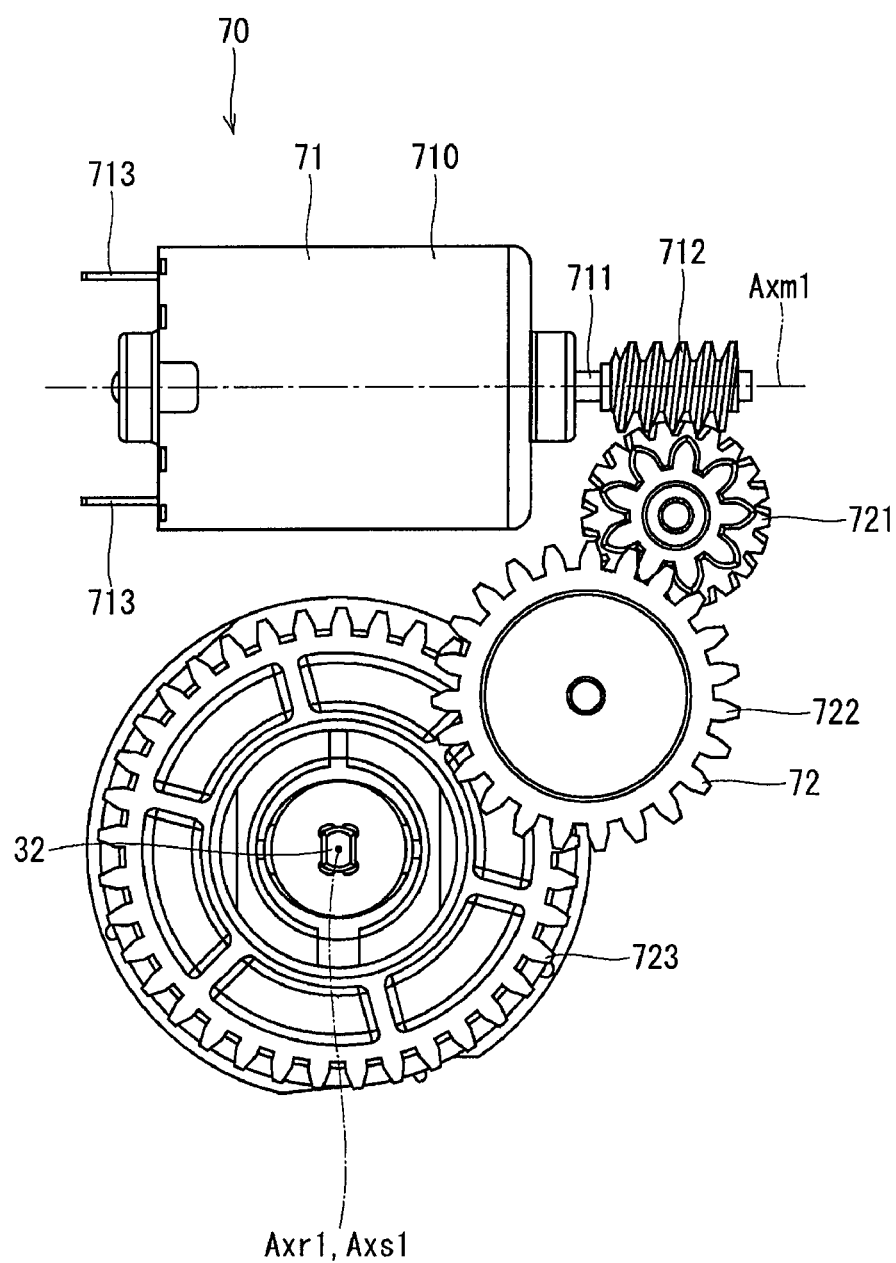
FIG. 15 is a plan view showing the driving part in the valve device of the first embodiment.

As shown in FIG. 14 and FIG. 15, the motor 71 is provided such that an axis Axm1 is orthogonal to the axis Axs1 of the shaft 32. More precisely, the axis Axm1 and the axis Axs1 are orthogonal to each other in twisted relationship.

Accordingly, it is possible to improve mounting freedom of the pipe member 50.

Further, it is possible to reduce the physical constitution of the housing main body 21 in the width direction, and to mount the valve device 10 in narrow space.

Further, it is possible to keep away electrical parts around the motor 71 from the cooling water (inner space 200), to reduce the risk of electrical short circuit due to leakage of the water.

Further, it is possible to suppress heat damage to the motor 71 by keeping away the motor 71 from the cooling water (inner space 200).

<2-9>

Figure 16:
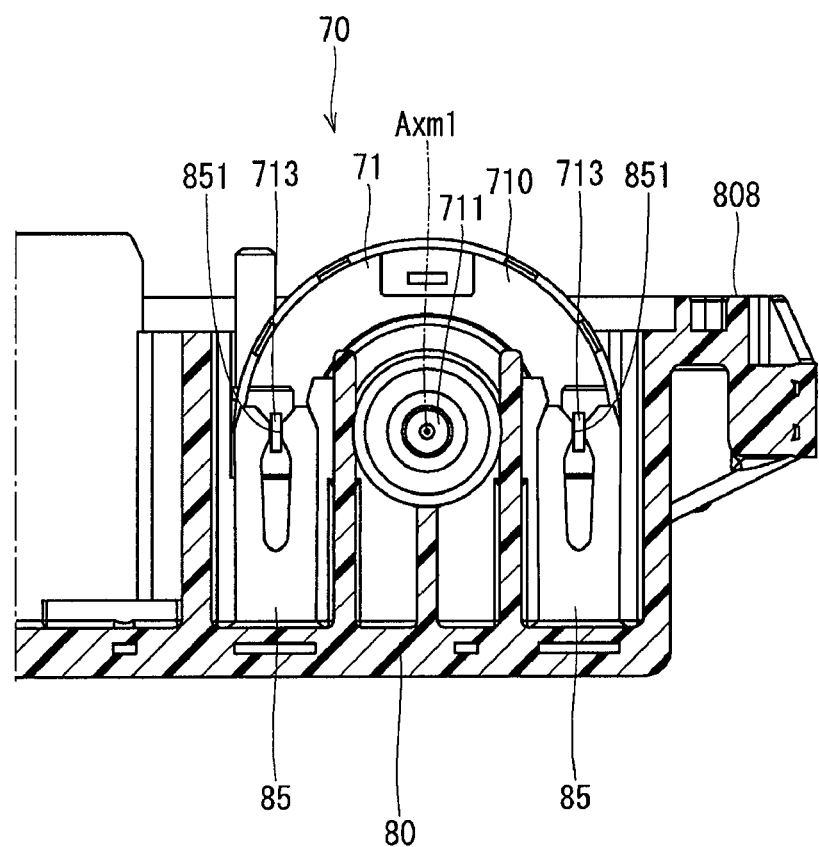
FIG. 16 is a cross-sectional view showing the vicinity of the driving part in the valve device of the first embodiment.

As shown in FIG. 15 and FIG. 16, the motor 71 has a motor main body 710, a motor shaft 711, a worm gear 712, a motor-side terminal 713, and the like.

The motor main body 710 is formed in an approximately cylindrical shape. The motor main body 710 has unshown stator, coil, and rotor inside. The motor shaft 711 is integrally provided with the rotor in the rotational axis of the rotor, and one end projects from the end of the motor main body 710 in the axial direction. The driving force of the motor 71 is outputted from the motor shaft 711. Note that the axis Axm1 of the motor 71 corresponds with the axis of the motor shaft 711. The motor 71 is provided such that the axis Axm1 is parallel to a surface 808 of the driving part cover 80 facing the partition part 60 side (see FIG. 16).

The worm gear 712 is provided at one end of the motor shaft 711, and is rotatable integrally with the motor shaft 711. The motor-side terminal 713 is formed of e.g. metal in a long plate shape. The motor-side terminal 713 projects from the end of the motor main body 710 on the opposite side to the worm gear 712. Two motor-side terminals 713 are provided so as to hold the axis Axm1 of the motor 71 between them. Note that the two motor-side terminals 713 are provided such that their surface directions are parallel to each other. The end of the motor-side terminal 713 in the motor main body 710 is electrically connected to the coil.

Figure 17:
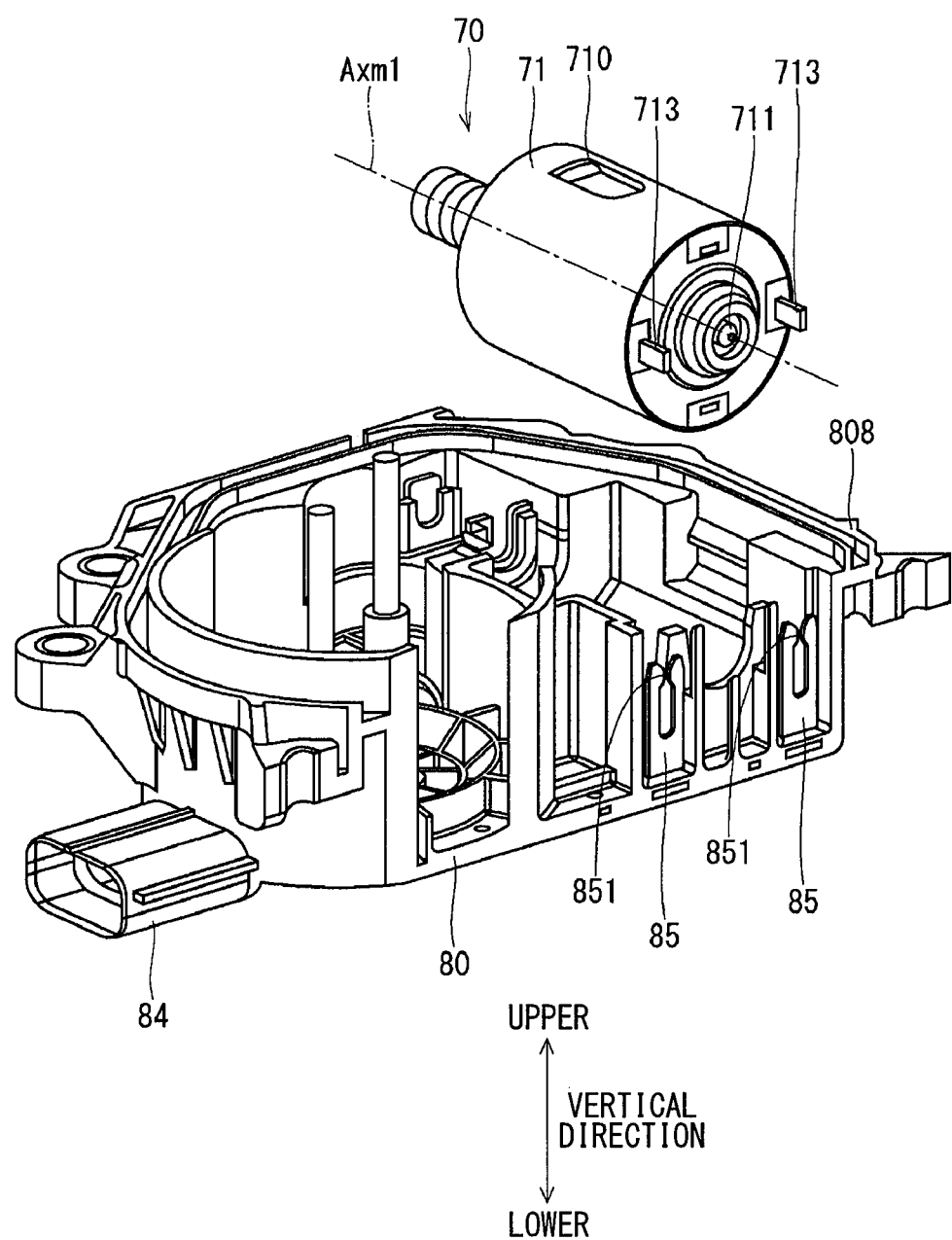
FIG. 17 is an exploded perspective view showing a part of a driving part cover and the driving part in the valve device of the first embodiment.

As shown in FIG. 16 and FIG. 17, the valve device 10 is further provided with a feeding terminal 85. The feeding terminal 85 is formed of e.g. metal in a U planar shape. The feeding terminal 85 is insert-molded in the driving part cover 80 such that the end on the terminal opening 851 side faces the partition part 60 side. Two feeding terminals 85 are provided so as to hold the axis Axm1 of the motor 71 between them. Note that the two feeding terminals 85 are provided on the same plane. The two motor-side terminals 713 of the motor 71 are fitted in the respective terminal openings 851 of the two feeding terminals 85, and electrically connected to the feeding terminals 85.

As shown in FIG. 12, the driving part cover 80 has a connector 84. The connector 84 has a terminal 841 inside. The terminal 841 is electrically connected to the feeding terminal 85. An unshown wire harness is connected to the connector 84. With this configuration, electric power is supplied from a battery of the vehicle 1 via the wire harness, the terminal 841, the feeding terminal 85, and the motor-side terminal 713.

Note that the rotation angle sensor 86 is provided on the rotational axis Axr1 of the driving part cover 80. The rotation angle sensor 86 is electrically connected via the terminal 841 and the wire harness to the ECU 8. The rotation angle sensor 86 outputs a signal corresponding to the rotation angle of the shaft 32 to the ECU 8. With this configuration, the ECU 8 is capable of detecting the rotational position of the valve body 31. The ECU 8 can control the operation of the motor 71 in correspondence with the rotational position of the valve body 31.

As described above, the valve device 10 is provided with the U-shaped feeding terminal 85, which is provided in the driving part cover 80, the end of which on the opening (terminal opening 851) side faces the partition part 60 side, and through which an electric current to be supplied to the motor 71 flows. The motor 71 has the motor-side terminal 713 connected to the opening of the feeding terminal 85 (terminal opening 851) at the end in the axial direction, and is provided such that the axis Axm1 is parallel to the surface 808 of the driving part cover 80 facing the partition part 60 side.

Accordingly, it is possible to easily assemble the motor 71 to the driving part cover 80 from one direction. Further, it is possible to reduce the number of parts.

<2-10>

As shown in FIG. 15, the gear part 72 has a first gear 721, a second gear 722, and a third gear 723. The first gear 721 is provided so as to be engaged with the worm gear 712 of the motor 71. The second gear 722 has an outer diameter larger than the first gear 721, and is provided so as to be engaged with the first gear 721. The third gear 723 has an outer diameter larger than the second gear 722, and is provided at one end of the shaft 32 so as to be engaged with the second gear 722. The third gear 723 is provided coaxially with the shaft 32, and is rotatable integrally with the shaft 32.

The first gear 721, the second gear 722, and the third gear 723 are provided such that their axis is parallel to the axis Axs1 of the shaft 32, i.e., orthogonal to the axis Axm1 of the motor 71. The driving force of the motor 71 is transmitted via the worm gear 712, the first gear 721, the second gear 722, and the third gear 723, to the shaft 32.

Figure 18:
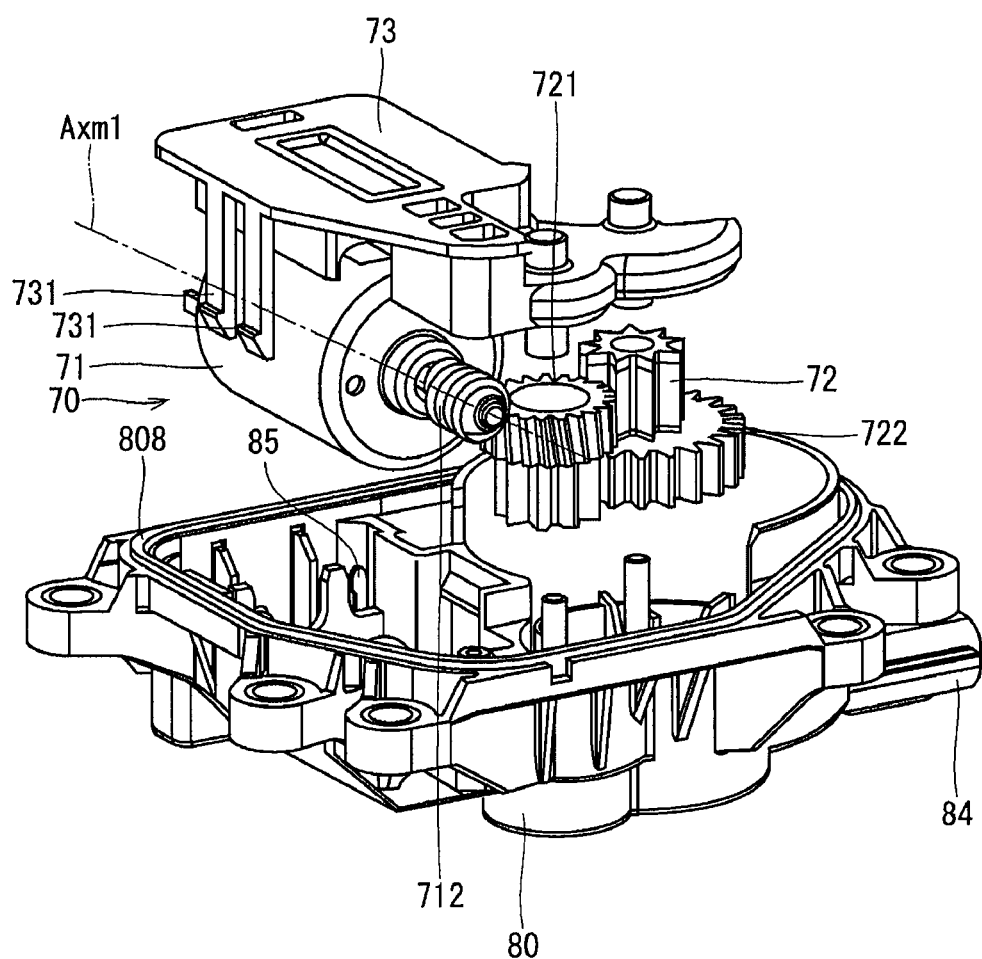
FIG. 18 is an exploded perspective view showing a part of the driving part cover and the driving part in the valve device of the first embodiment.

As shown in FIG. 12 and FIG. 18, the valve device 10 is further provided with a holding member 73. The holding member 73 has a snap fit part 731 which is snap-fittable to the driving part cover 80. The holding member 73 is snap-fitted to the driving part cover 80 such that the motor 71, the first gear 721 and the second gear 722 of the gear part 72 are held between the holding member 73 and the driving part cover 80. Note that the elastic member 74 is provided in a compressed status between the motor main body 710 and the holding member 73.

As described above, the driving part 70 has the gear part 72 capable of transmitting the driving force of the motor 71 to the shaft 32. Further, the valve device 10 is further provided with the holding member 73 which has the snap fit part 731 snap-fittable to the driving part cover 80 and which holds the motor 71 and the gear part 72 between the holding member 73 and the driving part cover 80.

Accordingly, it is possible to assemble the motor 71 and the gear part 72 to the partition part 60 side while holding the motor 71 and the gear part 72 in the driving part cover 80. Further, it is possible to reduce the number of parts.

<6-7>

As shown in FIG. 3, the partition part 60 has a partition through hole 65 which extends outward from the shaft insertion hole 62 and which is opened in the outer wall of the partition part main body 61. Further, the housing 20 has a housing through hole 270 which extends outward from the inner wall of the housing opening 210 and which is opened in the outer wall of the housing main body 21, and which is formed so as to be communicable with the partition through hole 65.

Accordingly, it is possible to feed the cooling water, which flows from the inner space 200 through the shaft insertion hole 62 toward the driving part 70 side, to the partition through hole 65. This configuration enables to suppress flowing of the cooling water in the inner space 200 to the driving part 70 side. Note that the cooling water flowing to the partition through hole 65 is discharged from the housing through hole 270 to the outside.

In the present embodiment, the housing through hole 270 is opened in the mounting surface 201. That is, when the valve device 10 is attached to the engine 2, the housing through hole 270 is covered with the engine 2.

Accordingly, it is possible to suppress intrusion of external water via the housing through hole 270 and the partition through hole 65 into the inside of the valve device 10.

Second Embodiment

Figure 19:
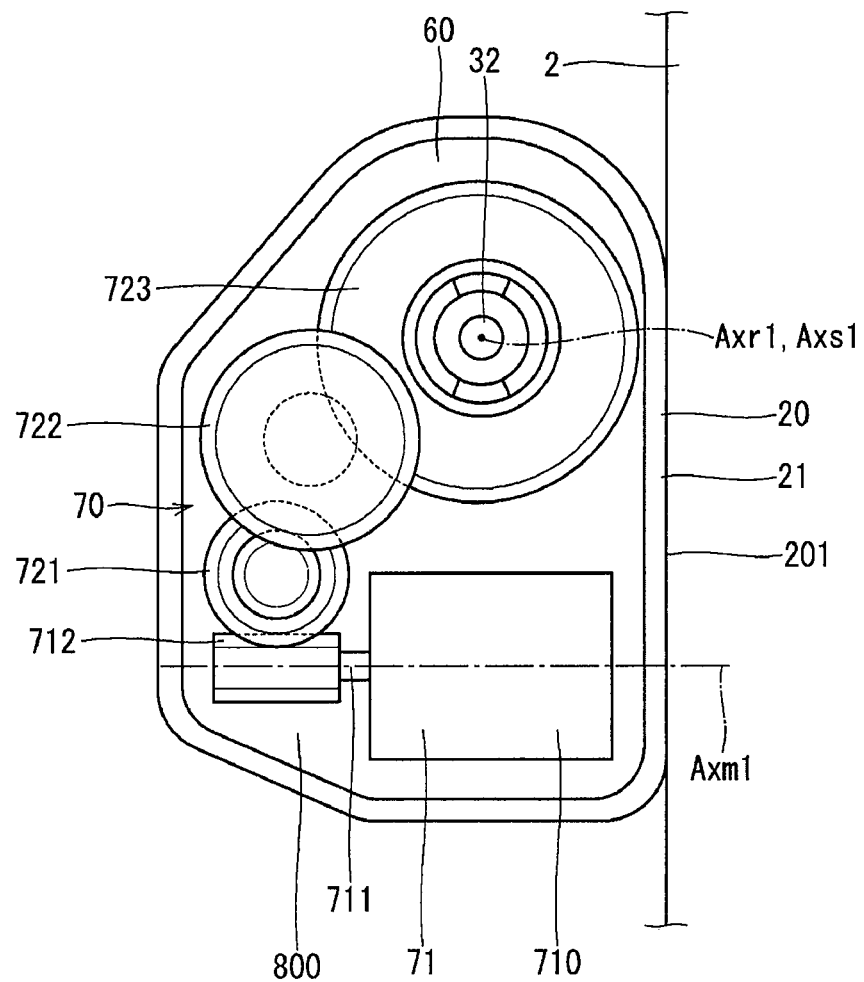
FIG. 19 is a diagram showing the driving part in the valve device of a second embodiment.
Figure 19:
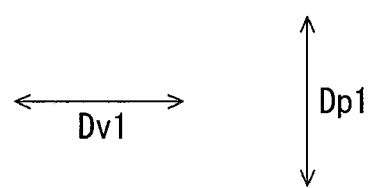

FIG. 19 shows a part of the valve device according to a second embodiment.

<2-11>

As shown in FIG. 19, the motor 71 is provided in the driving part space 800 such that the motor shaft 711 is vertical to the mounting surface 201 of the housing 20 and the worm gear 712 faces the opposite side to the mounting surface 201.

As described above, the motor 71 has the motor shaft 711 which outputs the driving force and the worm gear 712 which is provided at the end of the motor shaft 711. The motor 71 is provided such that the motor shaft 711 is vertical to the mounting surface 201 and the worm gear 712 faces the opposite side to the mounting surface 201.

Accordingly, it is possible to reduce the gear height and reduce the physical constitution of the driving part 70.

Further, as the motor main body 710 of the motor 71 can be provided in the vicinity of the engine 2 (mounting surface 201), it is possible to improve the vibration resistance of the motor 71. Further, as the vibration acting on the motor 71 is reduced, it is possible to improve the robustness to disconnection.

Further, by providing the motor 71 and the gear part 72 in the driving part space 800 as shown in FIG. 19, it is possible to make the width of the driving part 70 and the driving part cover 80 in a direction Dv1 vertical to the mounting surface 201 smaller than the width in a direction Dpi parallel to the mounting surface 201.

Third Embodiment

Figure 20:
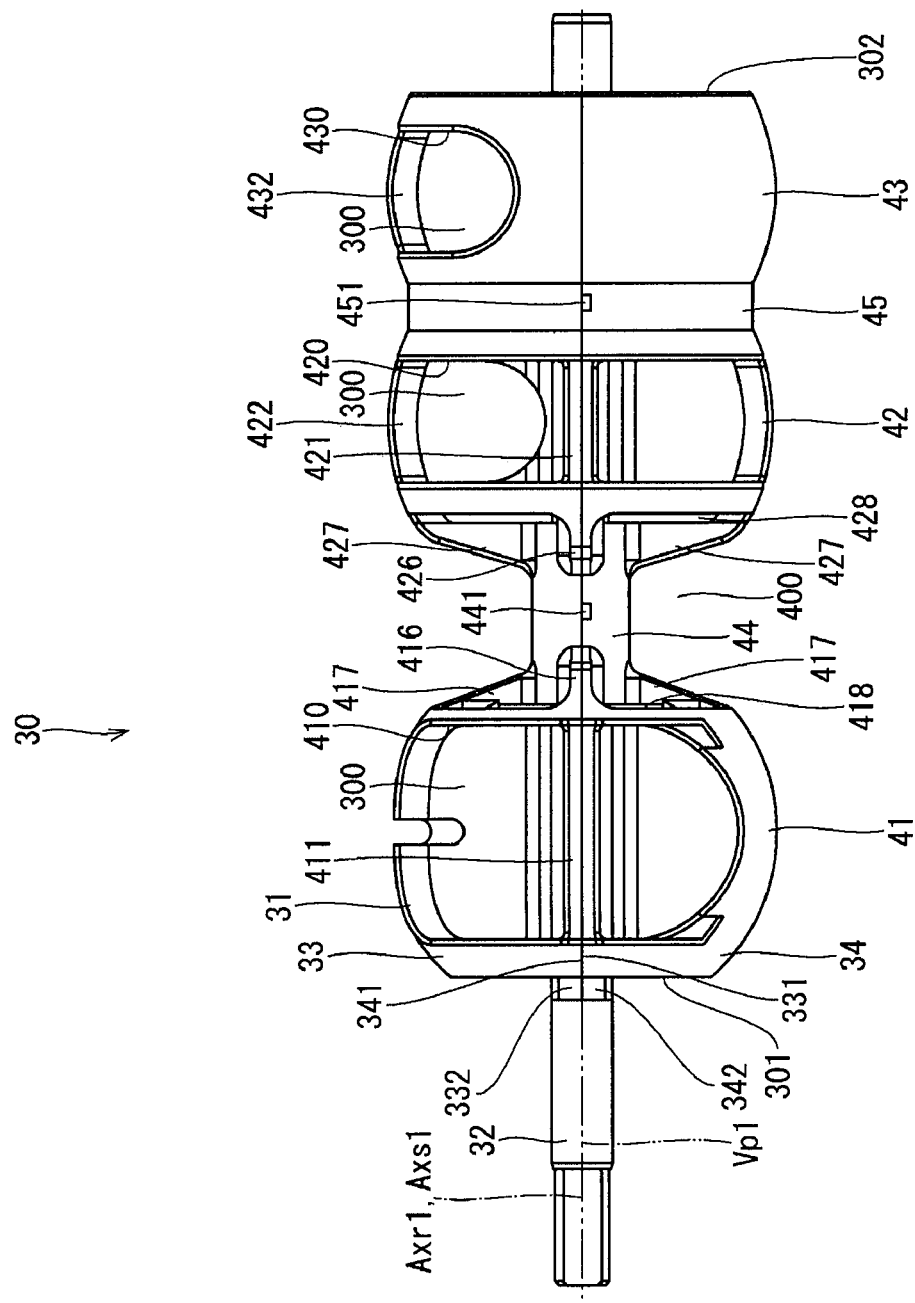
FIG. 20 is a diagram showing a valve in the valve device of a third embodiment.

FIG. 20 shows a part of the valve device according to a third embodiment.

<3-1>

In the third embodiment, the arrangement of the ball valves 41, 42, 43, the cylindrical connection part 44, and the cylindrical valve connection part 45 of the valve body 31 in the shaft 32 is different from that in the first embodiment. As shown in FIG. 20, the ball valve 41, the cylindrical connection part 44, the ball valve 42, the cylindrical valve connection part 45, and the ball valve 43, are arrayed, in this order, from the driving part 70 side to the opposite side to the driving part 70 in the rotational axis Axr1 direction.

In the ball valves 41, 42, and 43 of the valve body 31, at least a part of the outer peripheral wall is formed in a spherical shape, and at least a part of the inner peripheral wall is formed to be dented outward.

<3-1>

As described above, the present embodiment relates to the valve device 10 configured to control the cooling water in the engine 2 of the vehicle 1. The valve device 10 is provided with the housing 20, the valve 30, and the valve seal 36.

The housing 20 has ports (220, 221, 222, and 223) which connect the inner space 200 to the outside.

The valve 30 has the valve body 31 rotational about the rotational axis Axr1 in the inner space 200, the valve body flow path 300 formed inside the valve body 31, the valve body openings (410, 420, and 430) connecting the valve body flow path 300 to the outside of the valve body 31, and the shaft 32 provided on the rotational axis Axr1. The valve 30 is configured to change the communication status between the valve body flow path 300 and the ports (220, 221, 222, and 223) via the valve body openings (410, 420, and 430) with the rotational position of the valve body 31.

The valve seal 36 is formed in a ring shape, and is provided in positions corresponding to the ports (220, 221, 222, and 223) so as to be abuttable on the outer peripheral wall of the valve body 31. The seal opening 360, communicable with the valve body openings (410, 420, and 430) in accordance with rotational position of the valve body 31, is formed inside the valve seal 36. The valve seal 36 is configured to seal fluid-tightly between the valve seal 36 and the outer peripheral wall of the valve body 31.

In the valve body 31, at least a part of the outer peripheral wall is formed in a spherical shape, and at least a part of the inner peripheral wall is formed to be dented outward.

Accordingly, it is possible to improve the molding accuracy of the spherical surface of the outer peripheral wall of the valve body 31. This configuration enables to suppress leakage of the cooling water in the outer peripheral wall of the valve body 31.

Further, it is possible to enlarge the flow path area of the valve body flow path 300, and to reduce the water conduction resistance.

<3-2>

The ball valves 41, 42, and 43 of the valve body 31 are formed such that at least a part of the inner peripheral wall is formed in a spherical shape.

Accordingly, it is possible to make the thickness uniform in at least a part of the valve body 31. This configuration enables to further improve the accuracy of the spherical surface of the outer peripheral wall of the valve body 31, and to further enlarge the flow path area of the valve body flow path 300.

<3-3>

In the ball valves 41, 42, and 43, the distance between the inner peripheral wall and the outer peripheral wall is the same within a range of at least a part of the rotational axis Axr1 direction and the circumferential direction. That is, the inner peripheral wall and the outer peripheral wall of the ball valves 41, 42, and 43 are formed in a spherical shape having the same curvature in the above-described range. That is, the valve body 31 is formed such that the thickness is uniform (uniform thickness) at least in the above-described range.

Accordingly, it is possible to make the thickness uniform in at least a part of the valve body 31. This configuration enables to further improve the accuracy of the spherical surface of the outer peripheral wall of the valve body 31, and to further enlarge the flow path area of the valve body flow path 300.

<3-4>

In the ball valves 41, 42, and 43 of the valve body 31, the distance between the inner peripheral wall and the outer peripheral wall is the same in a range corresponding to at least the seal opening 360 in the rotational axis Axr1 direction and the circumferential direction.

Accordingly, it is possible to make the thickness of the valve body 31 uniform within the range. This configuration enables to further improve the accuracy of the spherical surface of the outer peripheral wall of the valve body 31, and to improve the sealability of the valve seal 36.

<3-4-1>

In the ball valves 41, 42, and 43 of the valve body 31, when all the seal openings 360 are covered with the outer peripheral wall of the valve body 31 and in a fully closed status, the distance between the inner peripheral wall and the outer peripheral wall is the same in the range corresponding to at least the seal opening 360 in the rotational axis Axr1 direction and the circumferential direction.

Accordingly, it is possible to further improve the sealability of the valve seal 36 in the fully closed status.

<3-5>

The shaft 32 is provided integrally with the valve body 31 by insert molding.

Accordingly, it is possible to improve the controllability of the valve body 31.

Further, it is possible to reduce the number of assembling steps of the shaft 32.

<3-6>

The valve body 31 has the first split body 33 and the second split body 34 divided into two in the virtual plane Vp1 including the rotational axis Axr1. The first split body 33 and the second split body 34 are bonded in respective bonding surfaces 331 and 341.

Accordingly, it is possible to manufacture the valve body 31 with high accuracy by die slide injection (DSI) to be described later.

<3-7>

Figure 23:
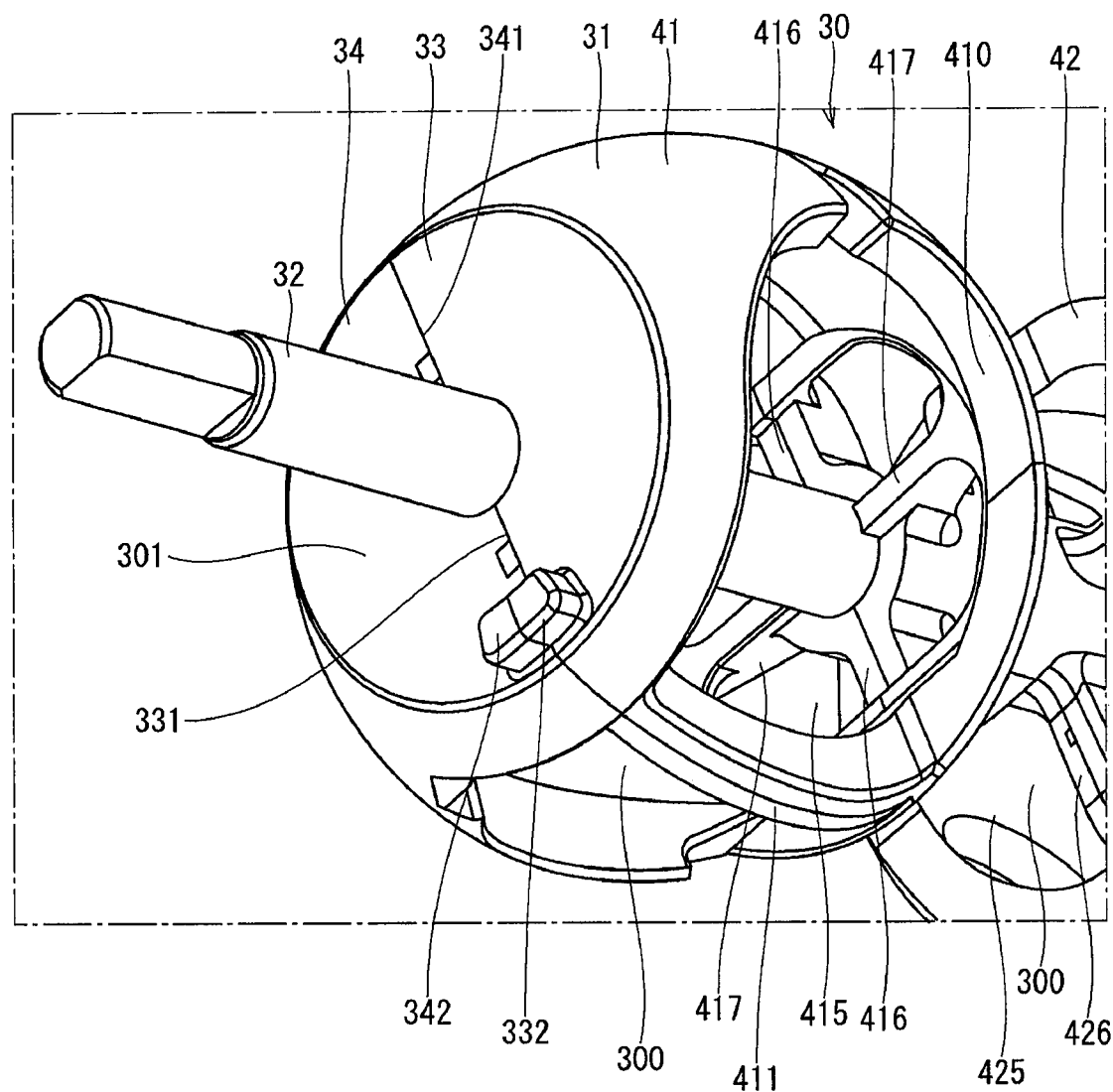
FIG. 23 is a perspective view showing the valve in the valve device of the third embodiment.

As shown in FIG. 20 and FIG. 23, the first split body 33 has the first regulation convex member 332 extending from the surface on the partition part 60 side to the regulation recess 63 side, with an end positioned in the regulation recess 63 (regarding the regulation recess 63, see FIG. 3 and FIG. 6). The second split body 34 has the second regulation convex member 342 extending from the surface on the partition part 60 side to the regulation recess 63 side, with an end positioned in the regulation recess 63.

Accordingly, it is possible to regulate the rotation of the valve body 31 by abutting of the first regulation convex member 332 and the second regulation convex member 342 on the regulating part 631 of the regulation recess 63. Note that the first regulation convex member 332 and the second regulation convex member 342 are respectively formed in the first split body 33 and the second split body 34, accordingly, when the first regulation convex member 332 and the second regulation convex member 342 come into contact with the regulating part 631 of the regulation recess 63, it is possible to suppress separation (exfoliation) of the first split body 33 and the second split body 34 on the bonding surfaces 331 and 341.

<3-8>

The first regulation convex member 332 extends along the bonding surface 331 to the regulation recess 63 side. The second regulation convex member 342 extends along the bonding surface 331 to the regulation recess 63 side while abutting on the first regulation convex member 332.

Accordingly, when the first regulation convex member 332 and the second regulation convex member 342 come into contact with the regulating part 631 of the regulation recess 63, it is possible to effectively suppress separation of the first split body 33 and the second split body 34 on the bonding surfaces 331 and 341.

<3-9>

Figure 21:
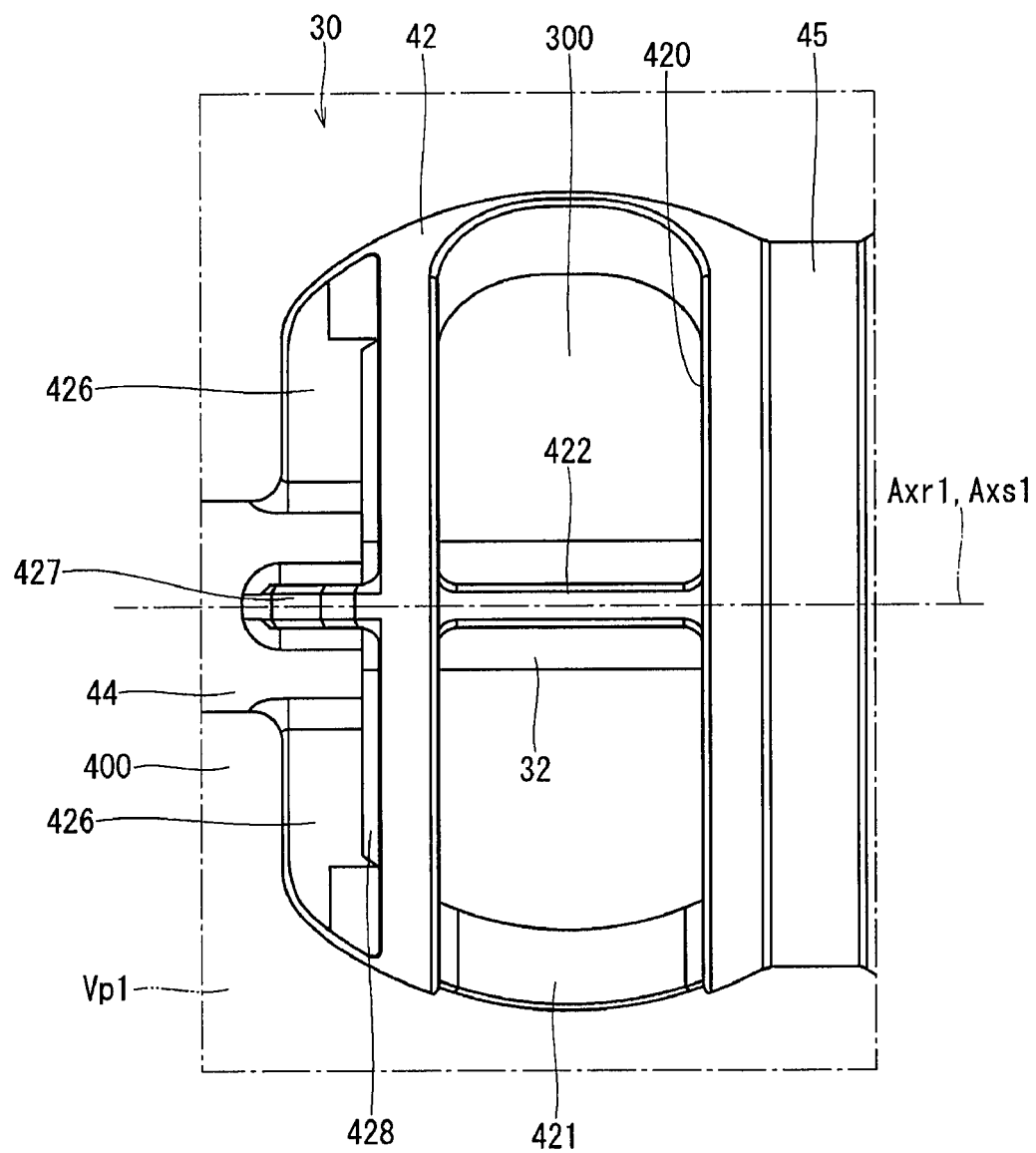
FIG. 21 is a diagram showing a part of the valve in the valve device of the third embodiment.
Figure 22:
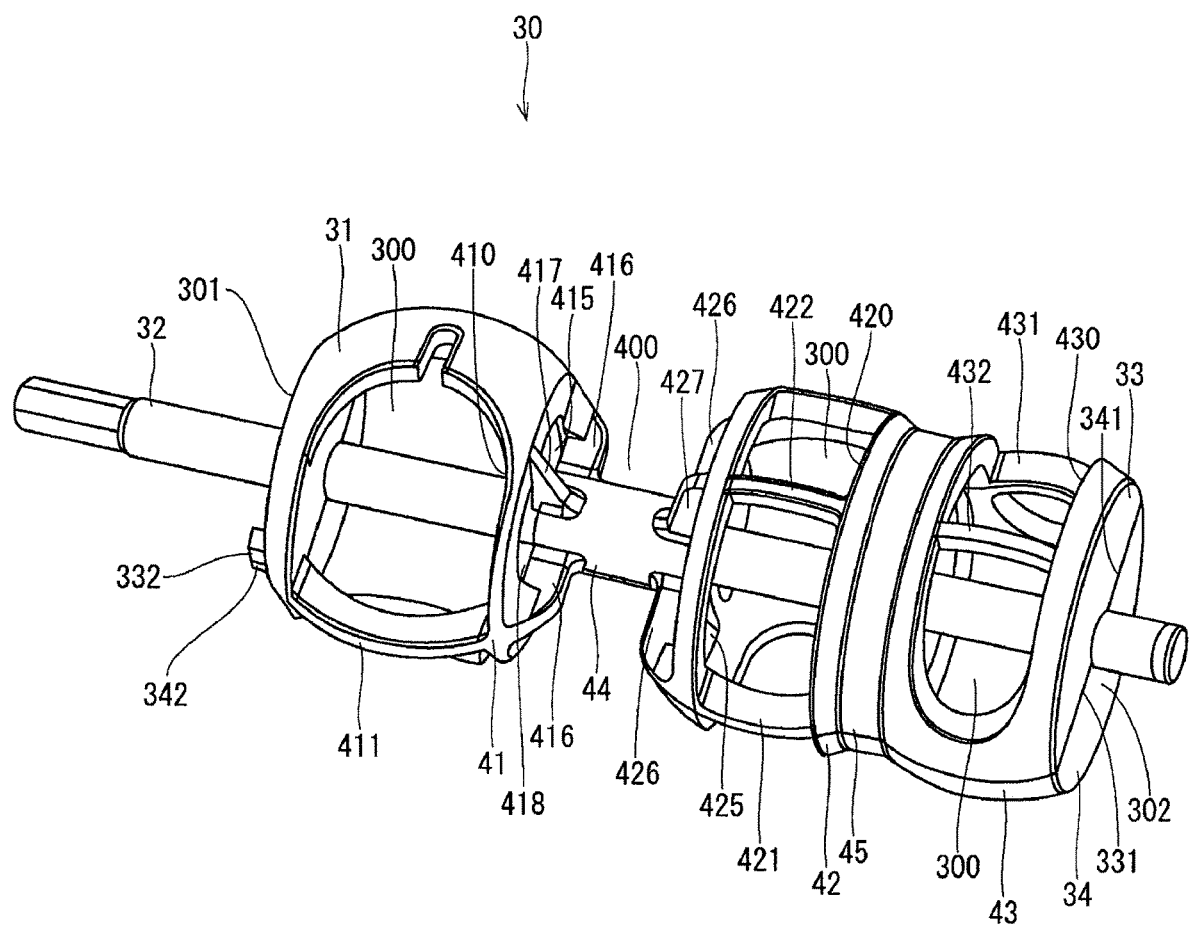
FIG. 22 is a perspective view showing the valve in the valve device of the third embodiment.

As shown in FIG. 20, FIG. 21, and FIG. 22, the valve body 31 has a valve body opening rib 411 which connects the inner edge of the valve body opening 410. The valve body 31 has valve body opening ribs 421 and 422 which connect the inner edge of the valve body opening 420. The valve body 31 has valve body opening ribs 431 and 432 to connect the inner edge of the valve body opening 430. Accordingly, it is possible to improve the strength of the valve body openings 410, 420, and 430.

The valve body opening ribs 411, 421, and 431 are formed on the virtual plane which includes the axis Axs1 of the shaft 32 (rotational axis Axr1), i.e., on the virtual plane Vp1 which includes the bonding surfaces 331 and 341. That is, the valve body opening ribs 411, 421, and 431 are formed so as to hold the bonding surfaces 331 and 341 between them. The valve body opening ribs 422 and 432 are formed on the virtual plane which includes the axis Axs1 of the shaft 32 (rotational axis Axr1) and which is orthogonal to the virtual plane Vp1.

Figure 24:
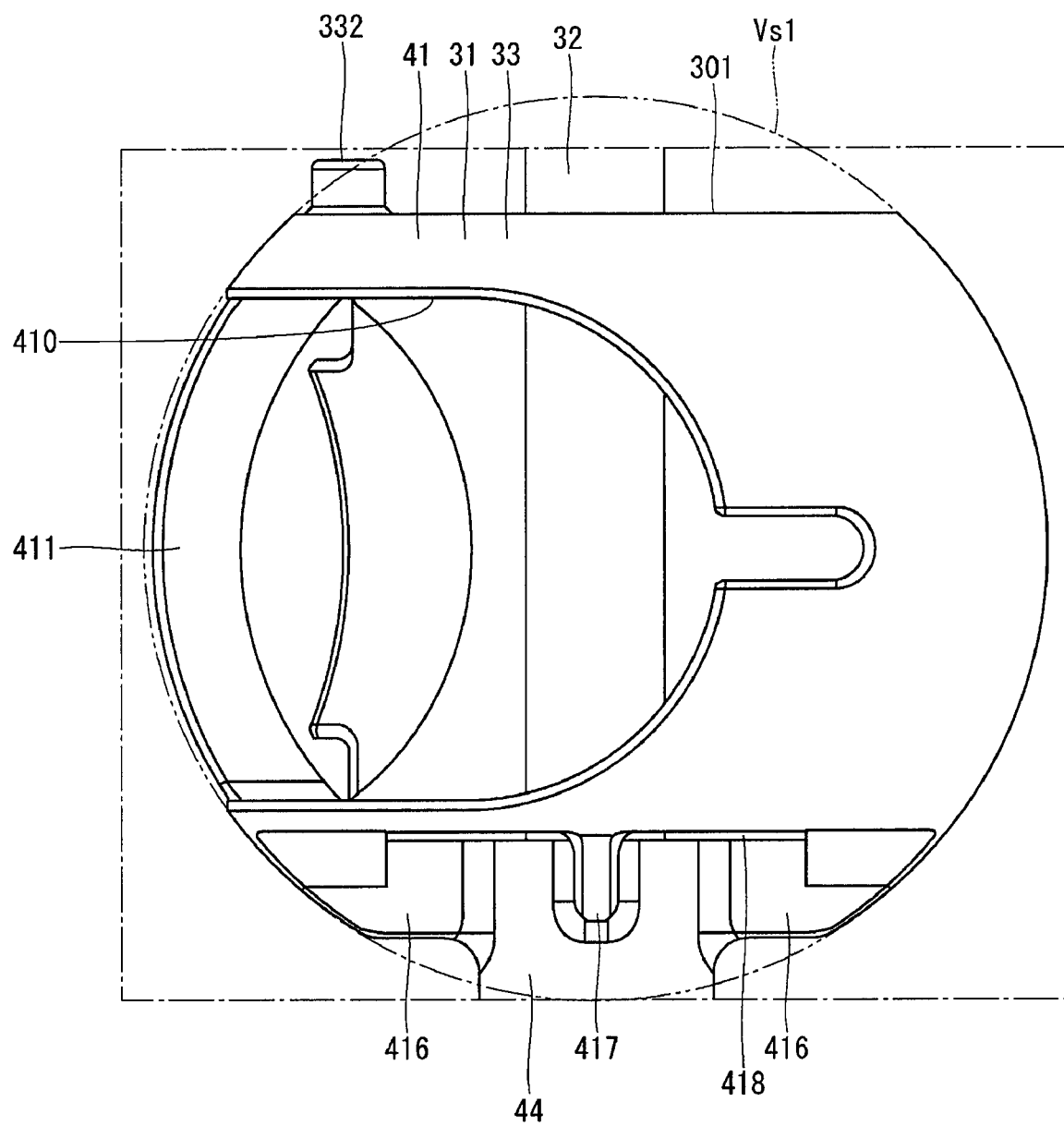
FIG. 24 is a diagram showing a part of the valve in the valve device of the third embodiment.
Figure 25:
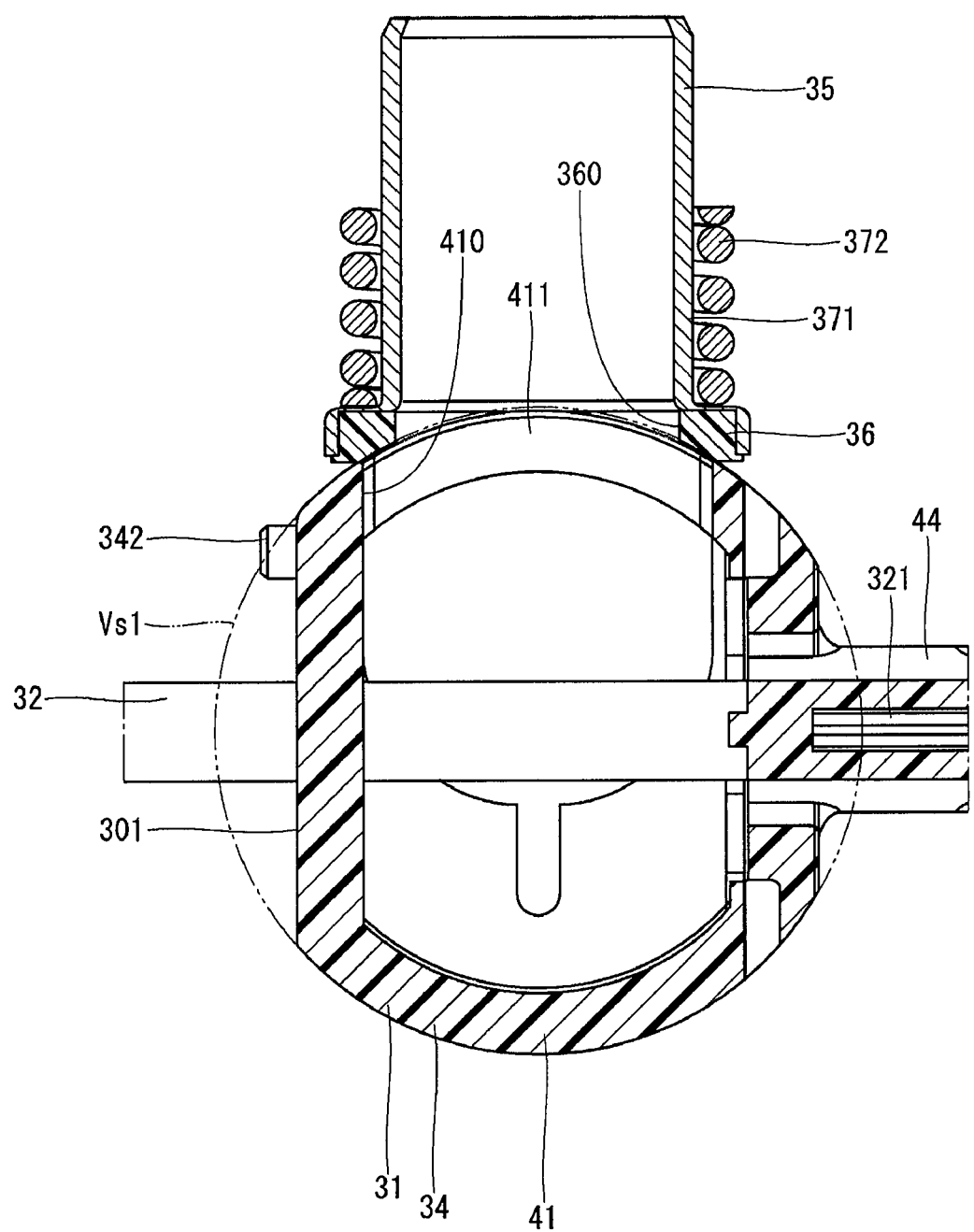
FIG. 25 is a cross-sectional view showing a part of the valve and the seal unit in the valve device of the third embodiment.

As shown in FIG. 24 and FIG. 25, the valve body opening rib 411 is formed in a position away from the virtual spherical surface Vs1 along the outer peripheral wall of the ball valve 41 of the valve body 31 to the radially inside.

Accordingly, upon rotation of the valve body 31, it is possible to suppress the increase of the sliding resistance due to stoppage of the valve seal 36 caught with the valve body opening rib 411.

<3-9-1>

As shown in FIG. 24 and FIG. 25, the valve body opening rib 411 is formed in an arc shape away from the virtual spherical surface Vs1 by a predetermined distance. Note that the valve body opening ribs 421 and 422, and the valve body opening ribs 431 and 432 are formed in an arc shape away from the virtual spherical surface along the outer peripheral wall of the ball valves 42 and 43, by a predetermined distance.

Accordingly, it is possible to suppress the increase of the sliding resistance upon rotation of the valve body 31, and to increase the flow path area inside the valve body opening ribs 411, 421, 422, 431, and 432.

<3-11>

Figure 26:
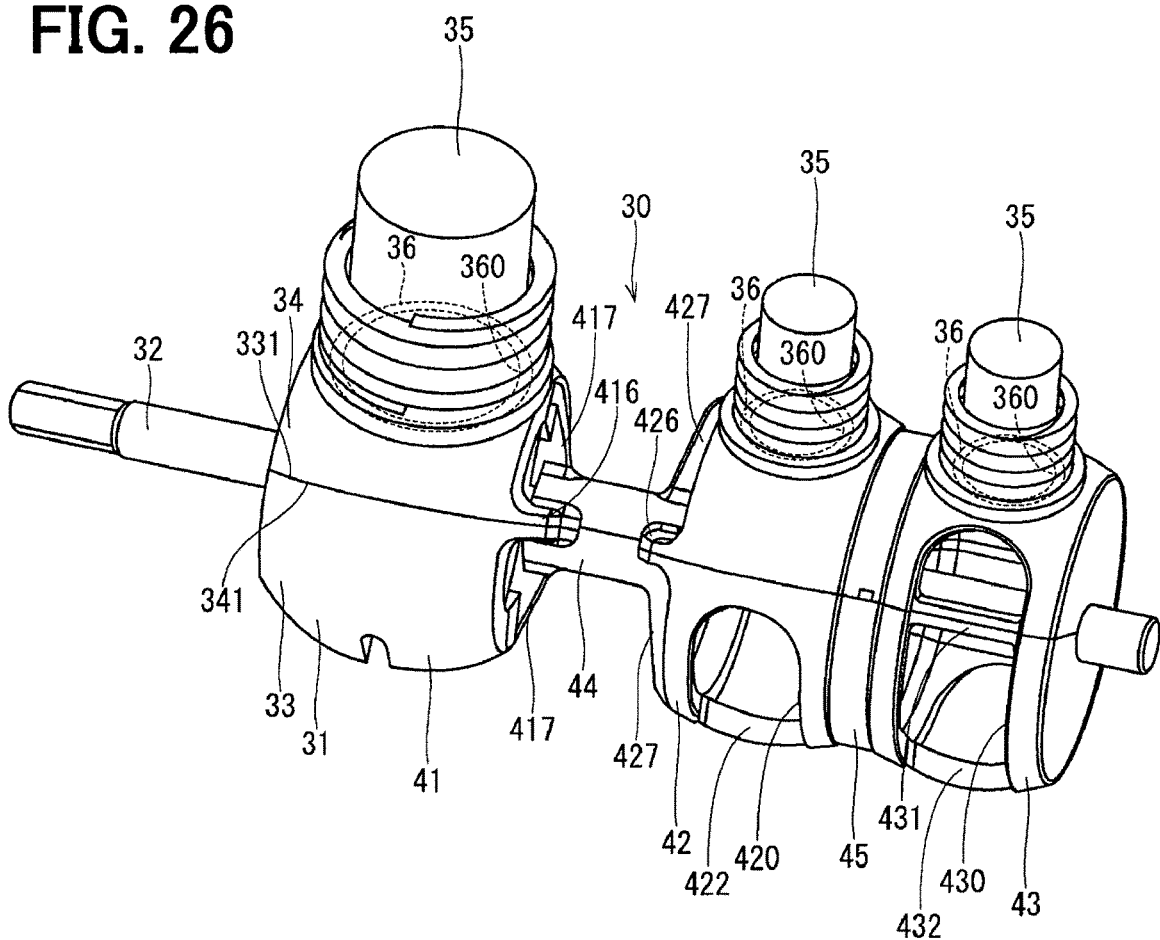
FIG. 26 is a perspective view showing the valve and the seal unit in the valve device of the third embodiment.

As shown in FIG. 26, when all the seal openings 360 of all the valve seals 36 are covered with the outer peripheral wall of the valve body 31 and in a fully closed status, the bonding surfaces 331 and 341 are in positions away from the valve seal 36.

Accordingly, with a step which can be formed in the outer peripheral wall in the bonding surfaces 331 and 341 of the valve body 31, it is possible to suppress leakage of the cooling water from the position between the valve seal 36 and the outer peripheral wall of the valve body 31 when the valve body 31 is in the fully closed status.

<3-12>

As shown in FIG. 20, the valve body 31 has a specific shape part 441 which is formed on the bonding surfaces 331 and 341 in the cylindrical connection part 44 and which has an outer wall with a curvature different from the curvature of the outer peripheral wall of the cylindrical connection part 44. The valve body 31 has a specific shape part 451 which is formed on the bonding surfaces 331 and 341 in the cylindrical valve connection part 45 and which has an outer wall with a curvature different from the curvature of the outer peripheral wall of the cylindrical valve connection part 45.

Accordingly, upon rotation of the valve body 31, the specific shape parts 441 and 451 and the valve seal 36 do not slide. The configuration enables to suppress operation failure of the valve body 31 and to suppress abrasion of the valve seal 36.

<3-12-1>

In the respective specific shape parts 441 and 451, the outer wall is formed to project outward from the outer peripheral wall of the cylindrical connection part 44 and the cylindrical valve connection part 45.

<3-12-2>

In the respective specific shape parts 441 and 451, the outer wall may be formed to be dented inward from the outer peripheral wall of the cylindrical connection part 44 and the cylindrical valve connection part 45.

<3-12-3>

In the respective specific shape parts 441 and 451, the outer wall may be planarly formed.

<3-13>

As shown in FIG. 22, the valve body 31 has an end surface opening 415, formed in an end surface of the ball valve 41 in the rotational axis Axr1 direction so as to connect the space between valves 400 formed between the ball valve 41 and the ball valve 42 to the valve body flow path 300 of the ball valve 41, and an end surface opening 425 formed in an end surface of the ball valve 42 in the rotational axis Axr1 direction so as to connect the space between valves 400 to the valve body flow path 300 of the ball valve 42, on the radially outside of the cylindrical connection part 44. Note that the end surface openings 415 and 425 respectively correspond to a "first end surface opening" and a "second end surface opening".

The inlet port 200 (see FIG. 3) communicates with the space between valves 400. Accordingly, the cooling water flowing from the inlet port 220 into the inner space 200 can flow via the space between valves 400, the end surface openings 415 and 425, into the valve body flow path 300.

The space between valves 400 is opened over the entire region in the circumferential direction. Accordingly, it is possible to reduce the water conduction resistance of the cooling water flowing from the inlet port 220 into the inner space 200 and flows toward the valve body flow path 300.

<3-14>

Figure 27:
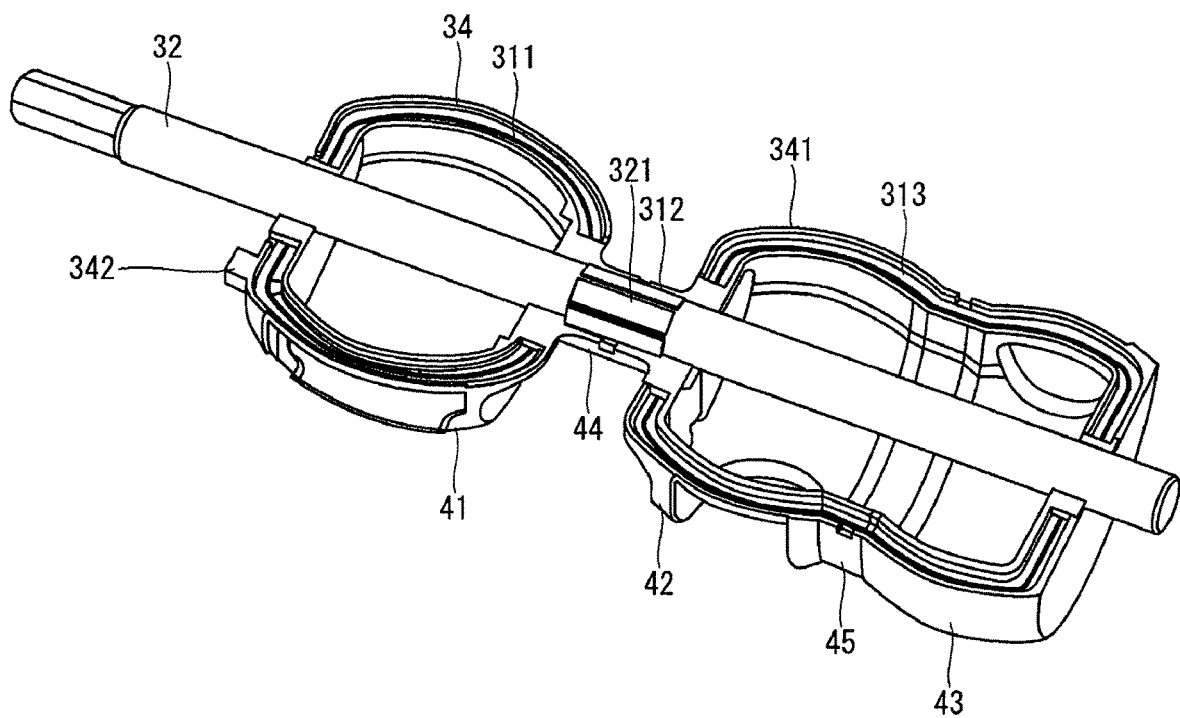
FIG. 27 is a perspective view showing a part of the valve in the valve device of the third embodiment.

As shown FIG. 27, the shaft 32 is formed integrally with the valve body 31 by insert molding in the cylindrical connection part 44. That is, the shaft 32 is welded to the cylindrical connection part 44, however, is not welded to other parts of the valve body 31 than the cylindrical connection part 44.

When an insert molding part with the shaft 32 is provided in the valve body flow path 300, the flow path area of the valve body flow path 300 becomes small, and there is a risk of increase of the water conduction resistance. In the present embodiment, as the insert molding part with the shaft 32 is provided in the cylindrical connection part 44 outside the valve body flow path 300, it is possible to reduce the water conduction resistance.

<3-15>

As shown in FIG. 27, the shaft 32 has a rotation stop member 321 capable of regulating the relative rotation with respect to the cylindrical connection part 44. The rotation stop member 321 is formed to have a polygonal cross-sectional shape. In the present embodiment, the rotation stop member 321 is formed to have a hexagonal cross-sectional shape. Note that the rotation stop member 321 is formed by cutting the outer peripheral wall of the e.g. the columnar shaft 32, planarly in six positions in the circumferential direction. Accordingly, the outer wall of the rotation stop member 321 is positioned on the radially inside of the outer peripheral wall of the shaft 32. Note that the inner wall of the cylindrical connection part 44 is formed to have a hexagonal cross-sectional shape so as to correspond to the shape of the rotation stop member 321.

Accordingly, it is possible to regulate the relative rotation between the valve body 31 and the shaft 32 with a simple configuration.

<3-16>

Figure 28:
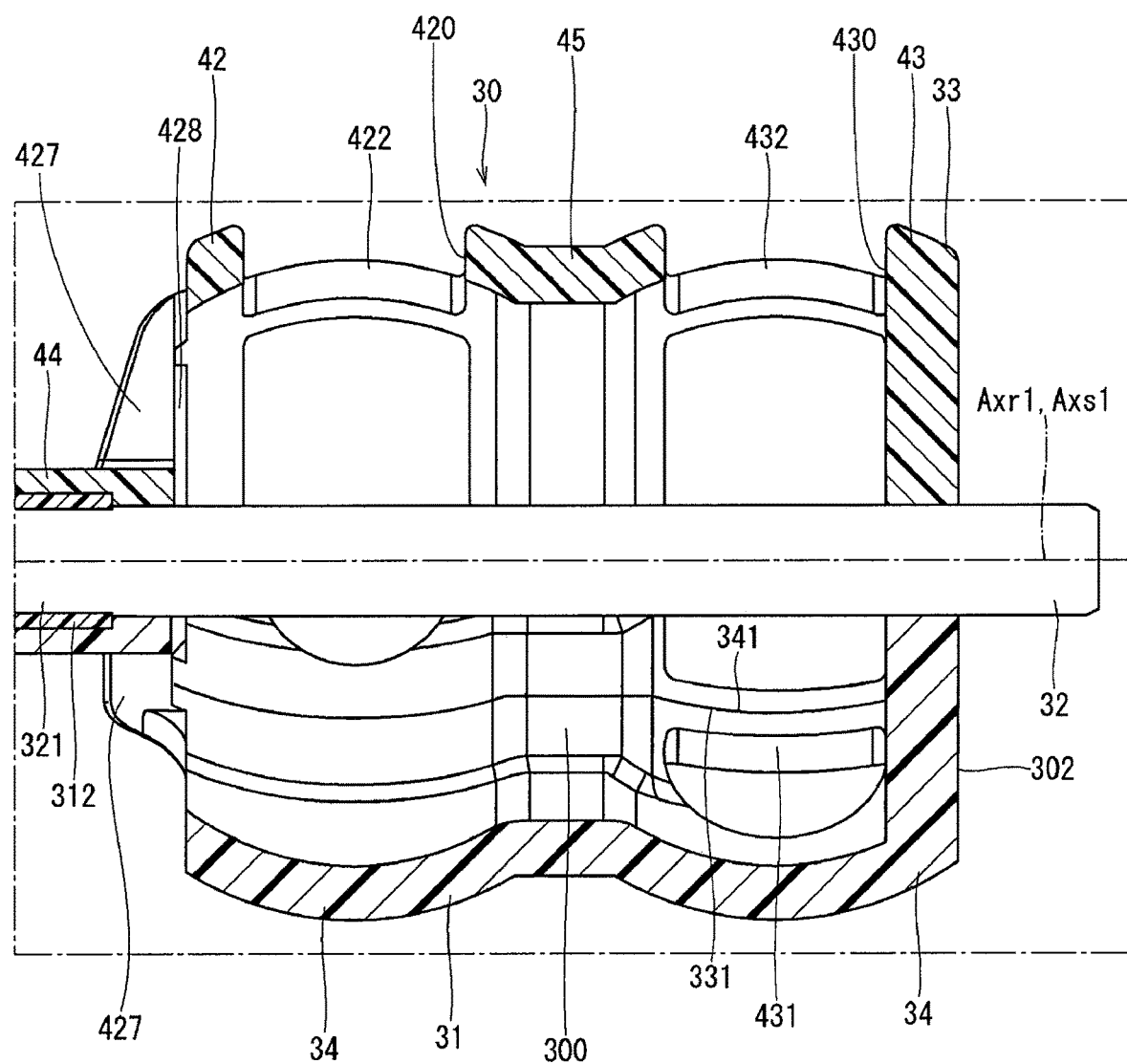
FIG. 28 is a cross-sectional view showing a part of the valve in the valve device of the third embodiment.

As shown in FIG. 28, the valve body 31 has the cylindrical valve connection part 45, which is connected to the ball valve 42 on the opposite side to the cylindrical connection part 44 with respect to the ball valve 42, and in which the outer peripheral wall and the inner peripheral wall are formed cylindrically and the valve body flow path 300 is formed inside, and a ball valve 43, which is connected to the cylindrical valve connection part 45 on the opposite side to the ball valve 42 with respect to the cylindrical valve connection part 45, and in which the outer peripheral wall is formed in a spherical shape.

In the cylindrical valve connection part 45, the outer peripheral wall and the inner peripheral wall are formed in a cylindrical shape. Accordingly, it is possible to ensure the flow path area of the inside valve body flow path 300.

<3-17>

As shown in FIG. 20, the outer diameter of the outer peripheral wall of the ball valve 41 is the same as the outer diameter of the outer peripheral wall of the ball valve 43. Note that the outer diameter of the outer peripheral wall of the ball valve 42 is also the same as the outer diameter of the outer peripheral wall of the ball valve 41 and the outer diameter of the outer peripheral wall of the ball valve 43.

The area of a first outermost end surface 301 as an end surface of the ball valve 41 on the opposite side to the ball valve 43 in the rotational axis Axr1 direction is different from the area of a second outermost end surface 302 as an end surface of the ball valve 43 on the opposite side to the ball valve 41 in the rotational axis Axr1 direction. Note that the area of the second outermost end surface 302 is larger than the area of the first outermost end surface 301. Accordingly, the length of the ball valve 43 in the rotational axis Axr1 direction is shorter than the length of the ball valve 41.

Accordingly, it is possible to reduce the size of the valve body 31 in the axial direction, and to reduce the physical constitution of the valve device 10.

<3-18>

As shown in FIG. 20 and FIG. 22, the valve body 31 has the valve body opening rib 422 which connects the inner edge of the valve body opening 420 of the ball valve 42, and the valve body opening rib 432 which connects the inner edge of the valve body opening 430 of the ball valve 43. Note that the valve body opening rib 422 and the valve body opening rib 432 respectively correspond to a "second valve body opening rib" and a "third valve body opening rib".

The valve body opening rib 422 and the valve body opening rib 432 are formed in the same position in the circumferential direction of the valve body 31. That is, the valve body opening ribs 422 and 432 are formed so as to be arrayed in a direction parallel to the rotational axis Axr1. Note that the valve body opening rib 411 and the valve body opening rib 421 are formed in the same position in the circumferential direction of the valve body 31.

Accordingly, it is possible to suppress the turbulence of the cooling water flowing around the valve body opening ribs 422 and 432, and to reduce the water conduction resistance.

<3-19>

As shown in FIG. 20, FIG. 21, and FIG. 22, the valve body 31 has end surface opening ribs 416 and 417 which connect the cylindrical connection part 44 to the ball valve 41 over the end surface opening 415, and end surface opening ribs 426 and 427 which connect the cylindrical connection part 44 to the ball valve 42 over the end surface opening 425. Note that the end surface opening ribs 416 and 417 respectively correspond to the "first end surface opening rib" and the end surface opening ribs 426 and 427, to the "second end surface opening".

Respectively two end surface opening ribs 416 and 426 are formed so as to hold the cylindrical connection part 44 between them. Respectively two end surface opening ribs 417 and 427 are formed so as to hold the cylindrical connection part 44 between them.

Note that the end surface opening ribs 416 and 426 are formed on the virtual plane Vp1. That is, the end surface opening ribs 416 and 426 are formed so as to hold the bonding surfaces 331 and 341 between them. Accordingly, the valve body opening ribs 411 and 421 and the end surface opening ribs 416 and 426 are formed in the same position in the circumferential direction of the valve body 31.

<3-19-1>

As shown in FIG. 20 and FIG. 22, the end surface opening rib 417, the end surface opening rib 427, the valve body opening rib 422, and the valve body opening rib 432, are formed in the same position in the circumferential direction of the valve body 31. That is, the end surface opening ribs 417 and 427, and the valve body opening ribs 422 and 432 are formed so as to be arrayed in a direction parallel to the rotational axis Axr1. Note that the end surface opening ribs 417 and 427, and the valve body opening ribs 422, and 432 are formed on a virtual plane which includes the axis Axs1 of the shaft 32 (rotational axis Axr1) and which is orthogonal to the virtual plane Vp1.

Accordingly, it is possible to suppress the turbulence of the cooling water flowing around the end surface opening ribs 417 and 427, and the valve body opening ribs 422 and 432, and to reduce the water conduction resistance.

<3-20>

As shown in FIG. 20, FIG. 21, and FIG. 22, the end surface opening ribs 416 and 417 form a rib end surface gap 418 between the end surface opening ribs 416 and 417 and the end surface of the ball valve 41 in the rotational axis Axr1 direction. The end surface opening ribs 426 and 427 form a rib end surface gap 428 between the end surface opening ribs 426 and 427 and the end surface of the ball valve 42 in the rotational axis Axr1 direction. Note that the end surface opening rib 418 corresponds to a "first rib end surface gap" and the rib end surface gap 428, to a "second rib end surface gap".

As shown in FIG. 20 and FIG. 21, viewed along a direction vertical to the rotational axis Axr1, the rib end surface gap 428 is observed between the end surface opening ribs 426 and 427 and the end surface of the ball valve 42 in the rotational axis Axr1 direction.

Accordingly, it is possible to reduce the water conduction resistance in the end surface openings 415 and 425.

<3-21>

As shown in FIG. 20 and FIG. 22, the end surface opening rib 417 is formed such that the surface on the ball valve 42 side is inclined with respect to the rotational axis Axr1. The end surface opening rib 427 is formed such that the surface on the ball valve 41 side is inclined with respect to the rotational axis Axr1.

Accordingly, it is possible to reduce the water conduction resistance around the end surface opening ribs 417 and 427.

Next, a manufacturing method of the valve 30 will be described. In the present embodiment, the valve 30 is manufactured by using so-called die slide injection (DSI).

Figure 29:
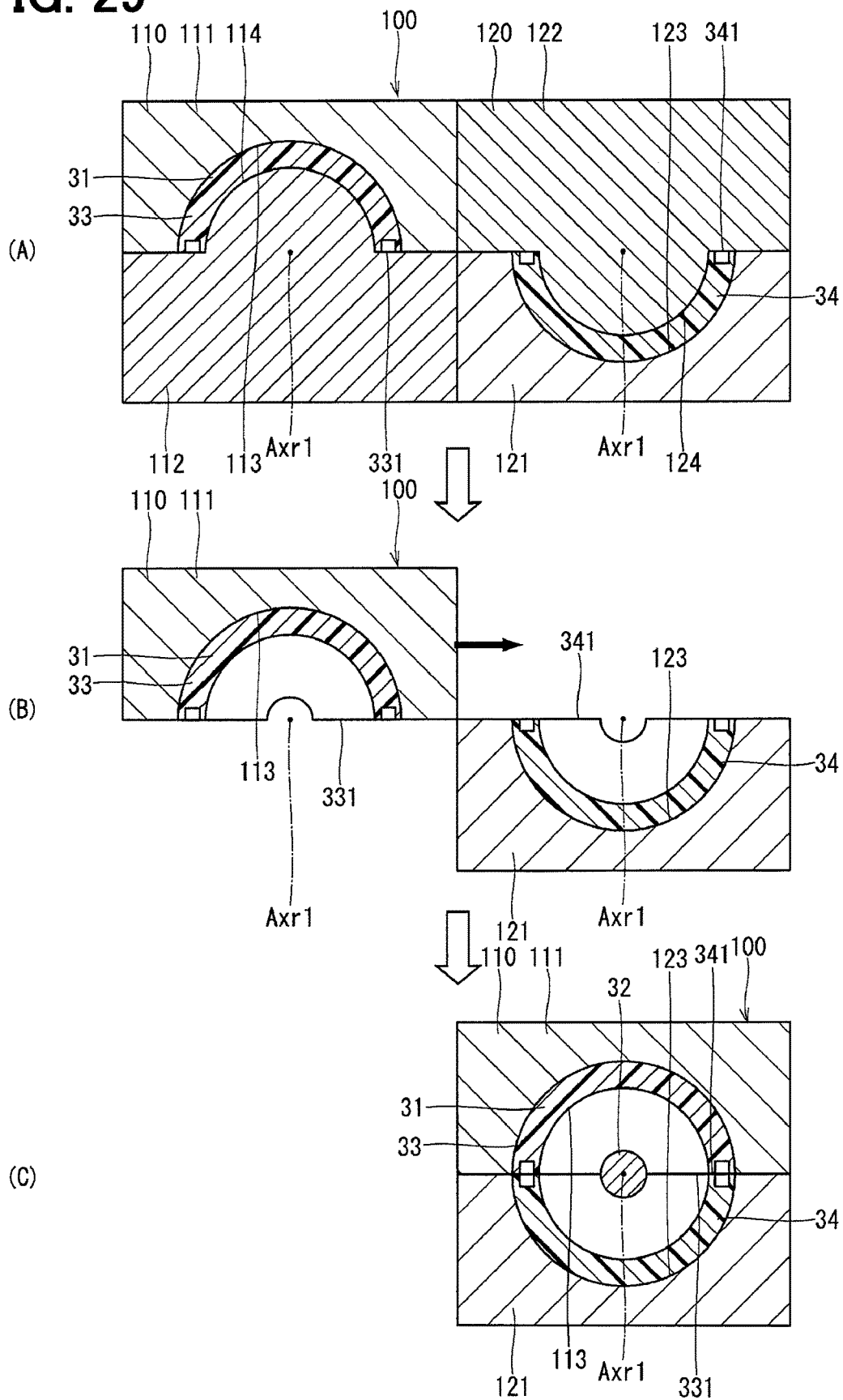
FIG. 29 is a diagram for explaining a manufacturing process of the valve in the valve device of the third embodiment.

As shown in FIG. 29, a molding device 100 is provided with a first mold 110, a second mold 120, and the like. The first mold 110 has a first outer mold 111 and a first inner mold 112. The second mold 120 has a second outer mold 121 and a second inner mold 122.

The first outer mold 111 has a first concave surface 113 dented in a semi-spherical shape from an end surface on the first inner mold 112 side. The first concave surface 113 is formed so as to correspond to the shape of the outer peripheral wall of the ball valves 41, 42, and 43 in the outer peripheral wall of the first split body 33.

The first inner mold 112 has a first convex surface 114 which projects in a semi-spherical shape from an end surface on the first outer mold 111 side. The first convex surface 114 is formed so as to correspond to the shape of the inner peripheral wall of the ball valves 41, 42, and 43 in the outer peripheral wall of the first split body 33. Note that it is set such that when the first outer mold 111 and the first inner mold 112 abut on each other, the distance between the first concave surface 113 and the first convex surface 114 is the same within a range of at least a part of the rotational axis Axr1 direction and the circumferential direction of the valve body 31.

The second outer mold 121 has a second concave surface 123 dented in a semi-spherical shape from an end surface on the second inner mold 122 side. The second concave surface 123 is formed so as to correspond to the shape of the outer peripheral wall of the ball valves 41, 42, and 43 in the outer peripheral wall of the second split body 34.

The second inner mold 122 has a second convex surface 124 which projects in a semi-spherical shape from an end surface on the second outer mold 121 side. The second convex surface 124 is formed so as to correspond to the shape of the inner peripheral wall of the ball valves 41, 42, and 43 in the outer peripheral wall of the second split body 34. Note that it is set such that when the second outer mold 121 and the second inner mold 122 abut on each other, the distance between the second concave surface 123 and the second convex surface 124 is the same within a range of at least a part of the rotational axis Axr1 direction and the circumferential direction of the valve body 31.

The manufacturing method of the valve 30 includes the following processes.

<3-22>

(Primary Molding Process)

In a primary molding process, the first split body 33 and the second split body 34 are resin-molded respectively with the first mold 110 and the second mold 120. More particularly, as shown in (a) in FIG. 29, the first outer mold 111 and the first inner mold 112 are brought into contact with each other, then the second outer mold 121 and the second inner mold 122 are brought into contact with each other, and molten resin is injected between the first concave surface 113 and the first convex surface 114, and between the second concave surface 123 and the second convex surface 171.

Figure 30:
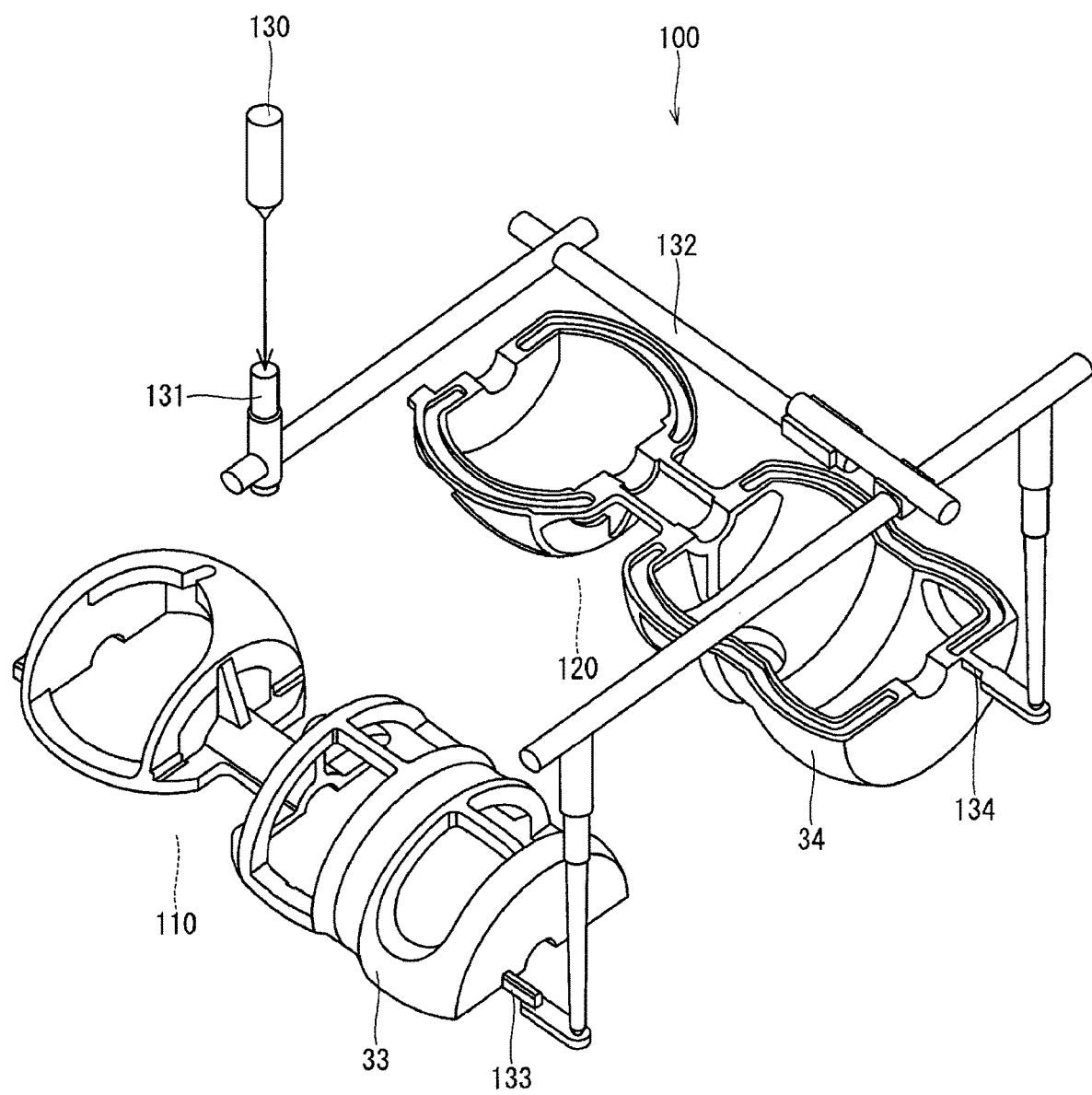
FIG. 30 is a diagram for explaining the manufacturing process of the valve in the valve device of the third embodiment.

As shown in FIG. 30, the resin injected from an injection part 130 of the molding device 100 flows, via a spool 131, a runner 132, gates 133 and 134, to the first mold 110 and the second mold 120. When the first split body 33 and the second split body 34 are cooled and solidified, the primary molding process is completed.

<3-22-1>

In the primary molding process, when the first split body 33 and the second split body 34 are resin-molded, the distance between the first concave surface 113 and the first convex surface 114 and the second concave surface 123 and the second convex surface 171 are the same within a range of at least a part of the rotational axis Axr1 direction and the circumferential direction.

Accordingly, it is possible to make the thickness uniform in at least a part of the valve body 31. This configuration enables to further improve the accuracy of the spherical surface of the outer peripheral wall of the valve body 31, and to further enlarge the flow path area of the valve body flow path 300.

<3-23>

(Slide Process)

In a slide process after the primary molding process, the first split body 33 or the second split body 34, in the first mold 110 or the second mold 120, is slid such that the respective bonding surfaces 331 and 341 of the first split body 33 and the second split body 34 face each other. More particularly, as shown in (b) in FIG. 29, the first inner mold 112 is removed from the first outer mold 111, the second inner mold 122 is removed from the second outer mold 121, and the first split body 33, in the first outer mold 111, is slid such that the respective bonding surfaces 331 and 341 of the first split body 33 and the second split body 34 face each other.

In the slide process, it is possible to efficiently manufacture the valve 30.

<3-24>

(Shaft Placement Process)

In a shaft placement process after the slide process, the shaft 32 is placed on the rotational axis Axr1 of the valve body 31. More particularly, as shown in (c) in FIG. 29, the shaft 32 is placed on the rotational axis Axr1 between the first split body 33 and the second split body 34.

Accordingly, in comparison with a case where the shaft 32 is assembled after the molding of the valve body 31, it is possible to reduce the number of assembling steps of the shaft 32.

<3-22>

(Secondary Molding)

In a secondary molding process after the shaft placement process, the resin is injected between a welded part in the bonding surface of the first split body 33 and a welded part in the bonding surface of the second split body 34, to weld the first split body 33 and the second split body 34 together.

Figure 31:
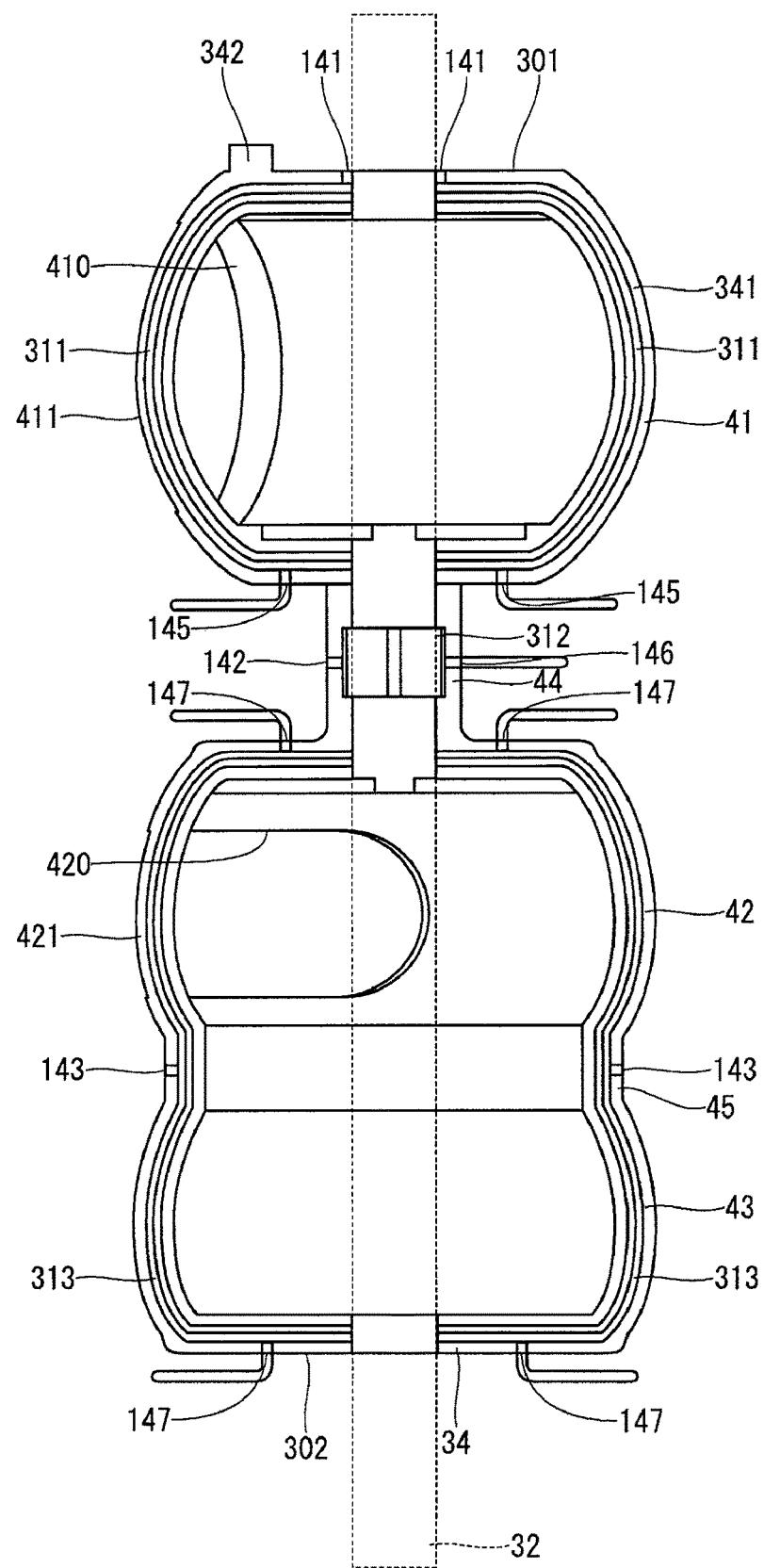
FIG. 31 is a diagram for explaining the manufacturing process of the valve in the valve device of the third embodiment.

As shown in FIG. 31, in the second split body 34 after the primary molding process, welded parts 311, 312, and 313 are formed in the bonding surface 341. The welded part 311 is formed in a groove shape so as to be dented from the bonding surface 341 in a part corresponding to the ball valve 41 of the second split body 34. The welded part 312 is formed in a groove shape so as to be dented from the bonding surface 341 in a part corresponding to the cylindrical connection part 44 of the second split body 34. The welded part 313 is formed in a groove shape so as to be dented from the bonding surface 341 in a part corresponding to the ball valve 42, the cylindrical valve connection part 45, and the ball valve 43 of the second split body 34. As in the case of the second split body 34, the welded parts 311, 312, and 313 are formed in the first split body 33.

A gate entrance 141 of the molding device 100 is provided at one end of the welded part 311, and a gate exit 145 is provided at the other end of the welded part 311. A gate entrance 142 of the molding device 100 is provided at one end of the welded part 312, and a gate exit 146 is provided at the other end of the welded part 312. A gate entrance 143 of the molding device 100 is provided at the center of the welded part 313, and a gate exit 147 is provided at both ends of the welded part 313. Note that the gate entrance 142 and the gate exit 146 are provided at the center of the cylindrical connection part 44 in the axial direction. Further, the gate entrance 143 is provided at the center of the cylindrical valve connection part 45 in the axial direction. Note that the gate entrance 141 is provided on the first outermost end surface 301 of the ball valve 41. The gate exit 145 is provided on an end surface of the ball valve 41 on the opposite side to the first outermost end surface 301. The gate exit 147 is provided on the second outermost end surface 302 of the ball valve 43 and on an end surface of the ball valve 42 on the ball valve 41 side.

Figure 32:
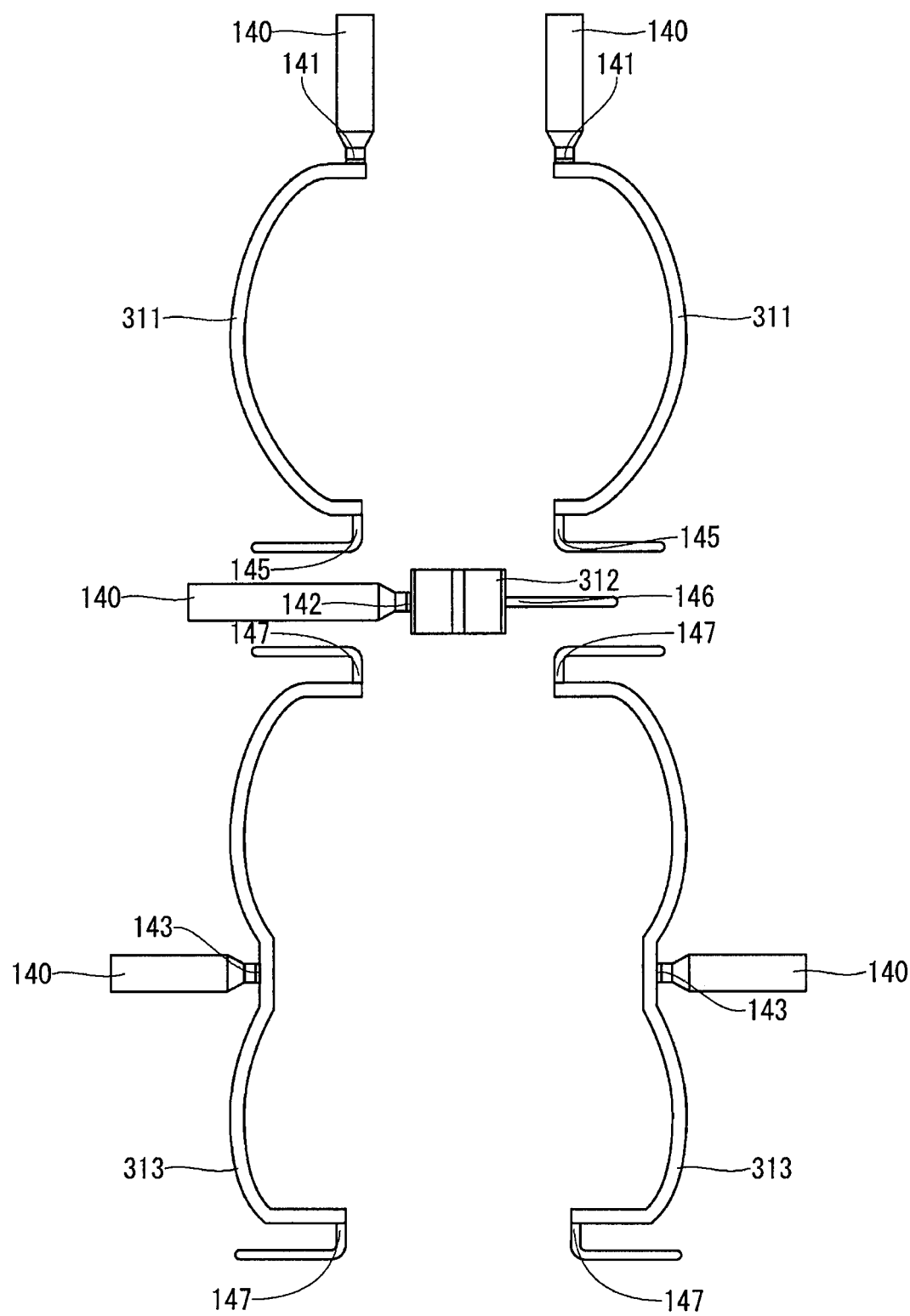
FIG. 32 is a diagram for explaining the manufacturing process of the valve in the valve device of the third embodiment.

As shown in FIG. 32, in the secondary molding process, the molten resin is injected from the injection part 140 of the molding device 100 via the gate entrances 141, 142, and 143, to the welded parts 311, 312, and 313. The resin made to flow from the gate entrances 141, 142, and 143 into the welded parts 311, 312, and 313 flows respectively to the gate exits 145, 146, and 147, and flows out from the gate exits 145, 146, and 147. When the resin in the welded parts 311, 312, and 313 is cooled and solidified, the first split body 33 and the second split body 34 are welded to the shaft 32, and the secondary molding process is completed. Note that the resin remained in positions corresponding to the gate entrance 142 and the gate exit 146 of the cylindrical connection part 44 of the valve body 31 form the specific shape part 441. Further, the resin remained in the position corresponding to the gate entrance 143 of the cylindrical valve connection part 45 of the valve body 31 forms the specific shape part 451.

<3-22>

As described above, the present embodiment is a manufacturing method of the valve 30 which has the valve body 31 rotational about the rotational axis Axr1, and the valve body flow path 300 formed inside the valve body 31, and includes the primary molding process and the secondary molding process.

The valve body 31 has the first split body 33 and the second split body 34, in which at least a part of the outer peripheral wall is formed in a spherical shape and at least a part of the inner peripheral wall is formed to be dented outward, and which are divided into two in the virtual plane Vp1 including the rotational axis Axr1. The first split body 33 and the second split body 34 are bonded in the respective bonding surfaces 331 and 341.

In the primary molding process, the first split body 33 and the second split body 34 are resin-molded respectively with the first mold 110 and the second mold 120.

In the secondary molding process, the resin is injected between the welded parts (311, 312, and 313) in the bonding surface 331 of the first split body 33 and the welded parts (311, 312, and 313) in the bonding surface 341 of the second split body 34, to weld the first split body 33 and the second split body 34 together.

By manufacturing the valve 30 by the above-described manufacturing method, it is possible to improve the molding accuracy of the spherical surface of the outer peripheral wall of the valve body 31. This configuration enables to suppress leakage of the cooling water in the outer peripheral wall of the valve body 31.

Further, it is possible to enlarge the flow path area of the valve body flow path 300, and to reduce the water conduction resistance.

Fourth Embodiment

Figure 33:
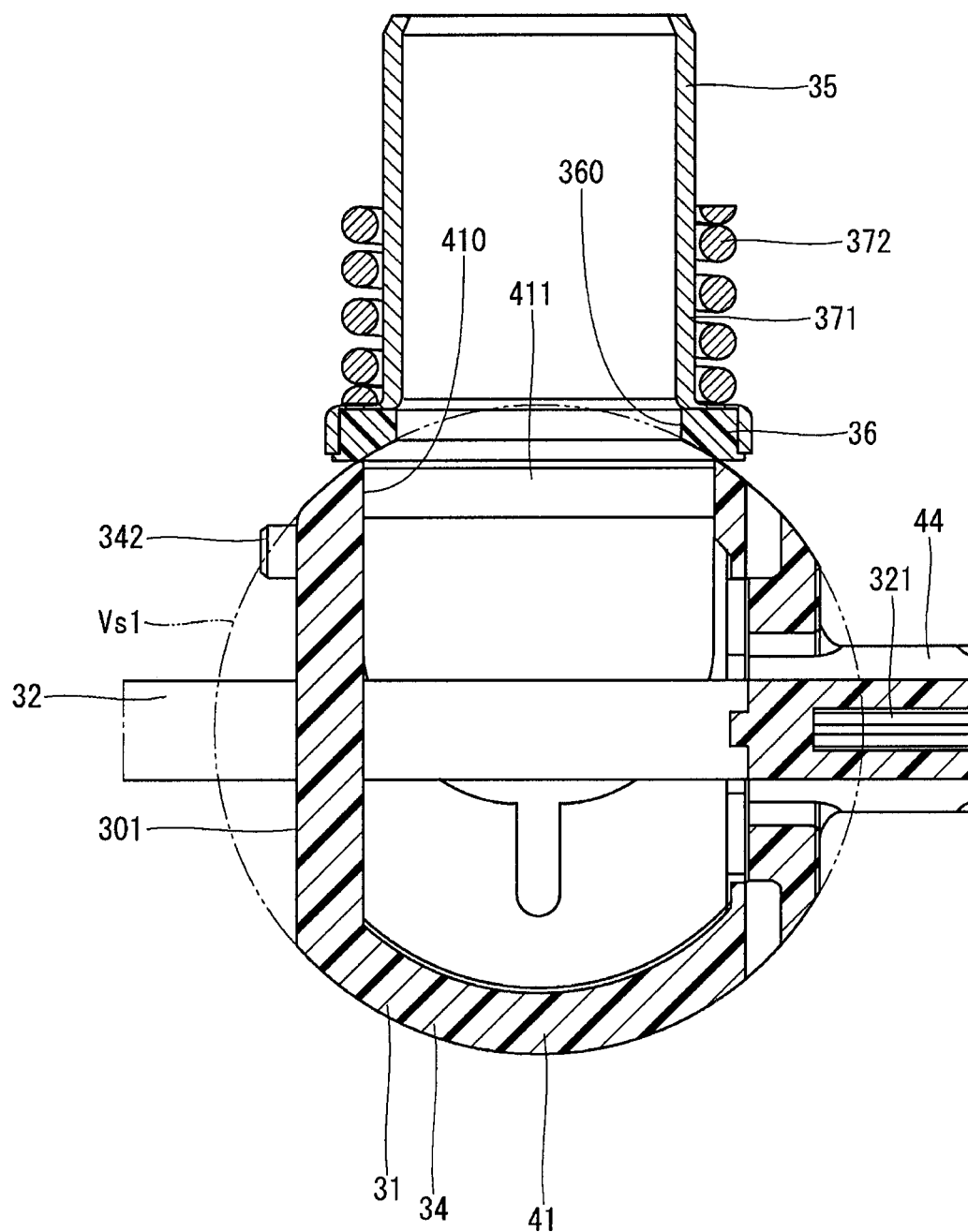
FIG. 33 is a cross-sectional view showing a part of the valve and the seal unit in the valve device of a fourth embodiment.

FIG. 33 shows a part of the valve device according to a fourth embodiment.

<3-10>

As shown in FIG. 33, the valve body opening rib 411 is formed in a linear shape away from the virtual spherical surface Vs1 by a predetermined distance. Note that the valve body opening ribs 421 and 422, and the valve body opening ribs 431 and 432, are formed in a linear shape away from the virtual spherical surface along the outer peripheral wall of the ball valves 42 and 43, by a predetermined distance.

Accordingly, upon rotation of the valve body 31, it is possible to effectively suppress the increase of the sliding resistance due to stoppage of the valve seal 36 caught with the valve body opening rib 411.

Fifth Embodiment

Figure 34:
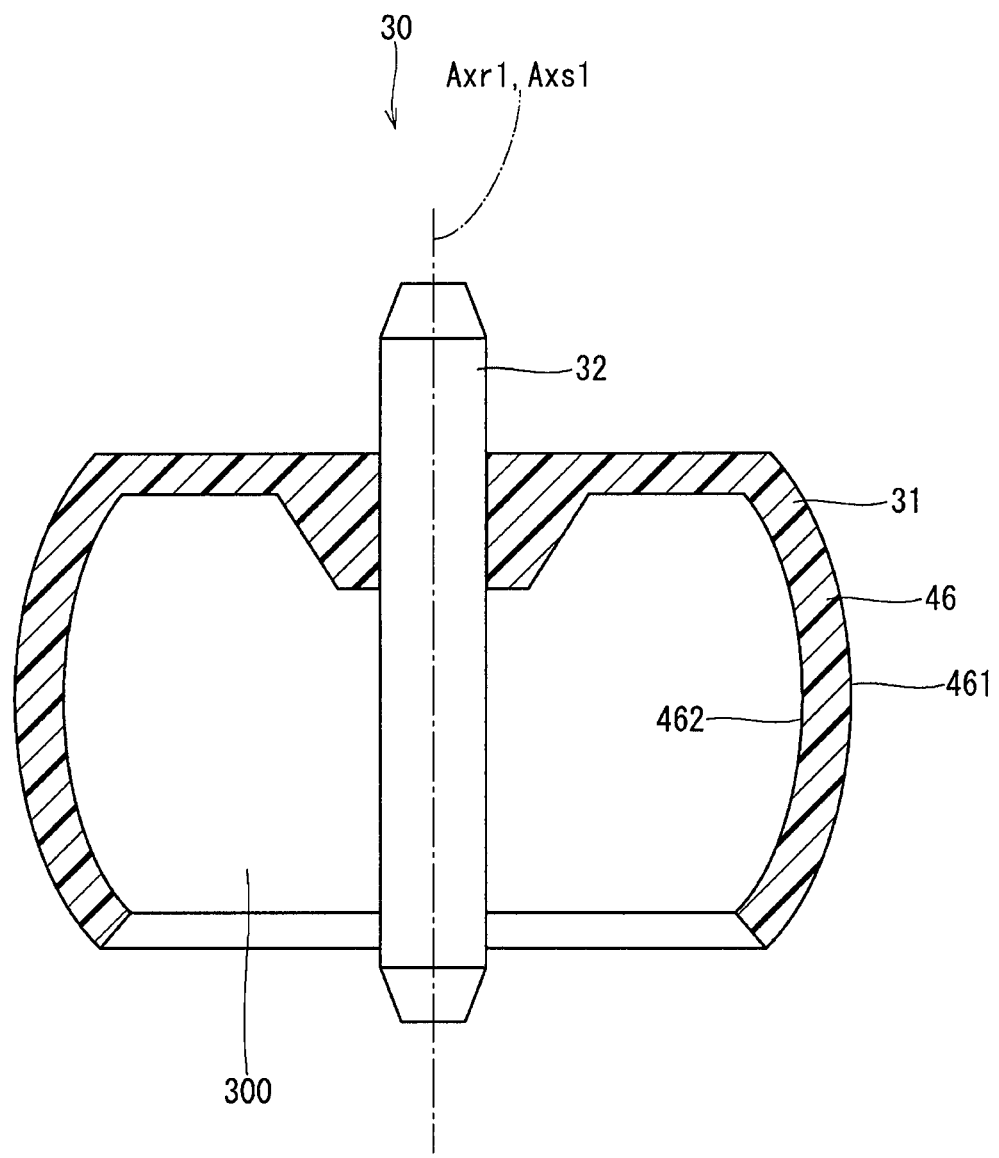
FIG. 34 is a cross-sectional view showing a part of the valve in the valve device of a fifth embodiment.

FIG. 34 shows a part of the valve device according to a fifth embodiment.

The valve body 31 of the valve 30 has a ball valve 46. The shaft 32 is provided on the rotational axis Axr1 of the valve body 31. The ball valve 46 has an outer peripheral wall 461 and an inner peripheral wall 462. The outer peripheral wall 461 is formed in a spherical shape so as to expand to the radially outside of the ball valve 46. The inner peripheral wall 462 is formed in a spherical shape so as to be dented to the radially outside of the ball valve 46. Note that in the valve body 31, the distance between the outer peripheral wall 461 and the inner peripheral wall 462 is the same within a range of at least a part of the rotational axis Axr1 direction and the circumferential direction. That is, the valve body 31 is formed such that the thickness is uniform (uniform thickness) at least in the above-described range.

Next, the manufacturing method of the valve 30 will be described.

Figure 35:
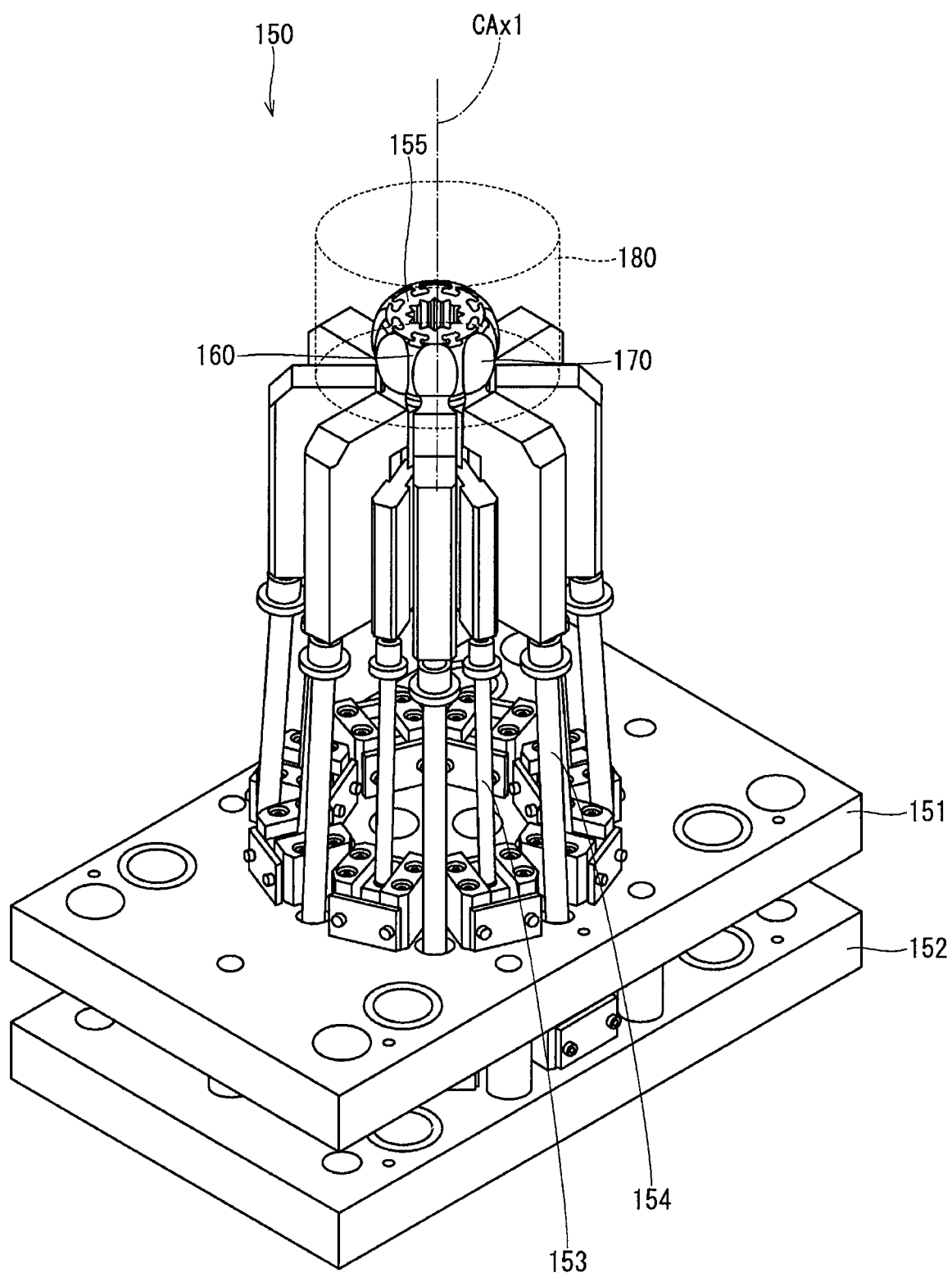
FIG. 35 is a perspective view showing a molding device used in the manufacturing process of the valve in the valve device of the fifth embodiment.

As shown in FIG. 35, a molding device 150 has an upper base 151, a lower base 152, an upper support column 153, a lower support column 154, a mold driver 155, a first inner mold 160, a second inner mold 170, an outer mold 180, and the like.

Figure 36:
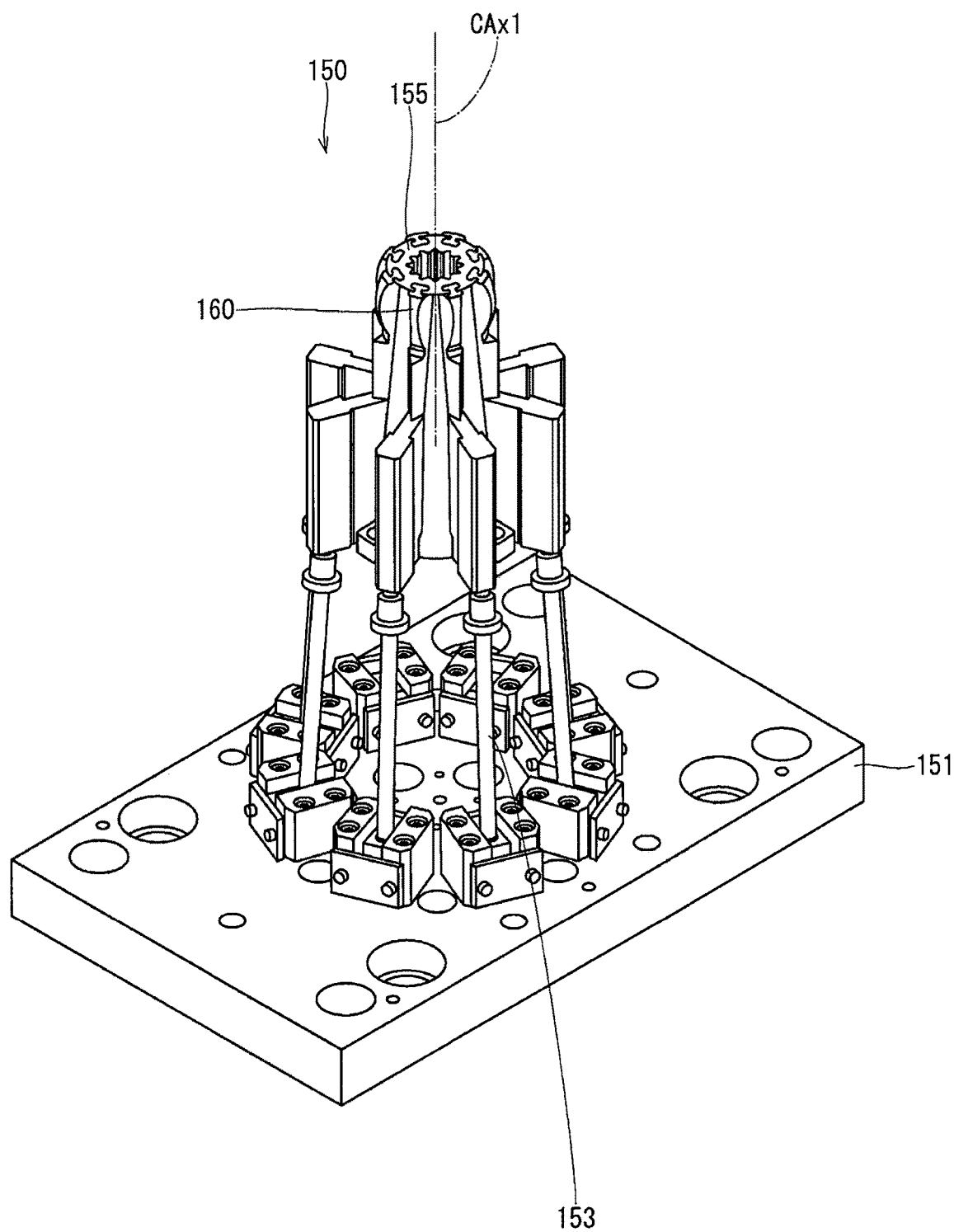
FIG. 36 is a perspective view showing a part of the molding device used in the manufacturing process of the valve in the valve device of the fifth embodiment.

The upper base 151 is formed in a plate shape. The lower base 152 is formed in a plate shape, and provided so as to be parallel to the upper base 151. The upper support column 153 is formed in a bar shape, and one end of the upper support column 153 is connected to the upper base 151 on the opposite side to the lower base 152. Eight upper support columns 153 are provided such that their one ends form a ring shape around a central axis CAx1 of the molding device 150 in the upper base 151 (see FIG. 36). In the upper support column 153, with one end as a supporting point, the other end side is swingable to the central axis CAx1 side.

Figure 37:
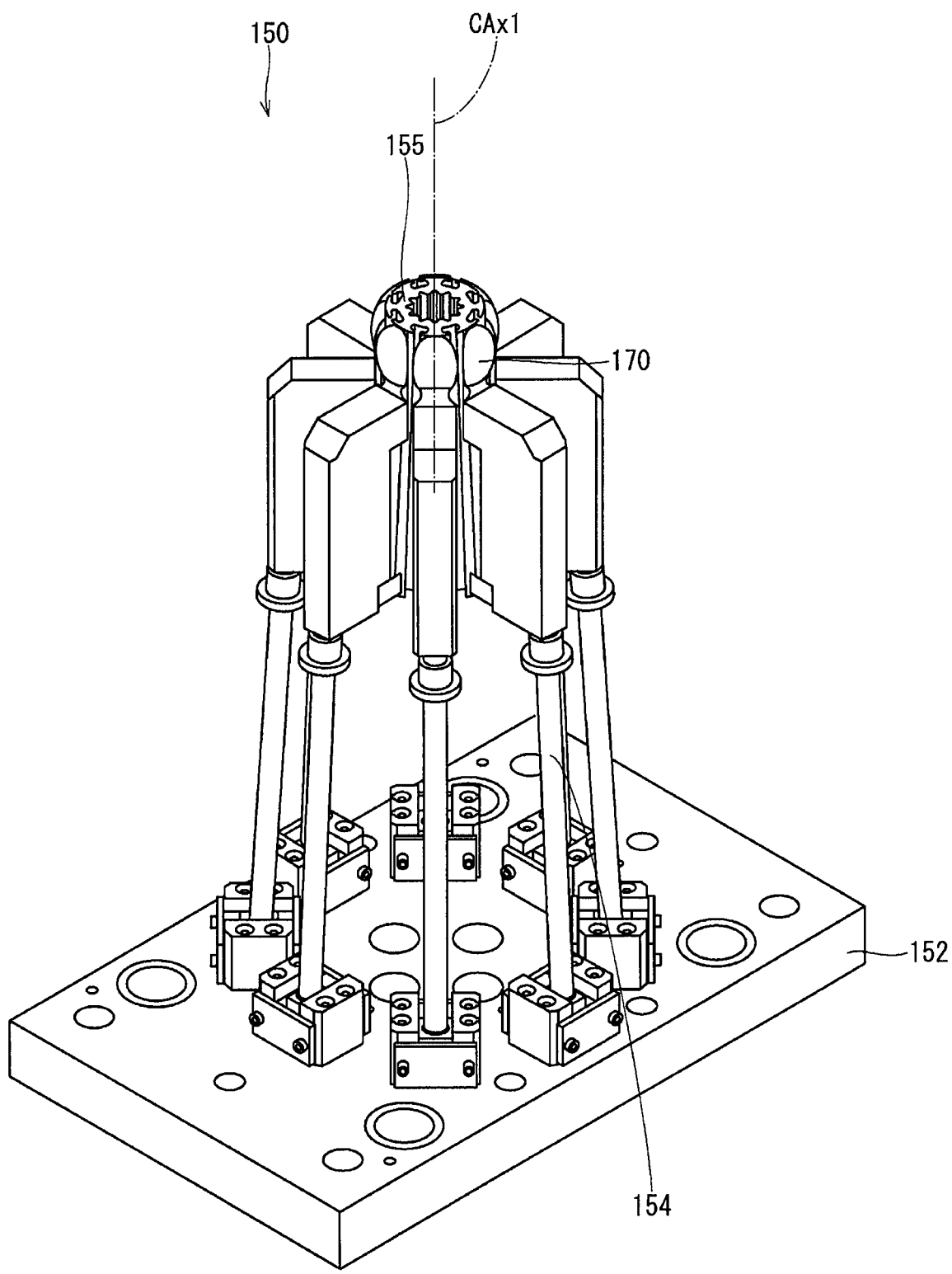
FIG. 37 is a perspective view showing a part of the molding device used in the manufacturing process of the valve in the valve device of the fifth embodiment.

The lower support column 154 is formed in a bar shape, and one end of the lower support column 154 is connected to the lower base 152 on the upper base 151 side. The lower support column 154 is provided such that the other end is inserted through a hole of the upper base 151 and is positioned on the opposite side to the lower base 152 with respect to the upper base 151. Eight lower support columns 154 are provided such that their one ends form a ring shape around the central axis CAx1 in the lower base 152 (see FIG. 37). In the lower support column 154, with one end as a supporting point, the other end side is swingable to the central axis CAx1 side.

The first inner mold 160 is provided at the respective other ends of the eight upper support columns 153. That is, eight first inner molds 160 are provided. The second inner mold 170 is provided at the respective other ends of the eight lower support columns 154. That is, eight second inner molds 170 are provided.

Figure 38:
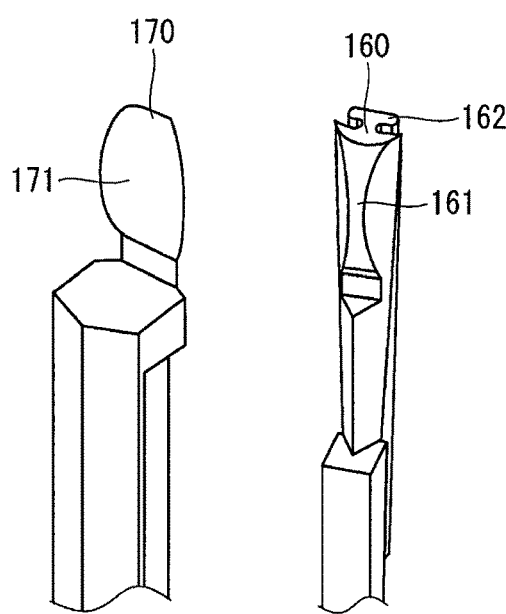
FIG. 38 is a perspective view showing a part of the molding device used in the manufacturing process of the valve in the valve device of the fifth embodiment.

As shown in FIG. 38, the first inner mold 160 has a first convex surface 161 in a part of the outer wall. The first convex surface 161 is formed in a spherical shape. The second inner mold 170 has a second convex surface 171 in a part of the outer wall. The second convex surface 171 is formed in a spherical shape.

As shown in FIG. 35, the first inner mold 160 and the second inner mold 170 are alternately provided in the circumferential direction such that the first convex surface 161 and the second convex surface 171 face the opposite side to the central axis CAx1. With this configuration, the first convex surface 161 and the second convex surface 171 can form spherical surfaces continuous in the circumferential direction.

Figure 39:
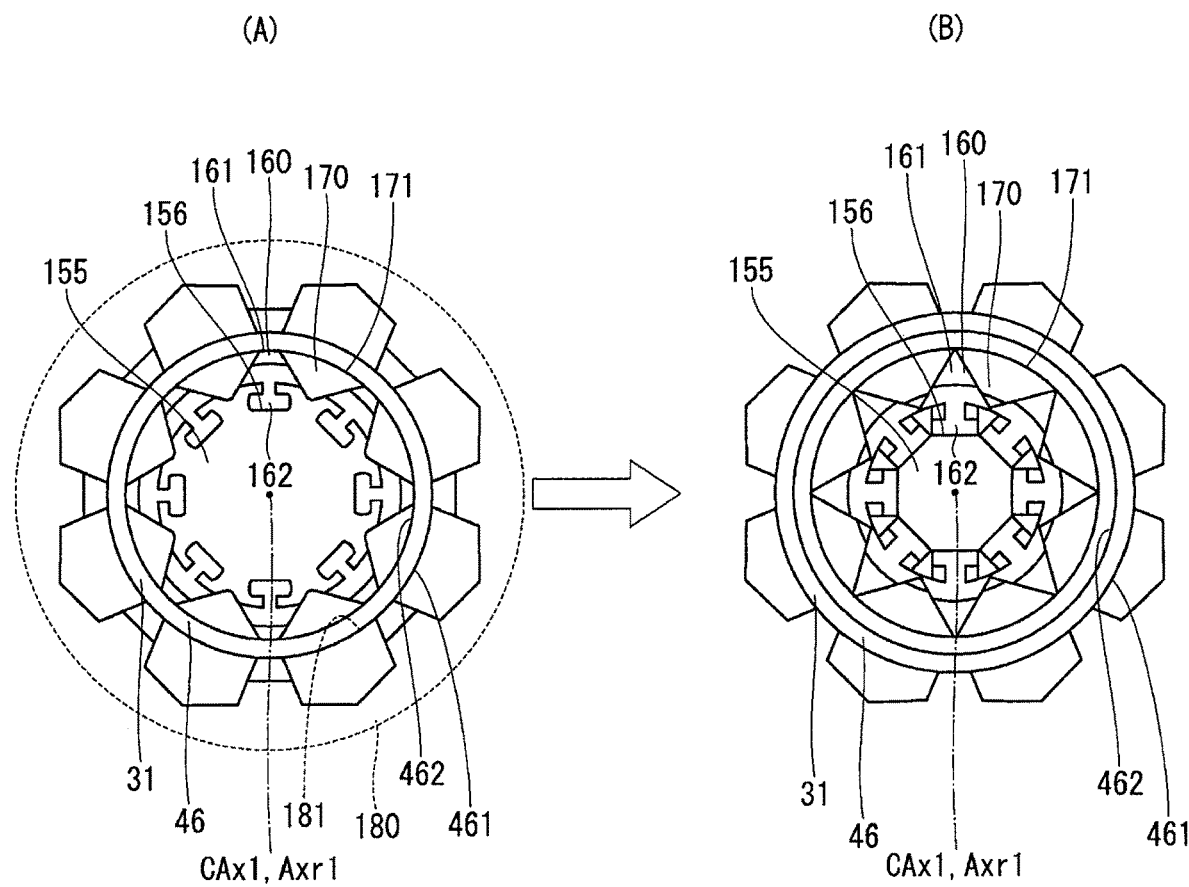
FIG. 39 is a diagram for explaining the manufacturing process of the valve in the valve device of the fifth embodiment.

The outer mold 180 has a concave surface 181 in the inner wall (see FIG. 39). The concave surface 181 is formed in a spherical shape. The outer mold 180 is provided outside the first inner mold 160 and the second inner mold 170 such that the concave surface 181 is opposite to the first convex surface 161 and the second convex surface 171.

The mold driver 155 is formed in a cylindrical shape. The mold driver 155 is provided inside the first inner mold 160 and the second inner mold 170 coaxially with the central axis CAx1. An engagement groove 156 is formed in the outer peripheral wall of the mold driver 155. The engagement groove 156 is formed so as to extend from one end of the mold driver 155 to the other end. Eight engagement grooves 156 are formed at an equal interval in the circumferential direction of the mold driver 155.

Figure 40:
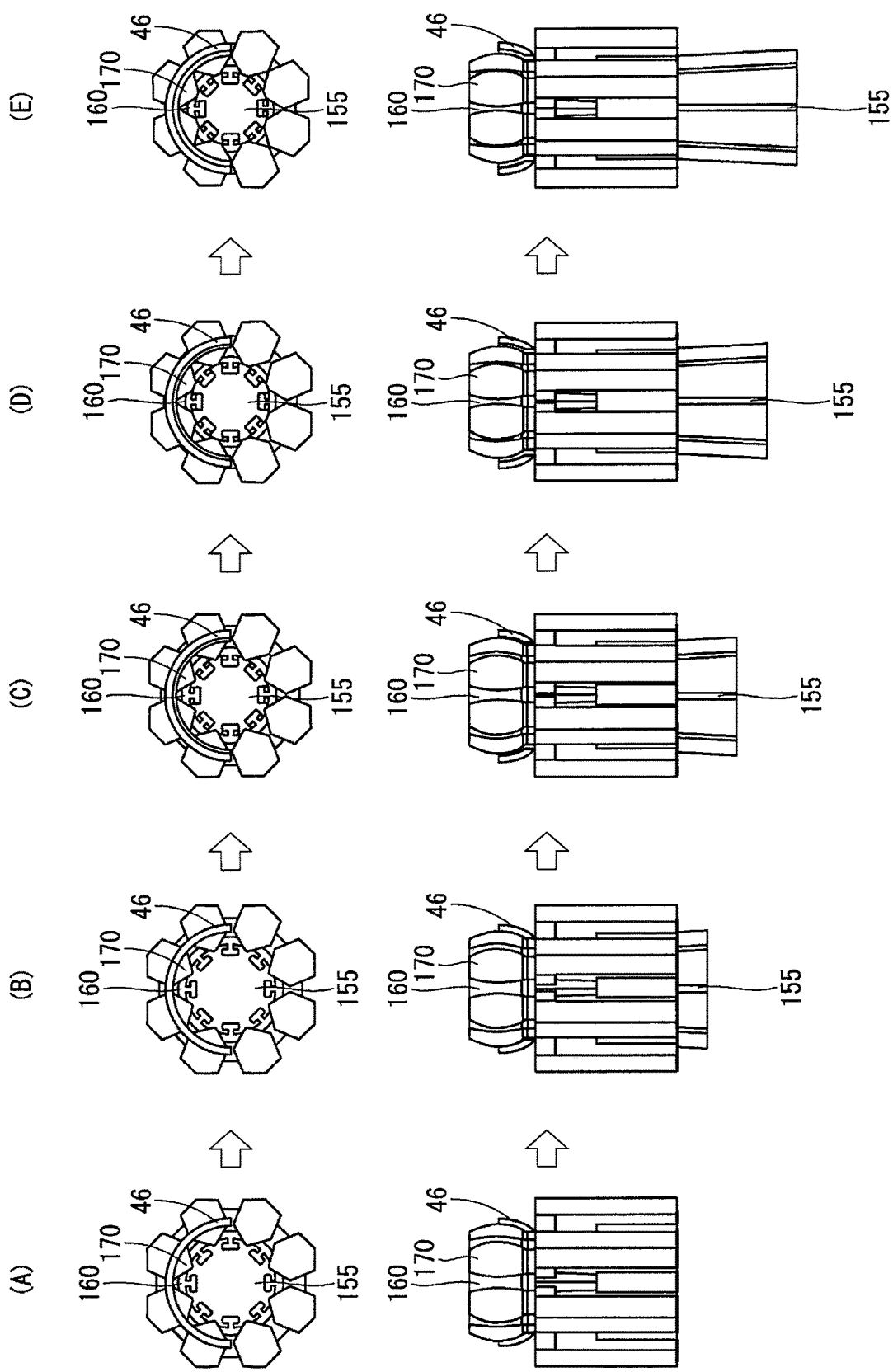
FIG. 40 is a diagram for explaining the manufacturing process of the valve in the valve device of the fifth embodiment.

The first inner mold 160 has an engagement convex 162 on the opposite side to the first convex surface 161. The engagement convex 162 is engageable with the engagement groove 156 of the mold driver 155. Further, the mold driver 155 is movable in the central axis CAx1 direction in a status where the engagement convex 162 is engaged with the engagement groove 156. The outer peripheral wall of the mold driver 155 is formed in a tapered shape. Accordingly, when the mold driver 155 relatively moves to the upper base 151 side in the central axis CAx1 direction with respect to the first inner mold 160 and the second inner mold 170, the eight first inner molds 160 move so as to gather to the central axis CAx1 side (see FIG. 39 and FIG. 40). With this configuration, the inner diameter of the spherical surface formed with the first convex surface 161 is reduced. Note that when the first inner molds 160 move so as to gather to the central axis CAx1 side, the eight second inner molds 170 are also movable so as to gather to the central axis CAx1 side. That is, when the first inner molds 160 and the second inner molds 170 move so as to gather to the central axis CAx1 side, the inner diameter of the spherical surface formed with the first convex surface 161 and the second convex surface 171 is reduced.

The manufacturing method of the valve 30 includes the following steps.

<3-25>

(Resin Molding Process)

In a resin molding process, the valve body 31 is resin-molded between the outer mold 180, and the first inner mold 160 and the second inner mold 170 provided in the outer mold 180. More particularly, as shown in FIG. 35 and (a) in FIG. 39, molten resin is injected into the space formed between the spherical surface formed with the first convex surface 161 and the second convex surface 171, and the concave surface 181 of the outer mold 180. When the resin is cooled and solidified, the resin molding process is completed.

<3-25-1>

In the resin molding process, when the valve body 31 is resin-molded, the distance between the concave surface 181, and the first convex surface 161 and the second convex surface 171 is the same within a range of at least a part of the rotational axis Axr1 direction and the circumferential direction (see (a) in FIG. 39).

Accordingly, it is possible to make the thickness uniform in at least a part of the valve body 31. This configuration enables to further improve the accuracy of the spherical surface of the outer peripheral wall of the valve body 31, and to further enlarge the flow path area of the valve body flow path 300.

(Mold Moving Process)

In a mold moving process after the resin molding process, the first inner mold 160 and the second inner mold 170 are moved to the inside of the valve body 31. More particularly, as shown in (a) and (b) in FIG. 39, and (a) to (e) in FIG. 40, the mold driver 155 is relatively moved to the central axis CAx1 direction with respect to the first inner mold 160 and the second inner mold 170, and the first inner mold 160 and the second inner mold 170 are moved to the central axis CAx1 side, to reduce the diameter of the spherical surface formed with the first convex surface 161 and the second convex surface 171. With this configuration, a gap is formed between the inner peripheral wall 462 of the valve body 31, and the first convex surface 161 and the second convex surface 171. Then, by relatively moving the first inner mold 160 and the second inner mold 170 in the central axis CAx1 direction with respect to the valve body 31, the first inner mold 160 and the second inner mold 170 are pulled out from the valve body 31.

<3-26>

Figure 41:
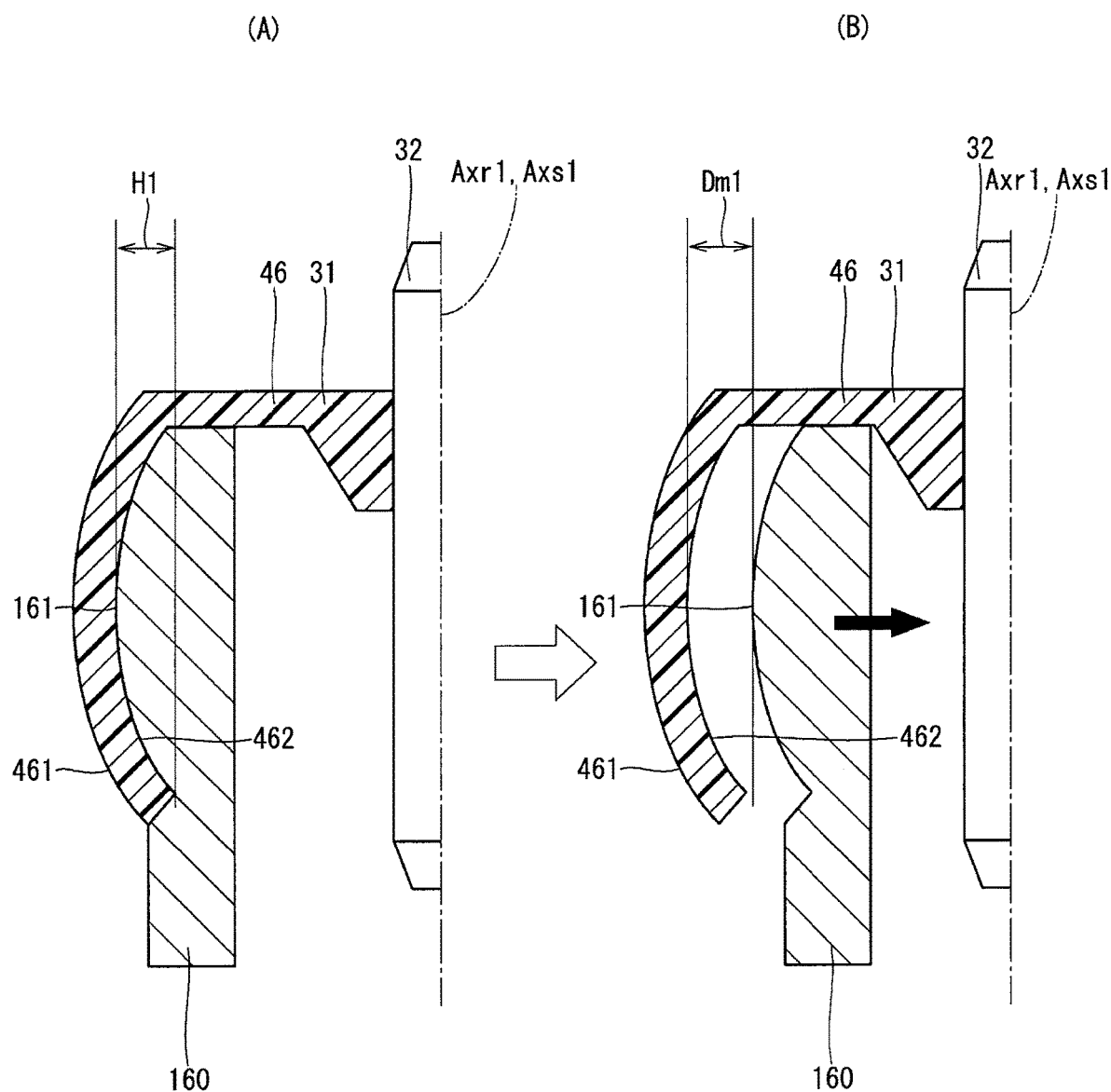
FIG. 41 is a diagram for explaining the manufacturing process of the valve in the valve device of the fifth embodiment.

As shown in (a) and (b) in FIG. 41, the projection height H1 of the first convex surface 161 and the second convex surface 171 is set to be smaller than a movable distance Dm1 of the first inner mold 160 and the second inner mold 170 in the mold moving process.

Accordingly, when the first inner mold 160 and the second inner mold 170 are pulled out from the valve body 31, it is possible to easily pull out the first inner mold 160 and the second inner mold 170 from the valve body 31 without interference by the first convex surface 161 and the second convex surface 171 with the inner peripheral wall 462.

<3-25>

As described above, the present embodiment is a manufacturing method of the valve 30 having the valve body 31 rotational about the rotational axis Axr1 and the valve body flow path 300 formed inside the valve body 31, and includes the resin molding process and the mold moving process.

In the valve body 31, at least a part of the outer peripheral wall is formed in a spherical shape, and at least a part of the inner peripheral wall is dented outward.

In the resin molding process, the valve body 31 is resin-molded between the outer mold 180, and the inner mold (160 and 170) provided inside the outer mold 180.

In the mold moving process, after the resin molding process, the inner mold (160 and 170) is moved to the inside of the valve body 31.

By manufacturing the valve 30 by the above-described manufacturing method, it is possible to improve the molding accuracy of the spherical surface of the outer peripheral wall of the valve body 31. This configuration enables to suppress leakage of the cooling water in the outer peripheral wall of the valve body 31.

Further, it is possible to enlarge the flow path area of the valve body flow path 300, and to reduce the water conduction resistance.

Sixth Embodiment

Figure 42:
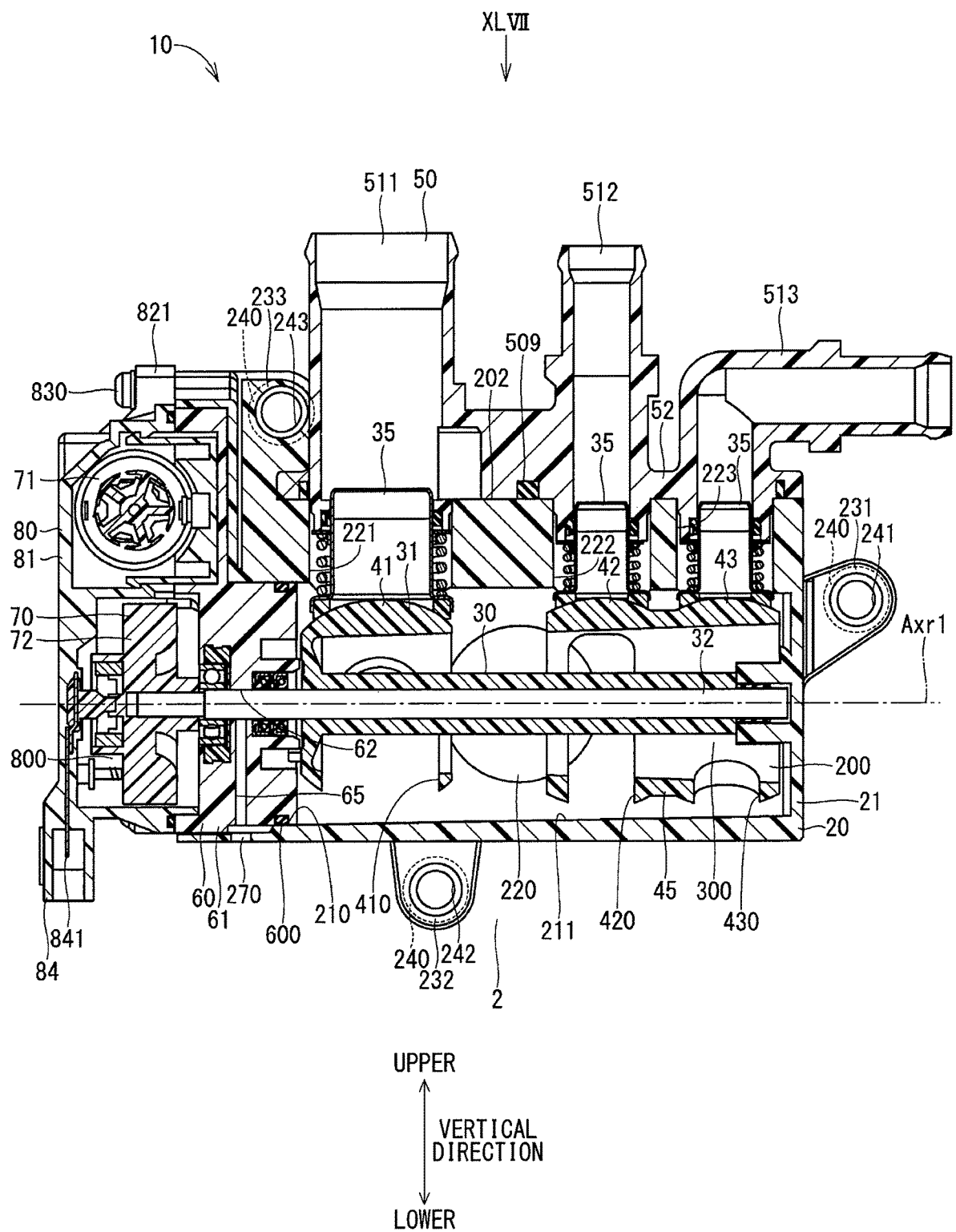
FIG. 42 is a cross-sectional view showing the valve device of a sixth embodiment.

FIG. 42 shows the valve device according to a sixth embodiment. In the sixth embodiment, the configuration of the valve 30 and the like are different from those in the first embodiment.

In the valve body 31, the ball valves 41 and 42, the cylindrical connection part 44, and the ball valve 43 are integrally formed so as to be arrayed, in this order, from the driving part 70 side to the opposite side to the driving part 70 in the rotational axis Axr1 direction. The valve body 31 is formed in a cylindrical shape, and the inner peripheral walls of the ball valves 41 and 42, the cylindrical connection part 44, and the ball valve 43 are formed in an approximately cylindrical surface shape about the rotational axis Axr1 as a center. Note that the inner peripheral wall of the valve body 31 is formed in a tapered shape such that the inner diameter becomes larger from the driving part 70 side toward the opposite side to the driving part 70 in the rotational axis Axr1 direction. The valve body 31 is formed such that the outer peripheral wall is in a spherical shape in the ball valves 41, 42, and 43. The shaft 32 is provided integrally with the valve body 31 in the rotational axis Axr1.

The outlet ports 221, 222, and 223 are formed in positions respectively corresponding to the ball valves 41, 42, and 43. The end of the pipe 511 on the opposite side to the outlet port 221 is connected via a hose or the like to the radiator 5. The end of the pipe 512 on the opposite side to the outlet port 222 is connected via a hose or the like to the heater 6. The end of the pipe 513 on the opposite side to the outlet port 223 is connected via a hose or the like to the device 7.

Figure 43:
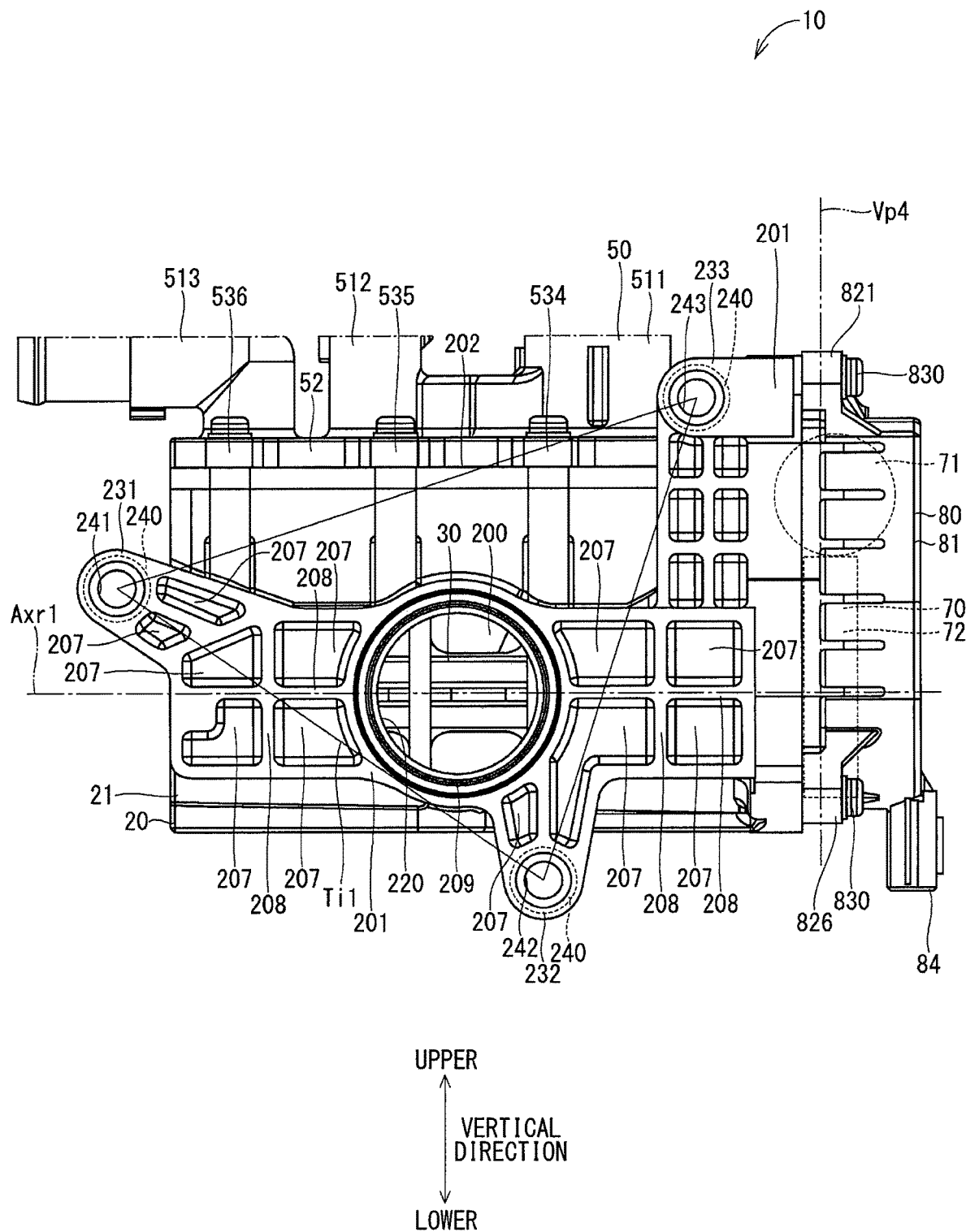
FIG. 43 is a diagram showing the valve device of the sixth embodiment.

The mounting surface 201 is formed to be orthogonal to the pipe mounting surface 202 (see FIG. 43). The inlet port 220 is formed to be opened in the mounting surface 201. The opening of the inlet port 220 in the mounting surface 201 has a round shape.

Figure 44:
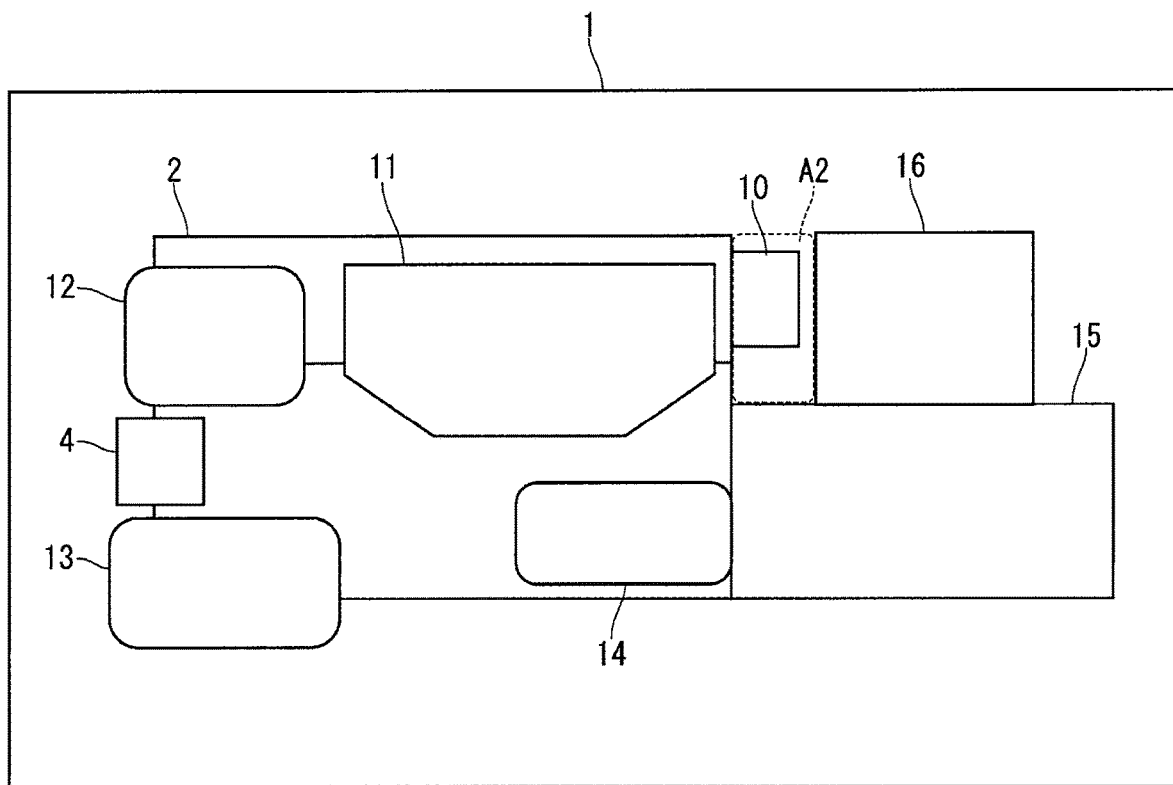
FIG. 44 is a schematic diagram showing an arrangement of the valve device of the sixth embodiment in the vehicle.

As shown in FIG. 44, the valve device 10 is attached to the engine 2 in a narrow space A2 between the engine 2 and an inverter 16. Note that the valve device 10 is attached to the engine 2 such that the pipe member 50 is positioned on the upper side in the vertical direction with respect to the valve 30.

<1-1>

As shown in FIG. 42 and FIG. 43, the housing 20 has the fastening parts 231, 232, and 233 formed integrally with the housing main body 21. The fastening parts 231, 232, and 233 are formed so as to project from the end of the housing main body 21 on the mounting surface 201 side in the surface direction of the mounting surface 201. Further, the housing 20 has the fastening holes 241, 242 and 243 formed in correspondence with the fastening parts 231, 232, and 233.

The fastening members 240 are inserted through the fastening holes 241, 242, and 243, respectively, and are fastened to the engine 2. With this configuration, the valve device 10 is attached to the engine 2. The rubber port seal member 209 is provided on the radially outside of the inlet port 220 of the mounting surface 201. In the status where the valve device 10 is attached to the engine 2, the port seal member 209 is compressed with the axial force of the fastening member 240. With this configuration, the port seal member 209 holds a fluid-tight status between the mounting surface 201 and the engine 2, and enables to suppress leakage of the cooling water from the inlet port 220 via the position between the mounting surface 201 and the engine 2.

As shown in FIG. 43, the opening of the inlet port 220 is formed inside a triangle Ti1 that is formed by connecting the three fastening holes, i.e., the fastening holes 241, 242, and 243.

<1-1>

As described above, the present embodiment relates to the valve device 10 configured to control the cooling water in the engine 2 of the vehicle 1. The valve device 10 has the housing 20 and the valve 30.

The housing 20 has the housing main body 21 defining the inner space 200 therein, the mounting surface 201 which is formed on the outer wall of the housing main body 21 so as to be opposed to the engine 2 in a status where the housing 20 is attached to the engine 2, the inlet port 220 which is opened in the mounting surface 201 and which connects the inner space 200 to the outside of the housing main body 21, the multiple fastening parts (231, 232, and 233) formed integrally with the housing main body 21, and the multiple fastening holes (241, 242, and 243) formed in correspondence with the respective plural fastening parts.

The valve 30 has the valve body 31 rotational about the rotational axis Axr1 in the inner space 200, and the valve body flow path 300 which is formed inside the valve body 31 and which is communicable with the inlet port 220.

The housing main body 21 is fixed to the engine 2 with the fastening member 240 passed through the fastening holes (241, 242, and 243) and screwed into the engine 2.

At least three fastening holes are formed.

The opening of the inlet port 220 is formed inside the triangle Ti1 formed by connecting the three fastening holes (241, 242, and 243).

Accordingly, in a case where the ring-shaped port seal member 209 of an elastic member is provided around the inlet port 220, when the housing main body 21 is fixed to the engine 2 with the fastening member 240 passed through the three fastening holes (231, 232, and 233), the port seal member 209 can be compressed in well balance. This configuration enables to effectively ensure the sealability around the inlet port 220.

<4-1>

Figure 45:
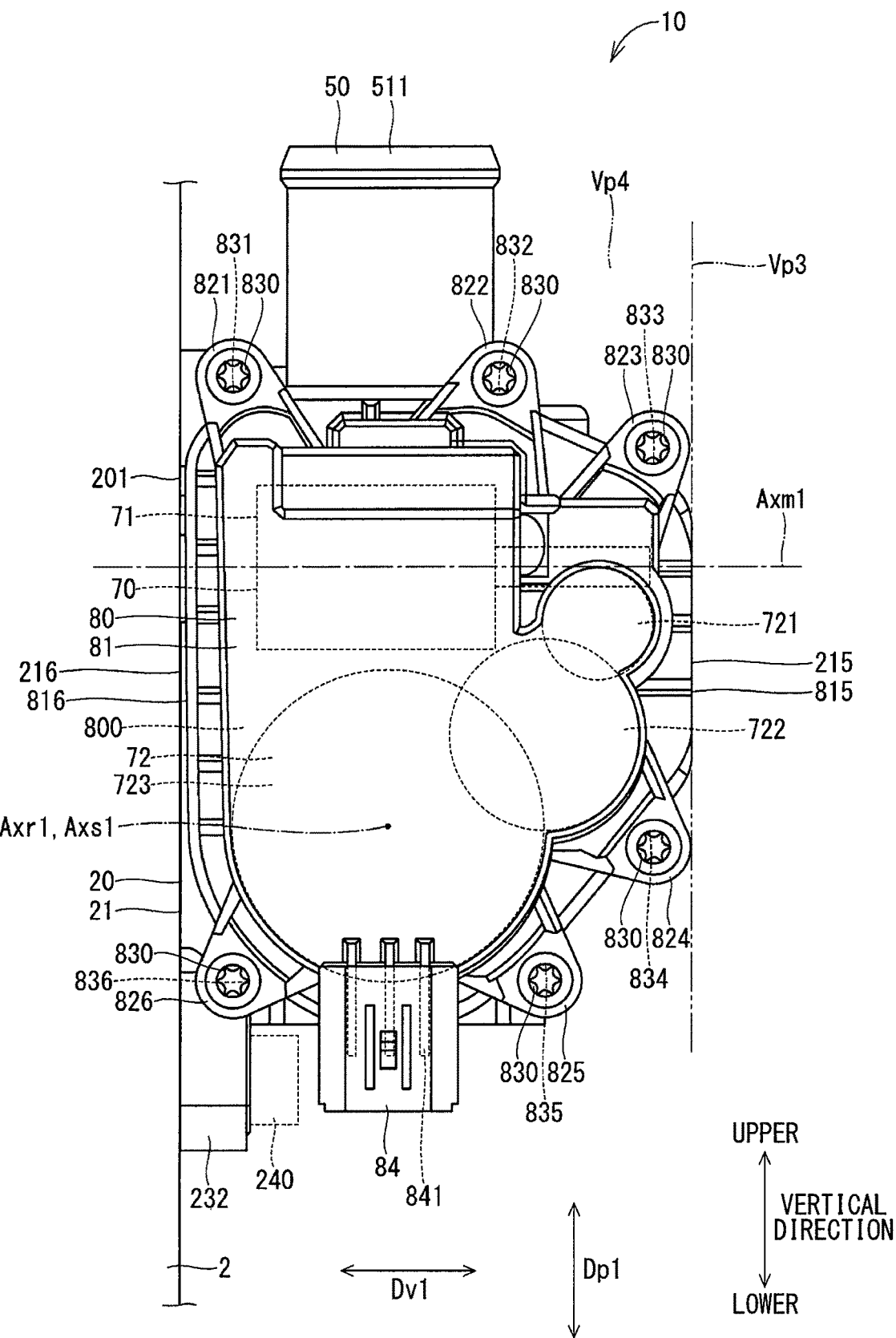
FIG. 45 is a diagram showing the valve device of the sixth embodiment.
Figure 46:
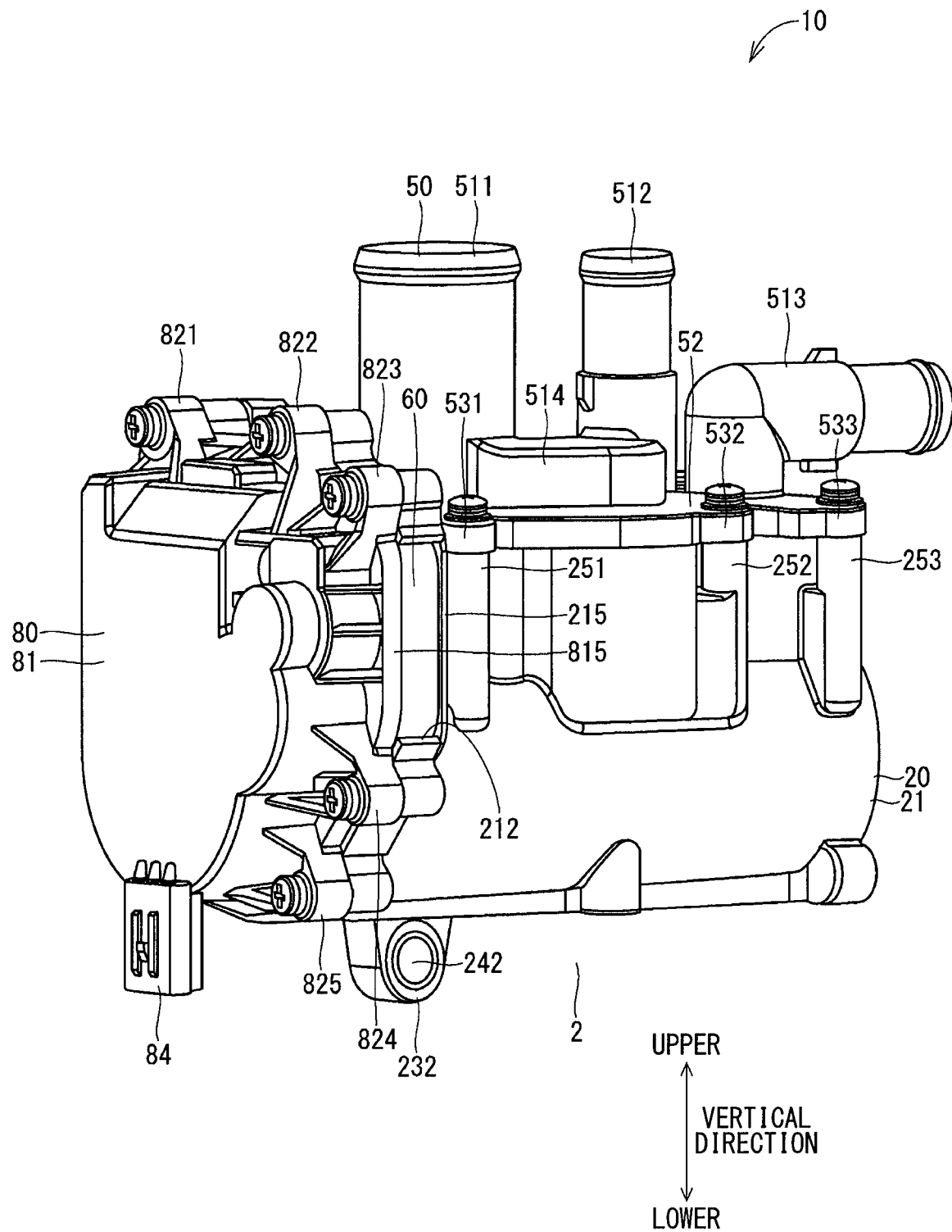
FIG. 46 is a perspective view showing the valve device of the sixth embodiment.

As shown in FIG. 45 and FIG. 46, the driving part cover 80 has a cover main body 81 which forms the driving part space 800, and cover fixing parts 821 to 826 formed at an outer edge of the cover main body 81 and fixed to the housing main body 21.

The cover fastening holes 831 to 836 are formed in the respective cover fixing parts 821 to 826. The fixing member 830 is inserted through the cover fastening holes 831 to 836, and is fastened to the housing main body 21.

Note that the cover fixing parts 823 and 824 are formed so as not to project outward from at least one of the both ends of the housing main body 21 in the direction Dv1 vertical to the mounting surface 201.

More particularly, the cover fixing parts 823 and 824 are formed so as not to project outward from a housing end 215 as an end of the housing main body 21 on the opposite side to the mounting surface 201 in the direction Dv1 vertical to the mounting surface 201, i.e., to the opposite side to the mounting surface 201.

A virtual plane Vp3 shown in FIG. 45 is a virtual plane which is passed through the housing end 215 and which is parallel to the mounting surface 201. The cover fixing parts 823 and 824 are positioned on the mounting surface 201 side with respect to the virtual plane Vp3.

Further, the cover fixing parts 821 and 826 are formed so as not to project outward from a housing end 216 as an end of the housing main body 21 on the mounting surface 201 side in the direction Dv1 vertical to the mounting surface 201, i.e., to the mounting surface 201 side. That is, the cover fixing parts 821 and 826 are positioned on the virtual plane Vp3 side with respect to the mounting surface 201.

<4-1>

As described above, the present embodiment relates to the valve device 10 configured to control the cooling water in the engine 2 of the vehicle 1. The valve device 10 has the housing 20, the valve 30, the partition part 60, the driving part cover 80, and the driving part 70.

The housing 20 has the housing main body 21 defining the inner space 200 therein, the mounting surface 201 which is formed on the outer wall of the housing main body 21 so as to be opposed to the engine 2 in a status where the housing 20 is attached to the engine 2, and the ports (220, 221, 222, and 223) which connect the inner space 200 to the outside of the housing main body 21.

The valve 30 has the valve body 31 rotational about the rotational axis Axr1 in the inner space 200, the valve body flow path 300 formed inside the valve body 31, the valve body openings (410, 420, and 430) which connect the valve body flow path 300 to the outside of the valve body 31, and the shaft 32 provided on the rotational axis Axr1. The valve 30 is configured to change the communication status between the valve body flow path 300 and the ports (220, 221, 222, and 223) via the valve body openings (410, 420, and 430) with the rotational position of the valve body 31.

The partition part 60 is provided so as to partition the inner space 200 from the outside of the housing main body 21. The partition part 60 has the shaft insertion hole 62 formed such that one end of the shaft 32 can be inserted through the shaft insertion hole 62.

The driving part cover 80 is provided on the opposite side to the inner space 200 with respect to the partition part 60. The driving part cover 80 forms the driving part space 800 between the driving part cover 80 and the partition part 60.

The driving part 70 is provided in the driving part space 800, and is capable of rotate-driving the valve body 31 via one end of the shaft 32.

The driving part cover 80 has the cover main body 81 which forms the driving part space 800, and the cover fixing parts (821 to 826) formed at the outer edge of the cover main body 81 and fixed to the housing main body 21.

The cover fixing parts (821 to 826) are formed so as not to project outward from at least one of the both ends (215 and 216) of the housing main body 21 in the direction Dv1 vertical to the mounting surface 201.

Accordingly, it is possible to reduce the physical constitution of the driving part cover 80 in the direction Dv1 vertical to the mounting surface 201, and to reduce the physical constitution of the valve device 10 in the direction Dv1 vertical to the mounting surface 201. This configuration enables to mount the valve device 10 in the narrow space A2 in the vehicle 1.

As shown in FIG. 44, various devices are mounted around the engine 2. Accordingly, the space where the valve device 10 can be provided is limited in an engine room. In the present embodiment, since it is possible to reduce the physical constitution of the valve device 10, it is possible to easily mount the valve device 10 in the narrow space A2 in the vehicle 1 (see FIG. 44).

<4-1-1>

As shown in FIG. 45, the cover fixing parts 821 to 826 are positioned on a virtual plane Vp4 vertical to the mounting surface 201. Note that the virtual plane Vp4 is a plane also vertical to the rotational axis Axr1 and the axis Axs1 of the shaft 32.

Accordingly, it is possible to reduce the height of the driving part cover 80.

<4-2>

As shown in FIG. 45, the housing end 215 as an end of the housing main body 21 on the opposite side to the mounting surface 201 is formed so as not to project outward from a cover end 815 as an end of the cover main body 81 on the opposite side to the mounting surface 201. Note that the cover end 815 is formed so as to be along the virtual plane Vp3.

Accordingly, it is possible to reduce the physical constitution of the housing main body 21 in the direction Dv1 vertical to the mounting surface 201, and to reduce the physical constitution of the valve device 10 in the direction Dv1 vertical to the mounting surface 201.

<4-2-1>

As shown in FIG. 46, the housing main body 21 has a notch 212 to expose the partition part 60 at the housing end 215 as an end on the opposite side to the mounting surface 201.

Accordingly, it is possible to further reduce the physical constitution of the valve device 10 in the direction Dv1 vertical to the mounting surface 201.

<4-3>

As shown in FIG. 45, the connector 84 is formed so as not to project outward from at least one of the both ends of the cover main body 81 in the direction Dv1 vertical to the mounting surface 201.

More particularly, the connector 84 is formed so as not to project outward from the cover end 815 as an end of the cover main body 81 on the opposite side to the mounting surface 201 in the direction Dv1 vertical to the mounting surface 201, i.e., to the opposite side to the mounting surface 201. That is, the connector 84 is positioned on the mounting surface 201 side with respect to the virtual plane Vp3.

Further, the connector 84 is formed so as not to project outward from a cover end 816 as an end of the cover main body 81 on the mounting surface 201 side in the direction Dv1 vertical to the mounting surface 201, i.e., to the mounting surface 201 side. That is, the connector 84 is positioned on the virtual plane Vp3 side with respect to the mounting surface 201.

<4-3-1>

As shown in FIG. 45, the connector 84 is formed so as to project from the outer edge of the cover main body 81 in other direction than the direction Dv1 vertical to the mounting surface 201.

<4-3-2>

More particularly, the connector 84 is formed so as to project from the outer edge of the cover main body 81 in the direction Dpi parallel to the mounting surface 201. Note that the parallel direction Dpi is a direction vertical to the rotational axis Axr1 and the axis Axs1 of the shaft 32.

Accordingly, it is possible to further reduce the physical constitution of the driving part cover 80 in the direction Dv1 vertical to the mounting surface 201, and to further reduce the physical constitution of the valve device 10 in the direction Dv1 vertical to the mounting surface 201.

<5-1>

Figure 47:
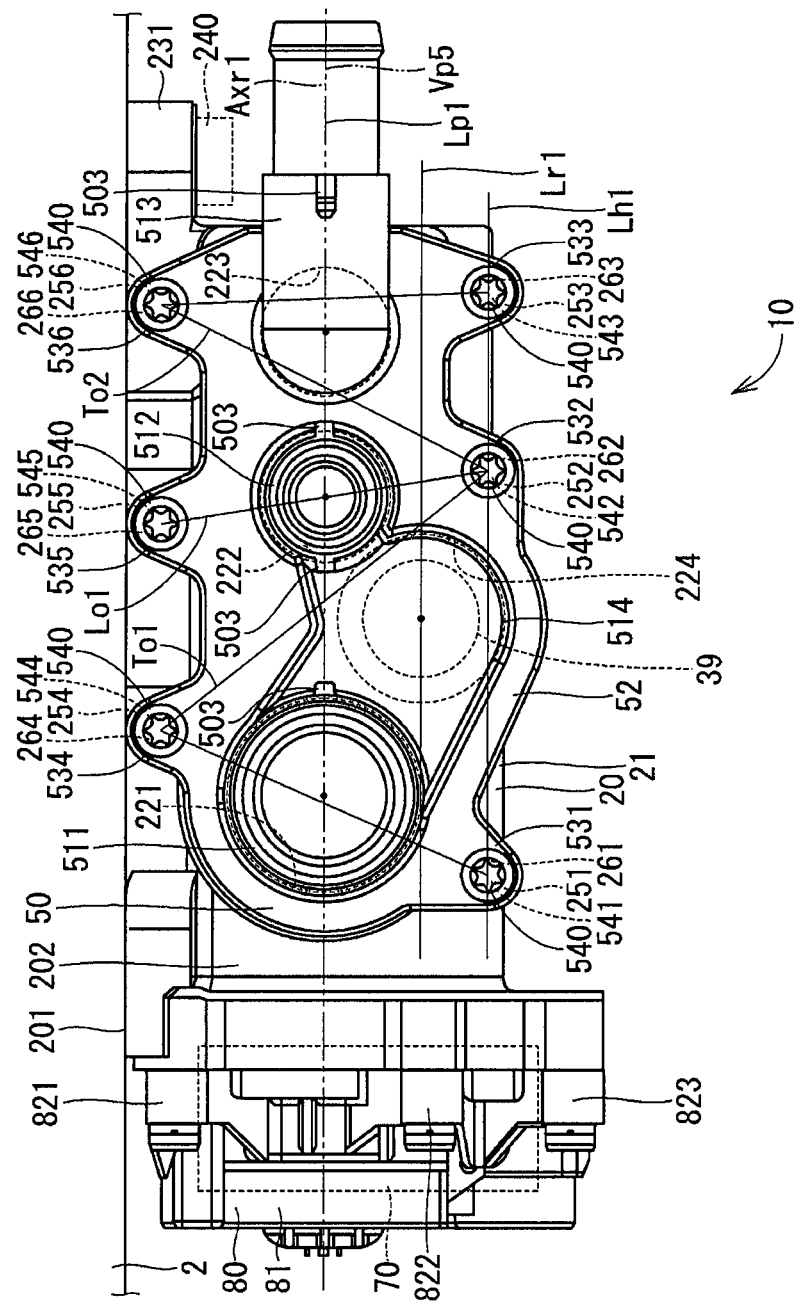
FIG. 47 is a diagram of FIG. 42 viewed along an arrow XLVII direction.

As shown in FIG. 47, the housing 20 has housing-side fixing parts 251 to 256 formed integrally with the housing main body 21. Note that the housing-side fixing parts 251 to 253 are formed so as to be arrayed in a direction parallel to the rotational axis Axr1 on the opposite side to the mounting surface 201 with respect to a virtual plane Vp5 which includes the rotational axis Axr1 and which is parallel to the mounting surface 201. Further, the housing-side fixing parts 254 to 256 are formed so as to be arrayed in a direction parallel to the rotational axis Axr1 on the mounting surface 201 side with respect to the virtual plane Vp5. That is, the housing-side fixing parts 251 to 253 and the housing-side fixing parts 254 to 256 are formed so as to hold the virtual plane Vp5 between them.

Note that the distance between the housing-side fixing part 251 and the housing-side fixing part 252 is larger than the distance between the housing-side fixing part 252 and the housing-side fixing part 253. The distance between the housing-side fixing part 254 and the housing-side fixing part 255 is the same as the distance between the housing-side fixing part 255 and the housing-side fixing part 256. Further, the distance between the housing-side fixing part 252 and the housing-side fixing part 253 is smaller than the distance between the housing-side fixing part 255 and the housing-side fixing part 256.

Further, the housing-side fixing part 251 is formed on the driving part 70 side with respect to the housing-side fixing part 254 in the rotational axis Axr1 direction. The housing-side fixing part 252 is formed on the housing-side fixing part 256 side with respect to the housing-side fixing part 255 in the rotational axis Axr1 direction. The housing-side fixing part 253 is formed on the slightly opposite side to the driving part 70 with respect to the housing-side fixing part 256 in the rotational axis Axr1 direction.

Housing-side fastening holes 261 to 266 are formed in the respective housing-side fixing parts 251 to 256. Note that the housing-side fastening holes 261 to 266 are formed in an approximately cylindrical shape, and formed such that the axis is parallel to the mounting surface 201, the virtual plane Vp5, and the vertical direction. Further, a thread groove is not previously formed in the inner peripheral wall of the housing-side fastening holes 261 to 266.

As shown in FIG. 47, the pipe member 50 has the pipes 511 to 514, the pipe connection part 52, pipe-side fixing parts 531 to 536, and the like. The pipes 511 to 513 are respectively provided such that the inner space communicates with the outlet ports 221 to 223. The pipe 514 is provided such that the inner space communicates with the relief port 224. The pipe 511 and the pipe 514 are integrally formed with each other, and the inner spaces communicate with each other. Note that the pipe 512 and the pipe 514 are integrally formed with each other, but the inner spaces do not communicate with each other. The pipe connection part 52 is formed integrally with the pipes 511 to 514 so as to mutually connect the ends of the pipes 511 to 514 on the housing main body 21 side.

The pipe-side fixing parts 531 to 536 are respectively formed in positions corresponding to the housing-side fixing parts 251 to 256 at an outer edge of the pipe connection part 52. Pipe-side fastening holes 541 to 546 are formed in the respective pipe-side fixing parts 531 to 536. Note that the pipe-side fastening holes 541 to 546 are formed in an approximately cylindrical shape, and formed such that the respective axes approximately correspond to the axes of the housing-side fastening holes 261 to 266.

The valve device 10 is provided with a pipe fastening member 540. The pipe fastening member 540 is passed through the pipe-side fastening holes 541 to 546, to be screwed into the housing-side fastening holes 261 to 266, to fix the pipe-side fixing parts 531 to 536 to the housing-side fixing parts 251 to 256.

Figure 48:
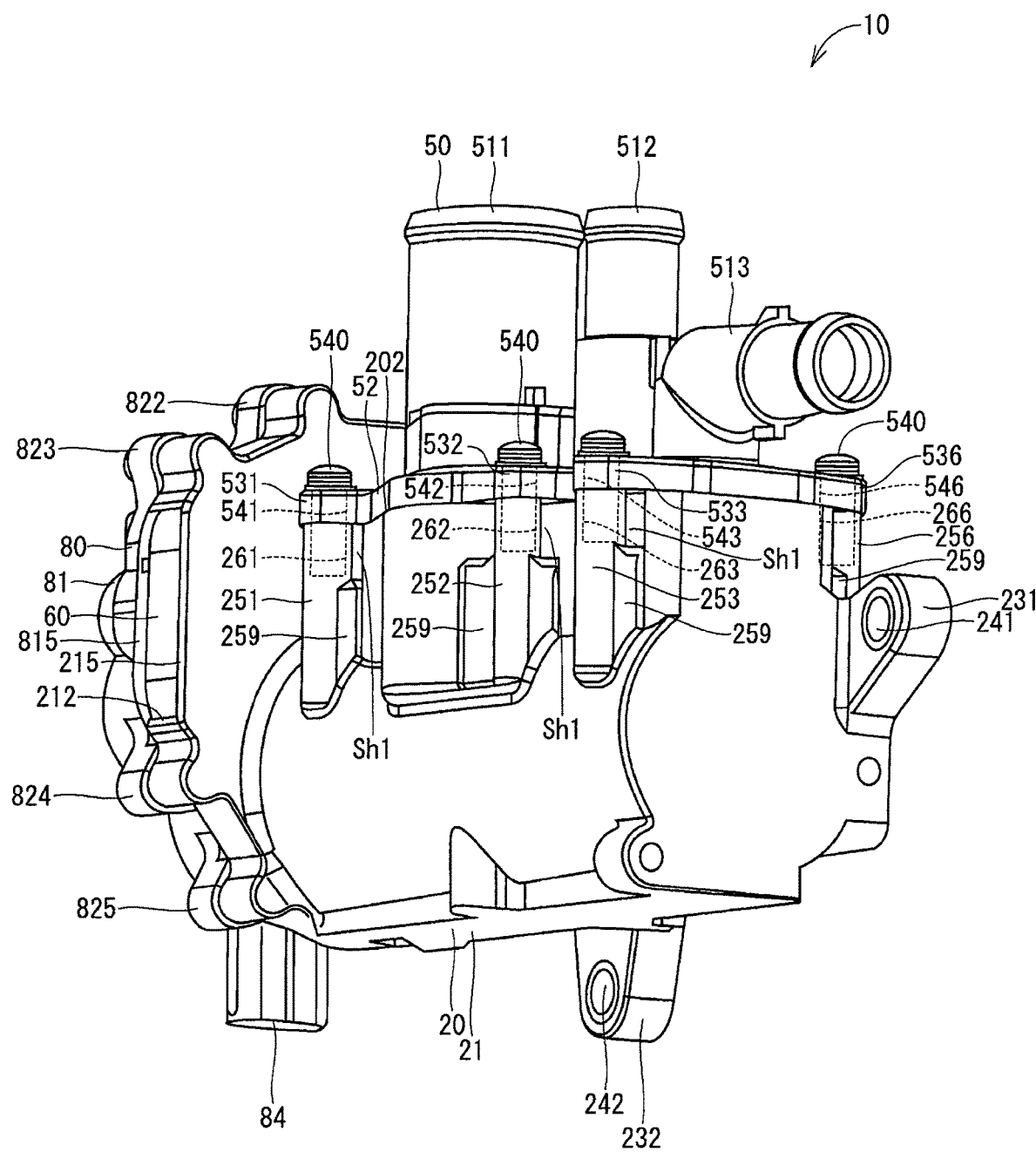
FIG. 48 is a perspective view showing the valve device of the sixth embodiment.
Figure 49:
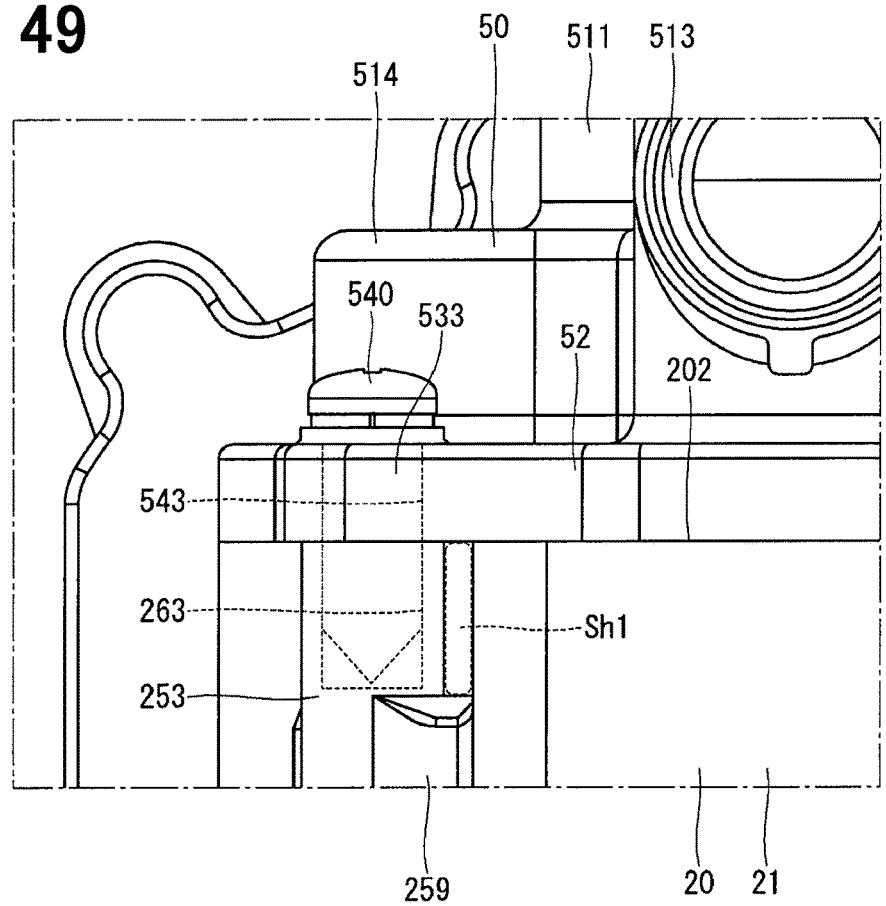
FIG. 49 is a diagram showing a part of the valve device of the sixth embodiment.

As shown in FIG. 48 and FIG. 49, the housing-side fixing parts 251 to 256 are formed in an approximate columnar shape. The housing-side fixing parts 251 to 256 are provided such that one end surface in the axial direction is positioned on the same plane as the pipe mounting surface 202. The housing 20 has a housing connection part 259 which connects the outer peripheral walls of the housing-side fixing parts 251 to 256 on the other end side in the axial direction to the outer wall of the housing main body 21. With this configuration, the housing-side fixing parts 251 to 256 form a housing gap space Sh1 as a gap between the housing-side fixing parts 251 to 256 and the outer wall of the housing main body 21. The housing gap Sh1 is formed between the housing connection part 259 and the pipe-side fixing parts 531 to 536.

Note that the housing-side fastening holes 261 to 266 are respectively formed coaxially with the housing-side fixing parts 251 to 256. Further, the ends of the housing-side fastening holes 261 to 266 on the opposite side to the pipe member 50 are positioned on the pipe member 50 side from the housing connection part 259.

<5-1>

As described above, the present embodiment relates to the valve device 10 configured to control the cooling water in the engine 2 of the vehicle 1. The valve device 10 has the housing 20, the valve 30, the pipe member 50, and the pipe fastening member 540.

The housing 20 has the housing main body 21 defining the inner space 200 therein, the housing-side fixing parts (251 to 256) formed integrally with the housing main body 21, the housing-side fastening holes (261 to 266) formed in the housing-side fixing parts, and the ports (220, 221, 222, 223, and 224) which connect the inner space 200 to the outside of the housing main body 21.

The valve 30 has the valve body 31 rotational about the rotational axis Axr1 in the inner space 200, the valve body flow path 300 formed inside the valve body 31, and the valve body openings (410, 420, and 430) which connect the valve body flow path 300 to the outside of the valve body 31. The valve 30 is configured to change the communication status between the valve body flow path 300 and the ports via the valve body openings with the rotational position of the valve body 31.

The pipe member 50 has the cylindrical pipes (511, 512, 513, and 514) the inner space of which communicates with the ports (221, 222, 223, and 224), the pipe-side fixing parts (531 to 536) formed integrally with the pipes and fixed to the housing-side fixing parts, and the pipe-side fastening holes (541 to 546) formed in the pipe-side fixing parts.

The pipe fastening member 540 is passed through the pipe-side fastening holes (541 to 546), to be screwed into the housing-side fastening holes (261 to 266), to fix the pipe-side fixing parts (531 to 536) to the housing-side fixing parts (251 to 256).

The housing-side fixing parts (251 to 256) form the gap (Sh1) between the housing-side fixing parts and the outer wall of the housing main body 21.

Accordingly, in a case where the pipe member 50 is fastened to the housing 20 with the fastening member 240, even when a crack occurs in the housing-side fixing parts (251 to 256), it is possible to suppress extension of the crack to the housing main body 21. This configuration enables to suppress leakage of the cooling water caused by fastening of the pipe member 50 to the housing 20.

In the present embodiment, as the outlet port 221 is connected to the radiator 5 and the flow rate is high, it is possible to effectively suppress leakage of the cooling water by suppressing extension of the crack especially from the housing-side fixing parts 251 and 254 in the vicinity of the outlet port 221, among the housing-side fixing parts (215 to 256), to the housing main body 21.

<5-2>

Figure 50:
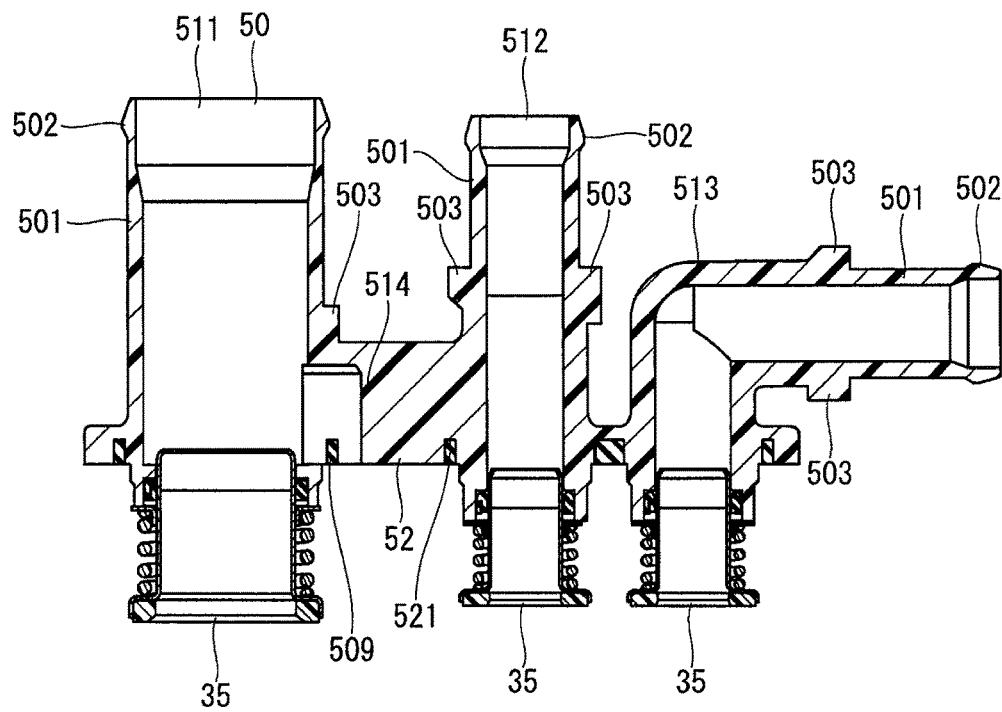
FIG. 50 is a cross-sectional view showing a pipe member, the seal unit, a gasket in the valve device of the sixth embodiment.
Figure 51:
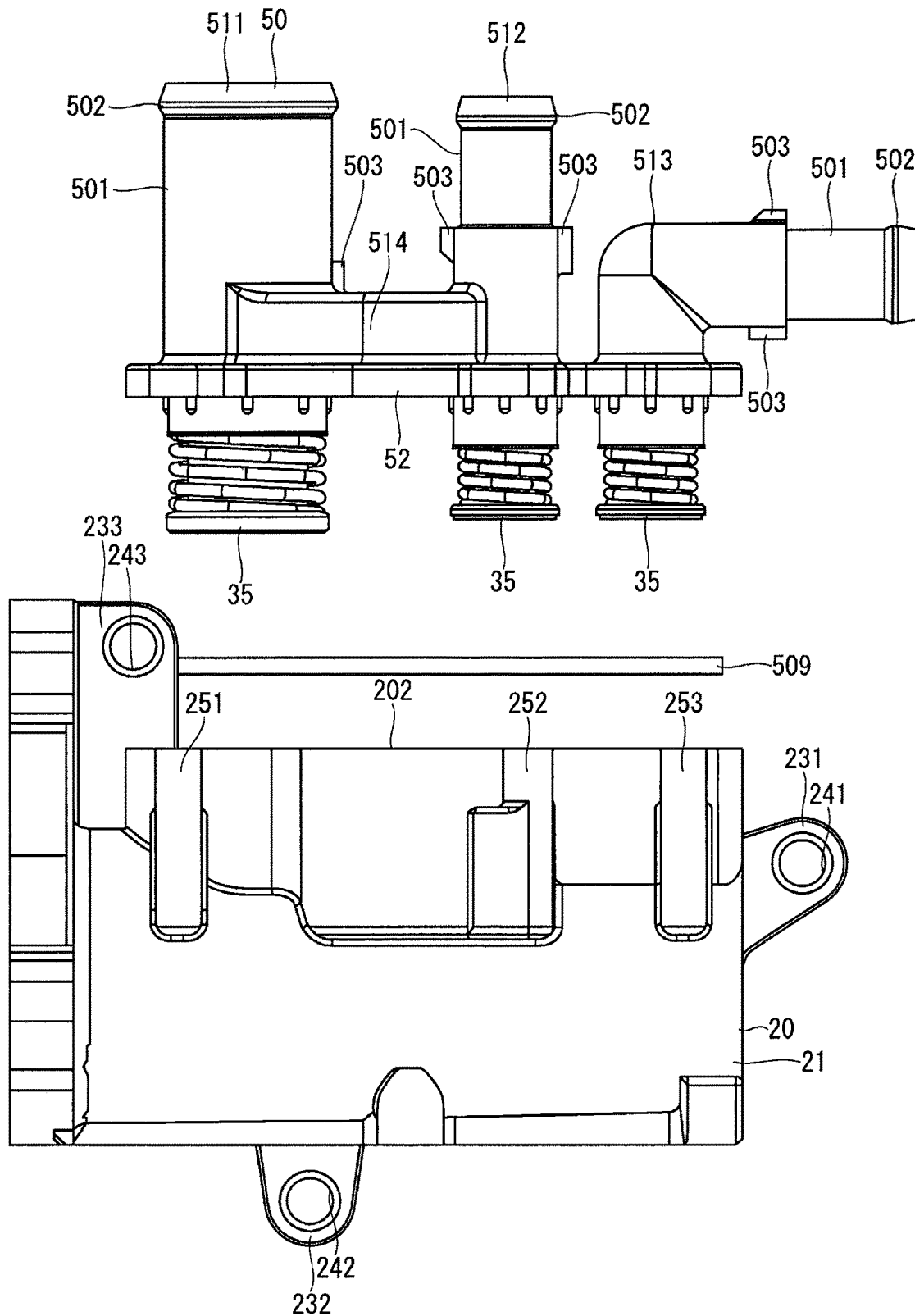
FIG. 51 is an exploded view showing a part of the valve device of the sixth embodiment.

As shown in FIG. 42, the housing 20 has the outlet ports 221 to 223. As shown in FIG. 42, FIG. 50, and FIG. 51, the pipe member 50 has the pipes 511 to 513 connected to each other. The valve device 10 has multiple seal units 35 which are respectively provided in the pipes 511 to 513, and are configured to seal fluid-tightly between the seal units 35 and the outer peripheral wall of the valve body 31.

Accordingly, it is possible to reduce the number of parts regarding tapping, washer, spring washer, and the like. Further, it is possible to reduce the number of assembling steps of the pipe member 50.

The ends of the pipes 511 to 513 provided with the seal unit 35 are connected to each other with the pipe connection part 52. The ends of the pipes 511 to 513 provided with the seal unit 35 are formed such that the respective axes are parallel to each other.

<5-2-1>

As shown in FIG. 42, among the inlet port 220 and the outlet ports 221 to 223, the outlet ports 221 to 223 provided with the seal unit 35 are provided such that the axes are parallel to each other, and they are opened in the pipe mounting surface 202. The outlet ports 221 to 223 are formed so as to be coaxial with the ends of the pipes 511 to 513 provided with the seal unit 35.

Accordingly, it is possible to assemble the pipe member 50, to which the multiple seal units 35 are assembled, to the housing main body 21 from one direction.

<5-3>

As shown in FIG. 42, FIG. 50, and FIG. 51, the valve device 10 is provided with the gasket 509. The gasket 509 is formed with an elastic member such as rubber. The gasket 509 is provided between the pipe member 50 and the pipe mounting surface 202 of the housing main body 21 on the radially outside of the respective pipes 511 to 513, and is configured to seal fluid-tightly between the pipe member 50 and the housing main body 21.

As shown in FIG. 51, the pipe member 50 can be assembled to the housing main body 21 in a status where the three seal units 35 are held in the pipes 511 to 513. Note that the gasket 509 is assembled, together with the pipe member 50, to the housing main body 21, in a status where the gasket 509 is fitted in a gasket groove 521 formed in the pipe connection part 52. That is, it is possible to assemble the pipe member 50, to which the multiple seal units 35 and the gasket 509 are assembled, to the housing main body 21, at once, from one direction.

Further, by assembling the multiple members at once, to reduce the number of assembling steps, it is possible to reduce multiple inconveniences which may occur upon assembling of the multiple members to one, to improve the quality of the valve device 10. This is important since the devices mounted in the vehicle 1 are expected to have high quality.

<5-4>

As shown in FIG. 47, the outlet ports 221 to 223 and the relief port 224 are formed such that the center is positioned on a straight line which connects two housing-side fastening holes of the multiple housing-side fastening holes (261 to 266) or inside a triangle formed with the three housing fastening holes.

More particularly, the outlet port 221 is formed such that the center is positioned inside a triangle To1 formed by connecting the center of the housing-side fastening hole 261, the center of the housing-side fastening hole 262, and the center of the housing-side fastening hole 264. The outlet port 222 is formed such that the center is positioned on a straight line Lo1 which connects the center of the housing-side fastening hole 262 and the center of the housing-side fastening hole 265. The outlet port 223 is formed such that the center is positioned inside a triangle To2 formed by connecting the center of the housing-side fastening hole 262, the center of the housing-side fastening hole 263, and the center of the housing-side fastening hole 266. The relief port 224 is formed such that the center is positioned inside the triangle To1.

Accordingly, it is possible to distribute and stabilize the seal load of the gasket 509 on the radially outside of the outlet ports 221 to 223 and the relief port 224.

<5-5>

As shown in FIG. 42, the housing 20 has the pipe mounting surface 202 formed on the outer wall of the housing main body 21 so as to be opposed to the pipe member 50 in a status where the pipe member 50 is attached to the housing main body 21. The ports formed in the housing main body 21 include the three outlet ports (221 to 223) opened in the pipe mounting surface 202, and one relief port 224.

As shown in FIG. 47, the valve device 10 is provided with the relief valve 39. The relief valve 39 is provided in the relief port 224. The relief valve 39 allows or blocks communication between the inner space 200 and the outside of the housing main body 21 via the relief port 224 in accordance with condition. More particularly, the relief valve 39 is opened when a predetermined condition is satisfied, i.e., when the temperature of the cooling water is equal to or higher than a predetermined temperature. The relief valve 39 allows communication between the inner space 200 and the outside of the housing main body 21 i.e. the space inside the pipe 511 via the relief port 224. When the temperature of the cooling water is lower than the predetermined temperature, the relief valve 39 blocks the above-described communication.

As shown in FIG. 47, at least two (221 to 223) of the three outlet ports (221 to 223) are formed such that the center of the respective openings is positioned on a port array straight line Lp1 as one straight line on the pipe mounting surface 202. Note that the port array straight line Lp1 is parallel to the mounting surface 201 and is positioned on the virtual plane Vp5.

The relief port 224 is formed such that the center of the opening is positioned at a position away from the port array straight line Lp1 to the opposite side to the mounting surface 201.

Accordingly, it is possible to form the relief port 224 in the housing main body 21 while reducing the physical constitution of the housing main body 21 by linearly arraying the three outlet ports (221 to 223).

Note that the relief port 224 is formed in the housing main body 21 such that a part of the relief port 224 is positioned between the outlet port 221 and the outlet port 222.

<5-6>

As shown in FIG. 47, when viewed along the direction of the port array straight line Lp1, at least two (221 to 223) of the three outlet ports (221 to 223), and the relief port 224 are formed to be partially overlapped with each other.

Accordingly, it is possible to further reduce the physical constitution of the housing main body 21 in which the relief port 224 is formed.

<5-7>

As shown in FIG. 47, the relief port 224 is formed such that the center of the opening is positioned on a relief array straight line Lr1 that is a straight line on the pipe mounting surface 202 parallel to the port array straight line Lp1. Note that the relief array straight line Lr1 is positioned on the opposite side to the mounting surface 201 with respect to the port array straight line Lp1.

When viewed along the direction of the port array straight line Lp1, a part of at least two (221 to 223) of the three outlet ports (221 to 223) on the relief array straight line Lr1 side with respect to the port array straight line Lp1, and a part of the relief port 224 on the port array straight line Lp1 side with respect to the relief array straight line Lr1 are formed so as to be partially overlapped with each other.

Accordingly, it is possible to further reduce the physical constitution of the housing main body 21 in which the relief port 224 is formed.

<5-8>

As shown in FIG. 47, at least two (261 to 263) of the multiple housing-side fastening holes (261 to 266) are formed on a fastening hole array straight line Lh1 that is a straight line positioned on the relief port 224 side with respect to the port array straight line Lp1. Note that the fastening hole array straight line Lh1 is parallel to the port array straight line Lp1 and the relief array straight line Lr1, and is positioned on the opposite side to the port array straight line Lp1 with respect to the relief array straight line Lr1.

As shown in FIG. 47, the relief port 224 is formed so as to be overlapped with a part of the fastening hole array straight line Lh1.

Accordingly, it is possible to further reduce the physical constitution of the housing main body 21 in which the relief port 224 is formed.

<5-9>

As shown in FIG. 50, the pipes 511 to 513 have a pipe main body 501, and a pipe end 502 which is formed on the opposite side to the outlet ports 221 to 223 (pipe connection part 52) of the pipe main body 501, the inner diameter of which is larger than the inner diameter of the pipe main body 501, and the outer diameter of which is larger than the outer diameter of the pipe main body 501.

Accordingly, when the pipe end 502 is formed by e.g. forcible extraction, it is possible to remove the mold while easily transforming the pipe end 502 inside, thus it is possible to suppress cracking in the pipe end 502. This configuration enables to suppress leakage of the cooling water from the pipe end 502.

Note that since the outer diameter of the pipe end 502 is larger than the outer diameter of the pipe main body 501, it is possible to suppress falling out of a hose or the like connected to the pipe end 502.

<5-10>

As shown in FIG. 50, the pipes 511 to 513 have a pipe projection 503 which projects outward from an outer wall of the pipe main body 501.

With the pipe projection 503, it is possible to easily determine a fixing position of the hose with respect to the pipes 511 to 513, and to suppress deep piercing of the hose in the pipes 511 to 513.

<5-11>

As shown in FIG. 47, the pipe projection 503 is formed on the virtual plane Vp5 parallel to the mounting surface 201.

Accordingly, it is possible to reduce the size of the pipe member 50 in a direction vertical to the mounting surface 201, and to reduce the physical constitution of the valve device 10.

Note that one pipe projection 503 is formed with respect to the pipe 511. Two pipe projections 503 are formed with respect to the pipe 512 so as to hold the pipe 512 between the pipe projections 503. Two pipe projections 503 are formed with respect to the pipe 513 so as to hold the pipe 513 between the pipe projections 503 (see FIG. 50).

<5-12>

As shown in FIG. 50, the pipe member 50 has the multiple pipes (511 to 514), and the pipe connection part 52 which connects parts of the multiple pipes (511 to 514) on the housing main body 21 side.

Accordingly, it is possible to reduce the number of members, and it is possible to ensure sealability between the pipe member 50 and the housing main body 21 by providing the gasket 509 between the pipe connection part 52 and the housing main body 21.

<5-13>

As shown in FIG. 42, the housing 20 has the housing opening 210 which connects the inner space 200 and the outside of the housing main body 21, and the cylindrical housing inner wall 211, one end of which is connected to the housing opening 210, and which forms the inner space 200. The valve 30 has the shaft 32 provided on the rotational axis Axr1.

The valve device 10 is provided with the partition part main body 61 provided in the housing opening 210 so as to partition the inner space 200 from the outside of the housing main body 21, and the partition part 60 having the shaft insertion hole 62 formed in the partition part main body 61 such that one end of the shaft 32 can be inserted through the shaft insertion hole 62.

The inner diameter of the housing opening 210 is larger than the inner diameter of the end of the housing inner wall 211 on the opposite side to the housing opening 210.

Accordingly, it is possible to increase the flow path area of the inner space 200 on the housing opening 210 side. This configuration enables to increase the flow rate of the cooling water to flow especially to the outlet port 221 (radiator 5) side formed on the housing opening 210 side.

<5-13-1>

As shown in FIG. 42, the ring seal member 600 which is provided between the housing opening 210 and the partition part main body 61 of the partition part 60, and which is configured to seal fluid-tightly between the housing opening 210 and the partition part 60, is provided.

Accordingly, when the inner diameter of the housing opening 210 is formed to be constant, it is possible to adopt the ring seal member 600 having a standard shape the inner diameter and the outer diameter of which are constant, and it is possible to reduce the cost.

<5-14>

As shown in FIG. 42, the housing inner wall 211 is formed in a tapered shape such that the inner diameter becomes smaller from the housing opening 210 side toward the opposite side to the housing opening 210.

Accordingly, it is possible to gradually increase the flow path area of the inner space 200 toward the housing opening 210 side. Further, as a step is not formed in the housing inner wall 211, it is possible to reduce the water conduction resistance in the inner space 200.

<5-15>

As shown in FIG. 47, at least two (outlet ports 221 to 223) of the multiple ports formed in the housing main body 21 are formed so as to be arrayed in a direction parallel to the mounting surface 201.

Accordingly, it is possible to reduce the size of the housing main body 21 in a direction vertical to the mounting surface 201, and to reduce the physical constitution of the valve device 10.

<5-16>

As shown in FIG. 49, the pipe fastening member 540 is a tapping screw which can be screwed, while tapping is performed, into the housing-side fastening holes 261 to 266.

Accordingly, it is not necessary to insert-mold a metal member having a thread groove or the like in the housing-side fixing parts 251 to 256. Further, since the housing gap Sh1 is formed between the housing-side fixing parts 251 to 256 and the outer wall of the housing main body 21, even when a crack occurs in the housing-side fixing parts 251 to 256 upon screwing of the pipe fastening member 540 into the housing-side fastening holes 261 to 266, it is possible to suppress extension of the crack to the housing main body 21.

<6-1>

Figure 52:
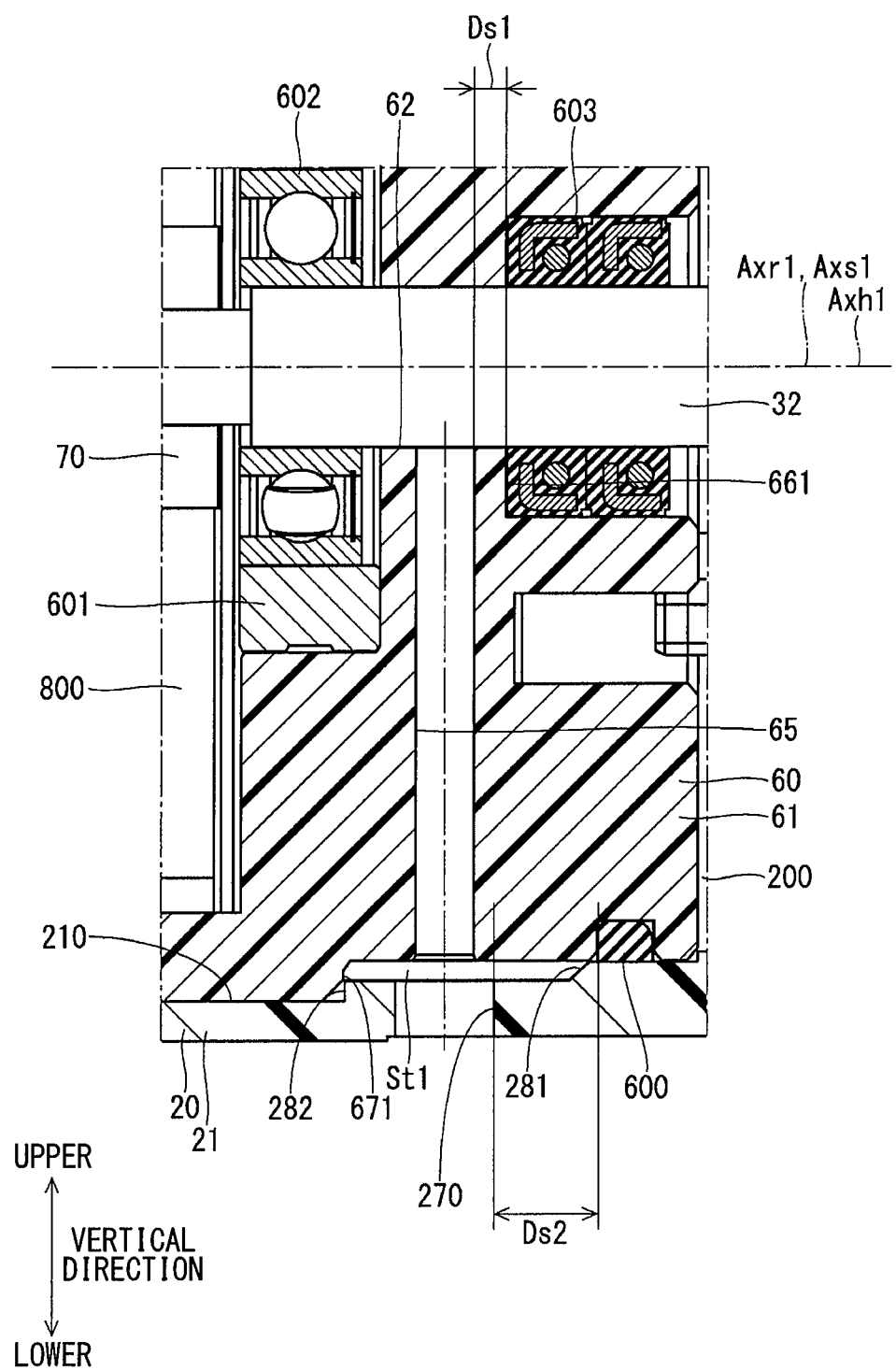
FIG. 52 is a cross-sectional view showing a vicinity of a partition through hole in the valve device of the sixth embodiment.

As shown in FIG. 52, the partition part 60 has the partition through hole 65 which extends outward from the shaft insertion hole 62 and which is opened in the outer wall of the partition part main body 61.

<6-1>

As described above, the present embodiment relates to the valve device 10 configured to control the cooling water in the engine 2 of the vehicle 1. The valve device 10 is provided with the housing 20, the valve 30, the partition part 60, and the driving part 70.

The housing 20 has the housing main body 21 defining the inner space 200 therein, the ports (220, 221, 222, and 223) which connect the inner space 200 to the outside of the housing main body 21, and the housing opening 210 which connects the inner space 200 to the outside of the housing main body 21.

The valve 30 has the valve body 31 rotational about the rotational axis Axr1 in the inner space 200, the valve body flow path 300 formed inside the valve body 31, the valve body openings (410, 420, and 430) which connect the valve body flow path 300 to the outside of the valve body 31, and the shaft 32 provided on the rotational axis Axr1. The valve 30 is configured to change the communication status between the valve body flow path 300 and the ports via the valve body openings with the rotational position of the valve body 31.

The partition part 60 has the partition part main body 61 provided in the housing opening 210 so as to partition the inner space 200 from the outside of the housing main body 21, and the shaft insertion hole 62 formed in the partition part main body 61 such that one end of the shaft 32 can be inserted through the shaft insertion hole 62.

The driving part 70 is provided on the opposite side to the inner space 200 with respect to the partition part 60, and is capable of rotate-driving the valve body 31 via one end of the shaft 32.

The partition part 60 has the partition through hole 65 which extends outward from the shaft insertion hole 62 and which is opened in the outer wall of the partition part main body 61.

Accordingly, it is possible to feed the cooling water, which flows from the inner space 200 through the shaft insertion hole 62 toward the driving part 70 side, to the partition through hole 65. This configuration enables to suppress flowing of the cooling water in the inner space 200 to the driving part 70 side.

<6-1-1>

The partition through hole 65 is formed such that the cross-sectional shape vertical to the axis is an elliptical or rectangular shape.

Accordingly, it is possible to suppress the influence of surface tension in the partition through hole 65 while reducing the physical constitution of the partition part main body 61, and it is possible to facilitate flowing of the cooling water in the partition through hole 65.

Note that the partition through hole 65 is formed such that the short direction of the cross-section is parallel to an axis Axh1 of the shaft insertion hole 62. Accordingly, it is possible to reduce the physical constitution of the partition part main body 61 in the axis Axh1 direction.

<6-2>

As shown in FIG. 52, the housing 20 has the housing through hole 270 which extends outward from the inner wall of the housing opening 210, which is opened in the outer wall of the housing main body 21, and which is formed so as to be communicable with the partition through hole 65. Note that the housing through hole 270 is opened in the end surface of the housing main body 21 on the opposite side to the pipe mounting surface 202.

Accordingly, it is possible to discharge the cooling water, flowing to the partition through hole 65, from the housing through hole 270 to the outside.

Note that when the amount of the cooling water which flows from the inner space 200 to the driving part 70 side is large, it is possible to discharge the cooling water via the partition through hole 65 and the housing through hole 270 to the outside, and it is possible to let the user notice leakage of the cooling water in the shaft insertion hole 62. This configuration enables to let the user respond to the leakage which requires a countermeasure.

On the other hand, when the amount of the cooling water which flows from the inner space 200 to the driving part 70 side is small, it is possible to keep the cooling water in the partition through hole 65 and the housing through hole 270, and it is possible to let the user not notice leakage of the cooling water in the shaft insertion hole 62. This configuration enables to suppress causing the user to respond to even leakage which does not require a countermeasure.

<6-2-1>

The housing through hole 270 is formed such that a cross-sectional shape vertical to the axis is an elliptical or rectangular shape.

Accordingly, it is possible to suppress the influence of surface tension in the housing through hole 270 while reducing the physical constitution of the housing main body 21, and it is possible to facilitate flowing of the cooling water in the housing through hole 270.

Note that the housing through hole 270 is formed such that the short direction of the cross-section is parallel to the axis Axh1 of the shaft insertion hole 62. Accordingly, it is possible to reduce the physical constitution of the housing main body 21 in the axis Axh1 direction.

<6-2-2>

As shown in FIG. 52, the partition through hole 65 and the housing through hole 270 are coaxially formed with each other.

Accordingly, it is possible to easily discharge the cooling water, flowing to the partition through hole 65, from the housing through hole 270 to the outside.

<6-3>

As shown in FIG. 52, the valve device 10 is provided with an axis seal member 603 and the ring seal member 600. The axis seal member 603 is formed of an elastic member mainly of e.g. rubber, in a ring shape. The axis seal member 603 is provided between the shaft 32 and the shaft insertion hole 62 on the inner space 200 side with respect to the partition through hole 65. The axis seal member 603 is configured to seal fluid-tightly between the shaft 32 and the shaft insertion hole 62.

The ring seal member 600 is formed of an elastic member of e.g. rubber, in a ring shape. The ring seal member 600 is provided between the partition part main body 61 and the inner wall of the housing opening 210 on the inner space 200 side with respect to the housing through hole 270. The ring seal member 600 is configured to seal fluid-tightly between the partition part main body 61 and the inner wall of the housing opening 210. Note that the axis seal member 603 and the ring seal member 600 respectively correspond to a "first seal member" and a "second seal member".

Accordingly, it is possible, with the axis seal member 603, to suppress leakage of the cooling water from the inner space 200 via the shaft insertion hole 62 to the driving part 70 side. Further, it is possible, with the ring seal member 600, to suppress leakage of the cooling water from the inner space 200 to the outside via the interval between the partition part main body 61 and the housing opening 210.

Further, the axis seal member 603 is provided in a position away, by a predetermined distance, to the inner space 200 side, with respect to the partition through hole 65. Accordingly, it is possible to form space between the partition through hole 65 and the axis seal member 603. Accordingly, when the amount of leakage of the cooling water is small, it is possible to keep the cooling water in the space, and to let the user not notice the leakage of the cooling water.

Further, the ring seal member 600 is provided in a position away, by a predetermined distance, to the inner space 200 side, with respect to the housing through hole 270. Accordingly, it is possible to form space between the housing through hole 270 and the ring seal member 600. Accordingly, when the amount of leakage of the cooling water is small, it is possible to keep the cooling water in the space, and to let the user not notice the leakage of the cooling water.

<6-4>

As shown in FIG. 52, a distance Ds1 between the axis seal member 603 and the partition through hole 65 is shorter than a distance Ds2 between the ring seal member 600 and the housing through hole 270.

Accordingly, it is possible to make the space formed between the housing through hole 270 and the ring seal member 600 larger than the space formed between the partition through hole 65 and the axis seal member 603. This configuration enables to keep a larger amount of cooling water on the space side formed between the housing through hole 270 and the ring seal member 600.

<6-5>

As shown in FIG. 52, the partition part 60 has a partition inner step surface 661 which forms a step between the partition through hole 65 of the shaft insertion hole 62 and the axis seal member 603. Note that the partition inner step surface 661 is formed in a ring planar shape so as to face the inner space 200 side. The axis seal member 603 is provided so as to be abuttable on the partition inner step surface 661.

The housing 20 has a housing step surface 281 which forms a step between the housing through hole 270 in the inner wall of the housing opening 210 and the ring seal member 600. Note that the housing step surface 281 is formed in a ring shape so as to face the driving part 70 side.

Accordingly, when the amount of leakage of the cooling water is small, by keeping the cooling water in the partition inner step surface 661 and the housing step surface 281, it is possible to let the user not notice the small amount of leakage of the cooling water.

Further, even when water or the like intrudes from the outside via the housing through hole 270, by keeping the water or the like in the partition inner step surface 661 and the housing step surface 281, it is possible to suppress flowing of the water or the like to the axis seal member 603 and the ring seal member 600.

<6-6>

As shown in FIG. 52, the housing step surface 281 is formed in a tapered shape such that the inner diameter becomes larger from the inner space 200 side toward the driving part 70 side.

Accordingly, it is possible to enlarge the space formed between the housing through hole 270 and the ring seal member 600, and it is possible to keep a large amount of cooling water in the space.

Note that the housing 20 has a housing step surface 282 which forms a step on the driving part 70 side of the housing through hole 270 in the inner wall of the housing opening 210. The housing step surface 282 is formed in a ring shape so as to face the driving part 70 side.

Further, the partition part 60 has a partition outer step surface 671 which forms a step on the driving part 70 side of the partition through hole 65 in the outer wall of the partition part main body 61. The partition outer step surface 671 is formed in a ring shape so as to face the inner space 200 and the housing step surfaces 281 and 282.

As shown in FIG. 52, cylindrical space St1 in an approximately cylindrical shape is formed between the housing step surface 281 and the partition outer step surface 671, between the outer wall of the partition part main body 61 and the inner wall of the housing opening 210. The partition through hole 65 and the housing through hole 270 communicate with each other via the cylindrical space St1.

When the amount of leakage of the cooling water is small, it is possible to keep the cooling water in the cylindrical space St1.

<6-8>

As shown in FIG. 52, in a status where the housing 20 is attached to the engine 2, the partition through hole 65 is positioned on the lower side in the vertical direction with respect to the shaft 32.

Accordingly, when the amount of leakage of the cooling water is large, it is possible to quickly feed the cooling water to the partition through hole 65.

<6-9>

As shown in FIG. 52, in a status where the housing 20 is attached to the engine 2, the housing through hole 270 is positioned on the lower side in the vertical direction to the shaft 32.

Accordingly, when the amount of leakage of the cooling water is large, it is possible to quickly discharge the cooling water from the housing through hole 270 to the outside.

<6-10>

As shown in FIG. 52, the partition through hole 65 and the housing through hole 270 have cross-sectional areas different from each other in a cross-section vertical to the axis. Note that the cross-sectional area of the housing through hole 270 is larger than the cross-sectional area of the partition through hole 65.

Accordingly, even when the housing main body 21 and the partition part 60 are positionally shifted, it is possible to ensure communication between the partition through hole 65 and the housing through hole 270. Further, since the cross-sectional area of the housing through hole 270 is larger than the cross-sectional area of the partition through hole 65, it is possible to quickly discharge the cooling water from the housing through hole 270 to the outside. Further, it is possible to suppress intrusion of water or the like from the outside via the housing through hole 270 and the partition through hole 65 into the shaft insertion hole 62 side.

Seventh Embodiment

Figure 53:
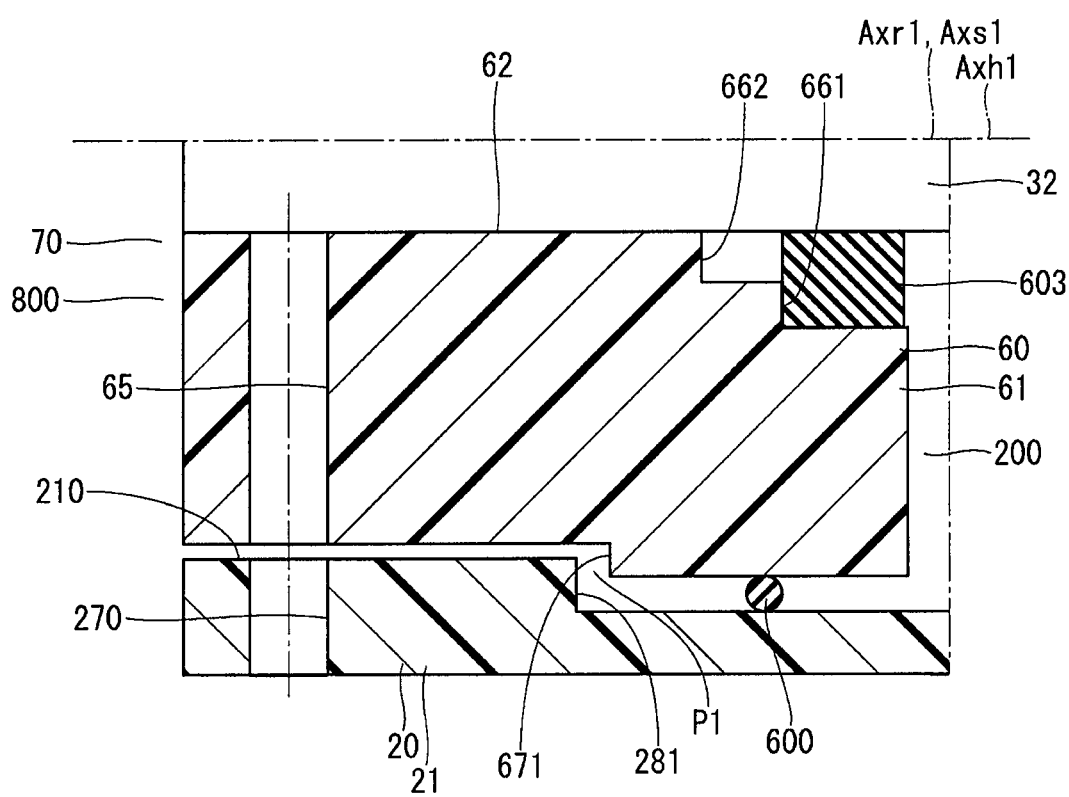
FIG. 53 is a cross-sectional view showing the vicinity of the partition through hole in the valve device of a seventh embodiment.

FIG. 53 shows a part of the valve device according to a seventh embodiment.

<6-5>

As shown in FIG. 53, the partition part 60 has a partition inner step surface 662 which forms a step between the partition through hole 65 of the shaft insertion hole 62 and the axis seal member 603. Note that the partition inner step surface 662 is formed in a ring planar shape so as to face the inner space 200 side. The partition inner step surface 662 is formed on the partition through hole 65 side with respect to the partition inner step surface 661.

Accordingly, it is possible to form space between the partition inner step surface 662 and the axis seal member 603. With this configuration, when the amount of leakage of the cooling water is small, by keeping the cooling water in the space, it is possible to let the user not notice the small amount of leakage of the cooling water.

Further, even when water or the like intrudes from the outside via the housing through hole 270, by keeping the water or the like in the space, it is possible to suppress flowing of the water or the like to the axis seal member 603.

The housing step surface 281 is formed in a ring shape so as to face the inner space 200 side. The partition outer step surface 671 is formed in a ring shape so as to face the side of the driving part 70 and the housing step surface 281 between the housing step surface 281 and the ring seal member 600. Note that the partition outer step surface 671 and the housing step surface 281 are away from each other by a predetermined distance while facing each other. Accordingly, a passage P1 in a labyrinth shape is formed between the ring seal member 600 and the housing through hole 270, between the outer wall of the partition part main body 61 and the inner wall of the housing opening 210.

Accordingly, even when water or the like intrudes from the outside via the housing through hole 270, by keeping the water or the like in the passage P1, it is possible to suppress flowing of the water or the like to the ring seal member 600.

Eighth Embodiment

Figure 54:
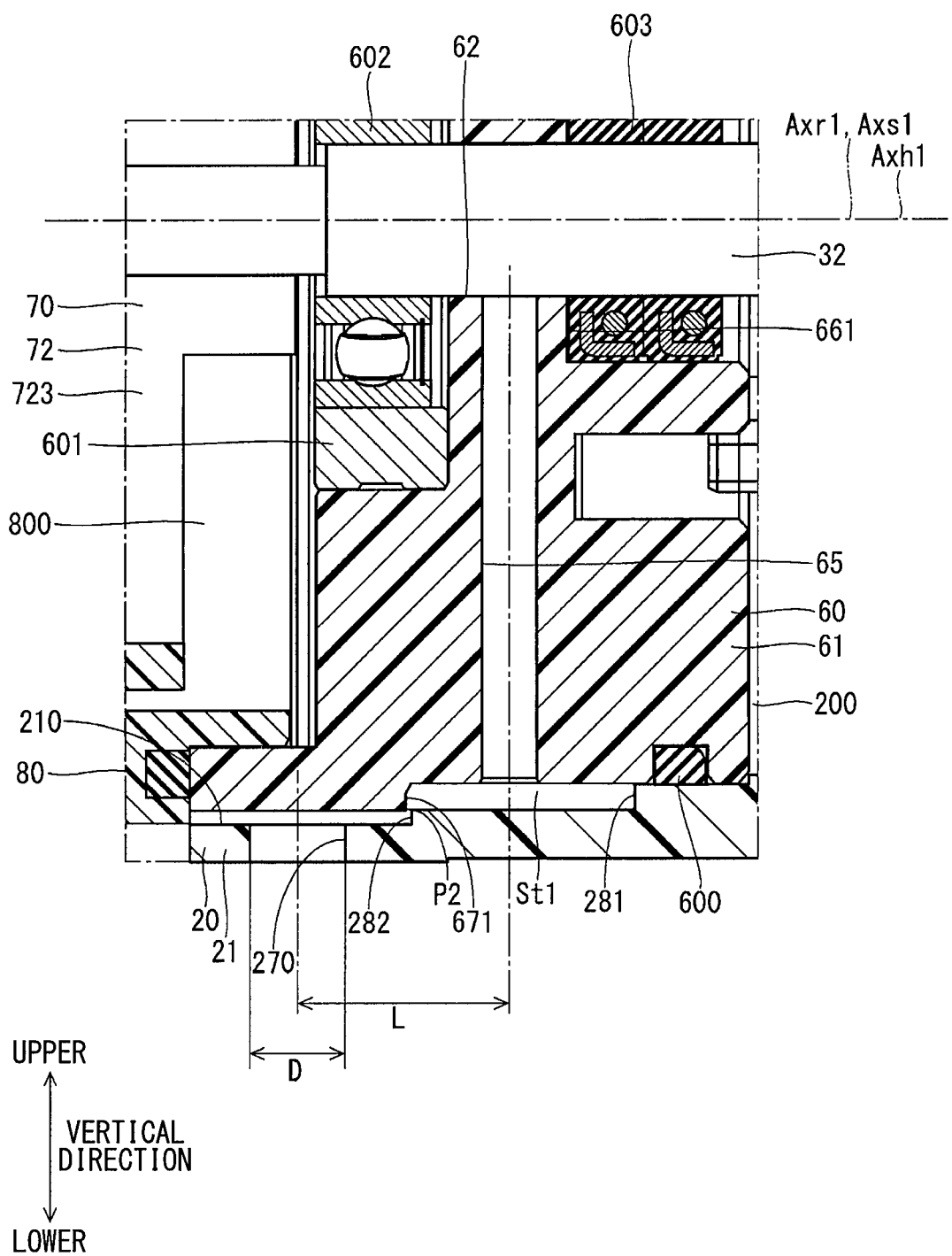
FIG. 54 is a cross-sectional view showing the vicinity of the partition through hole in the valve device of an eighth embodiment.

FIG. 54 shows a part of the valve device according to an eighth embodiment. In the eighth embodiment, the position of the housing through hole 270 and the like are different from those in the sixth embodiment.

<6-11>

As shown in FIG. 54, the axial positions of the partition through hole 65 and the housing through hole 270 are different from each other in the axis (Axh1) direction of the shaft insertion hole 62. Note that the housing through hole 270 is formed on the driving part 70 side with respect to the partition through hole 65.

Accordingly, even when water or the like intrudes from the outside via the housing through hole 270, it is possible to suppress flowing of the water or the like to the shaft insertion hole 62 side via the partition through hole 65.

<6-11-1>

As shown in FIG. 54, assuming that the distance between the axis of the partition through hole 65 and the axis of the housing through hole 270 is L, and the size of the housing through hole 270 in the axis (Axh1) direction of the shaft insertion hole 62 is D, the partition through hole 65 and the housing through hole 270 are formed so as to satisfy relationship D≤L≤10D.

Accordingly, even when water or the like intrudes from the outside via the housing through hole 270, it is possible to more effectively suppress flowing of the water or the like to the shaft insertion hole 62 side via the partition through hole 65.

<6-12>

As shown in FIG. 54, the partition part 60 has the partition outer step surface 671 which forms a step between the partition through hole 65 in the outer wall of the partition part main body 61 and the housing through hole 270.

Accordingly, even when water or the like intrudes from the outside via the housing through hole 270, by keeping the water or the like in the partition outer step surface 671, it is possible to suppress flowing of the water or the like to the shaft insertion hole 62 side via the partition through hole 65.

As shown in FIG. 54, the housing through hole 270 is formed on the driving part 70 side with respect to the housing step surface 282 and the partition outer step surface 671. Note that the partition outer step surface 671 and the housing step surface 282 are away from each other by a predetermined distance while facing each other. Accordingly, a passage P2 in a labyrinth shape is formed between the housing through hole 270 and the partition through hole 65, between the outer wall of the partition part main body 61 and the inner wall of the housing opening 210.

Accordingly, even when water or the like intrudes from the outside via the housing through hole 270, by keeping the water or the like in the passage P2, it is possible to suppress flowing of the water or the like to the shaft insertion hole 62 side via the partition through hole 65.

Ninth Embodiment

Figure 55:
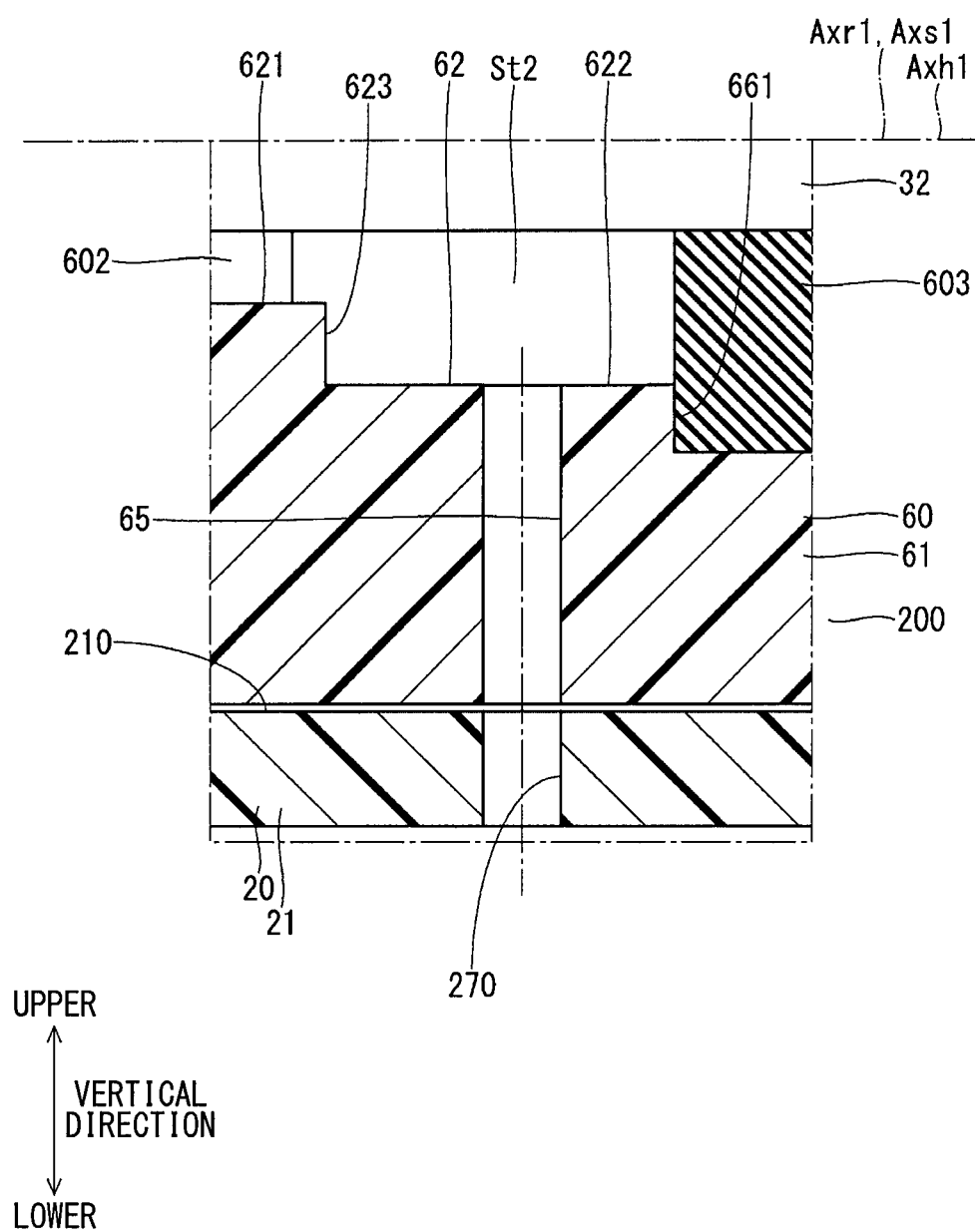
FIG. 55 is a cross-sectional view showing the vicinity of the partition through hole in the valve device of a ninth embodiment.

FIG. 55 shows a part of the valve device according to a ninth embodiment.

<6-13>

As shown in FIG. 55, the valve device 10 is provided with the bearing 602. The bearing 602 is provided on the driving part 70 side with respect to the partition through hole 65 of the shaft insertion hole 62, and bearing-supports one end of the shaft 32.

Accordingly, by feeding the cooling water, which flows from the inner space 200 to the driving part 70 side, to the partition through hole 65, it is possible to suppress flowing of the cooling water to the bearing 602.

<6-14>

As shown in FIG. 55, the shaft insertion hole 62 has a small diameter part 621 accommodating the bearing 602 therein, a large diameter part 622 which has an inner diameter larger than the small diameter part 621 and in which the partition through hole 65 is opened, and an insertion-hole step surface 623 formed between the small diameter part 621 and the large diameter part 622.

The insertion-hole step surface 623 is formed in a ring shape so as to face the inner space 200 side. As shown in FIG. 55, cylindrical space St2 in an approximately cylindrical shape is formed between the axis seal member 603 and the bearing 602, on the radially outside of the shaft 32. The partition through hole 65 is connected to the cylindrical space St2.

Accordingly, by keeping the cooling water, which flows from the inner space 200 to the driving part 70 side, in the cylindrical space St2, it is possible to suppress flowing of the cooling water to the bearing 602. Further, even when water or the like intrudes from the outside via the housing through hole 270, by keeping the water or the like in the cylindrical space St2, it is possible to suppress flowing of the water or the like to the bearing 602.

Tenth Embodiment

Figure 56:
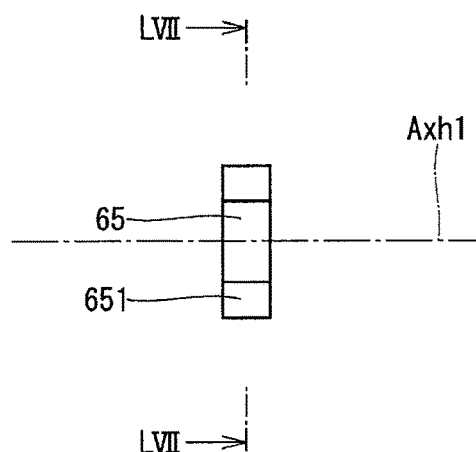
FIG. 56 is a diagram showing the partition through hole in the valve device of a tenth embodiment.
Figure 57:
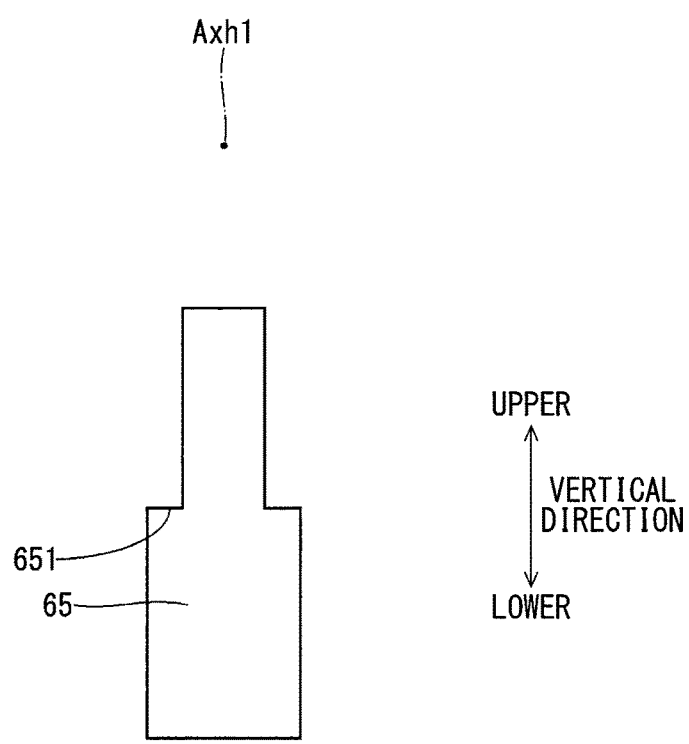
FIG. 57 is a diagram showing the partition through hole in the valve device of the tenth embodiment.

FIG. 56 and FIG. 57 show a part of the valve device according to a tenth embodiment.

<6-15>

As shown in FIG. 56 and FIG. 57, a partition through-hole step surface 651 which forms a step between one end and the other end in the partition through hole 65 is formed in the partition through hole 65.

The partition through-hole step surface 651 is formed so as to face the lower side in the vertical direction in a status where the valve device 10 is attached to the engine 2. Accordingly, the cross-sectional area of the partition through hole 65 on the lower side in the vertical direction is larger than the cross-sectional area on the upper side in the vertical direction.

Accordingly, even when water or the like intrudes from the outside via the housing through hole 270, by keeping the water or the like in the partition through-hole step surface 651, it is possible to suppress flowing of the water or the like to the shaft insertion hole 62.

Eleventh Embodiment

Figure 58:
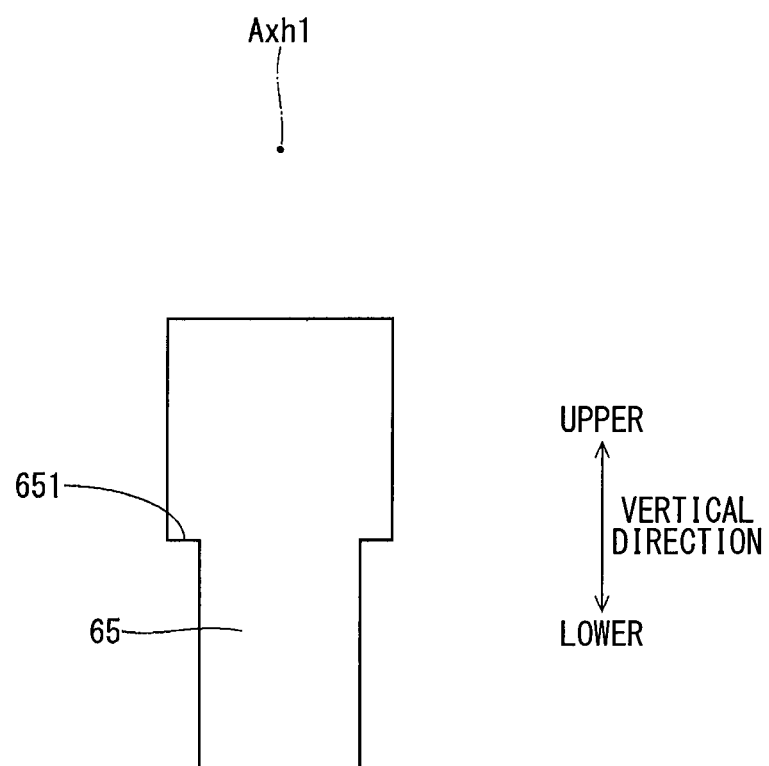
FIG. 58 is a diagram showing the partition through hole in the valve device of an eleventh embodiment.

FIG. 58 shows a part of the valve device according to an eleventh embodiment.

<6-15>

As shown in FIG. 58, the partition through-hole step surface 651 is formed so as to face the upper side in the vertical direction in a status where the valve device 10 is attached to the engine 2. Accordingly, the cross-sectional area of the partition through hole 65 on the upper side in the vertical direction is larger than the cross-sectional area on the lower side in the vertical direction.

Accordingly, when the amount of leakage of the cooling water is small, by keeping the cooling water in the partition through-hole step surface 651, it is possible to let the user not notice the small amount of leakage of the cooling water.

Twelfth Embodiment

Figure 59:
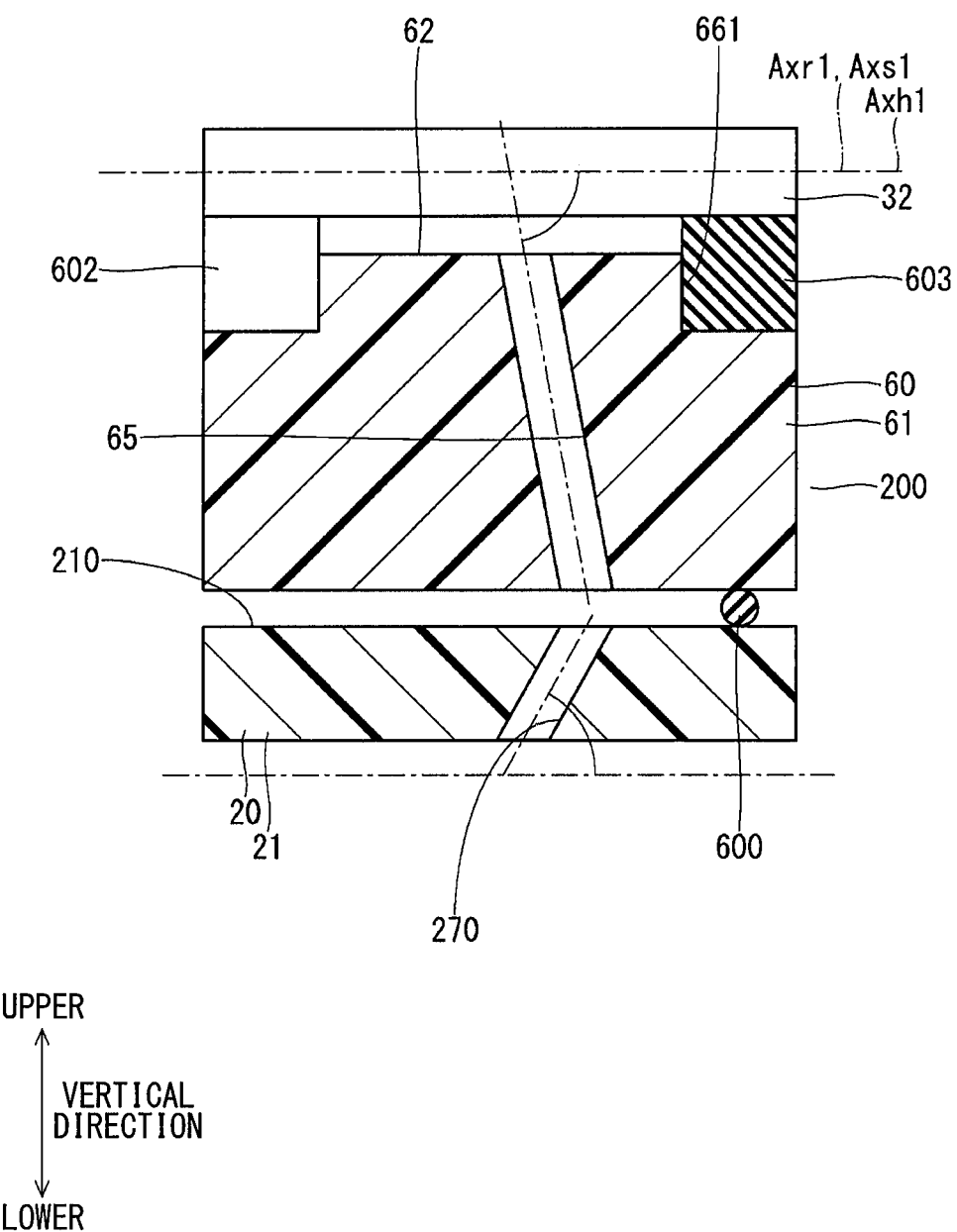
FIG. 59 is a cross-sectional view showing the vicinity of the partition through hole in the valve device of a twelfth embodiment.

FIG. 59 shows a part of the valve device according to a twelfth embodiment.

<6-16>

As shown in FIG. 59, the partition through hole 65 and the housing through hole 270 are formed such that the respective axes are not orthogonal to the axis Axh1 of the shaft insertion hole 62.

Accordingly, even when water or the like intrudes from the outside via the housing through hole 270, it is possible to suppress flowing of the water or the like to the shaft insertion hole 62 via the partition through hole 65.

Note that the partition through hole 65 and the housing through hole 270 are formed such that the axes intersect.

Thirteenth Embodiment

Figure 60:
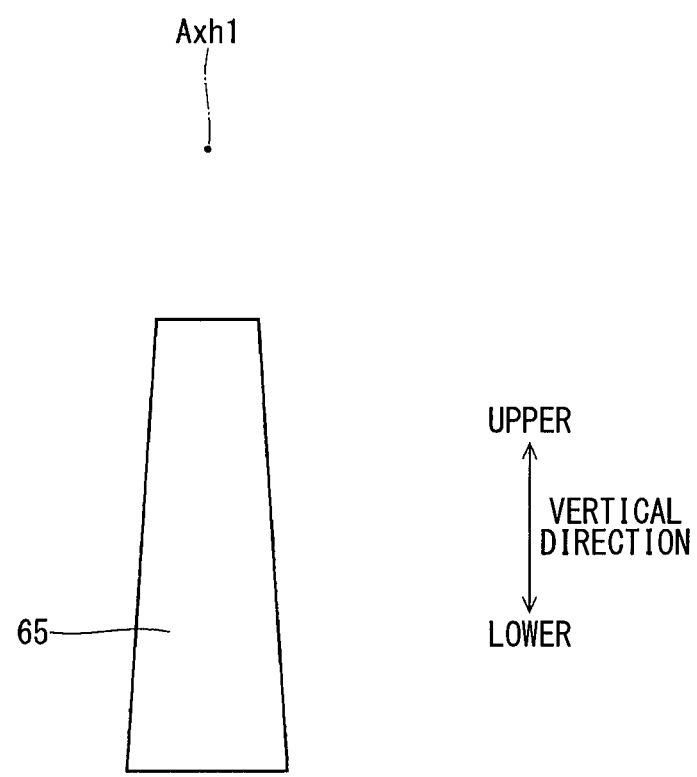
FIG. 60 is a diagram showing the partition through hole in the valve device of a thirteenth embodiment.

FIG. 60 shows a part of the valve device according to a thirteenth embodiment.

<6-17>

As shown in FIG. 60, the partition through hole 65 is formed such that the cross-sectional area is gradually increased from the radially inside of the shaft insertion hole 62 toward the radially outside.

Accordingly, when the amount of leakage of the cooling water is large, it is possible to quickly discharge the cooling water from the housing through hole 270 via the partition through hole 65 to the outside.

Other Embodiments

<3-7-1>

With respect to the third embodiment, the first regulation convex member 332 may be formed in a position away from the second regulation convex member 342.

<3-7-2>

Further, the distance between the first regulation convex member 332 and the rotational axis Axr1 may be the same as or may be different from the distance between the second regulation convex member 342 and the rotational axis Axr1.

Note that when the distance between the first regulation convex member 332 and the rotational axis Axr1 and the distance between the second regulation convex member 342 and the rotational axis Axr1 are the same, the first regulation convex member 332 and the second regulation convex member 342 abut on the regulating part 631, and it is possible to make the abutment load same when the first regulation convex member 332 and the second regulation convex member 342 abut on the regulation part 631 and the rotation of the valve body 31 is regulated.

<6-1-16-1>

With respect to the thirteenth embodiment, the partition through hole 65 may be formed such that the cross-sectional area is gradually increased from the radially outside of the shaft insertion hole 62 toward the radially inside.

In this case, even when water or the like intrudes from the outside via the housing through hole 270, it is possible to suppress flowing of the water or the like to the shaft insertion hole 62 via the partition through hole 65.

In the above-described embodiments, an example where the housing main body 21 and the partition part 60 are separately formed has been shown. On the other hand, in another embodiment, the housing main body 21 and the partition part 60 may be formed integrally with each other.

Further, in the above-described embodiments, an example where the inlet port 220, the outlet ports 221 to 223, and the relief port 224 are formed in the direction orthogonal to the axis of the shaft 32 has been shown. On the other hand, in another embodiment, the inlet port 220, the outlet ports 221 to 223, and the relief port 224 may be formed in the axial direction of the shaft 32. Further, the valve device 10 may be used such that the cooling water flows in from the outlet ports 221 to 223, and the cooling water flows out from the inlet port 220. Further, the number of the inlet ports, the outlet ports, and the relief ports, formed in the housing main body 21, may be unlimited.

In the above-described embodiments, an example where the valve device 10 is applied to the engine 2 as a heating element has been shown. On the other hand, in another embodiment, the valve device may be adopted as a valve device to control cooling water in a battery as a heating element mounted in a hybrid car, an electric vehicle, and the like.

Further, the valve device 10 may be attached, in any posture, to the heating element.

In this manner, the present disclosure is not limited to the above embodiments, but can be implemented in various forms within a range not departing from the subject matter.

<1> <Subject>

For example, in the valve device described in Patent Literature 1, the inlet port or the outlet port is connected via a hose or the like to the internal combustion engine of the vehicle. Note that when the inlet port or the outlet port is directly connected without hose or the like to the internal combustion engine, there is a possibility that the sealability between the inlet port or the outlet port and the internal combustion engine is lowered, and the cooling water is leaked to the outside in accordance with arrangement of the fastening point between the valve device and the internal combustion engine.

The purpose of the present disclosure is to provide a valve device capable of suppressing leakage of cooling water from a position between the valve device and a heating element of a vehicle.

<1> <Means>

<1-1>

A first aspect of the present disclosure is a valve device configured to control cooling water in a heating element of a vehicle. The valve device has a housing and a valve. A housing main body is fixed, with a fastening member, passed through a fastening hole and screwed into the heating element, to the heating element. At least three fastening holes are formed. The opening of a port is formed inside a triangle formed by connecting the three fastening holes.

Accordingly, in a case where a ring seal member of an elastic member is provided around the port, when the housing main body is fixed to the heating element with the fastening member passed through the three fastening holes, the seal member can be compressed in well balance. This configuration enables to effectively ensure the sealability around the port.

<1-2>

A second aspect of the present disclosure is a valve device configured to control cooling water in a heating element of a vehicle. The valve device has a housing, a valve, a partition part, and a driving part. The housing main body is fixed, with a fastening member, passed through a fastening hole and screwed into the heating element, to the heating element. The fastening hole includes a first fastening hole which is formed on the radially outside of the opening of the port, a second fastening hole which is formed so as to hold the opening of the port between the second fastening hole and the first fastening hole, and a third fastening hole which is formed on the driving part side with respect to the first fastening hole and the second fastening hole.

Accordingly, in a case where a ring seal member of an elastic member is provided around the port, when the housing main body is fixed to the heating element with the fastening member passed through the first fastening hole and the second fastening hole, the seal member can be compressed in well balance. This configuration enables to effectively ensure the sealability around the port.

Further, it is possible to suppress the influence of the vibration of the heating element on the driving part by fixing the fastening part to the heating element with the fastening member passed through the third fastening hole.

Hereinbelow, representative technical ideas grasped from the respective embodiments will be described.

[A01]

A valve device configured to control cooling water in a heating element of a vehicle, comprising:

a housing having a housing main body defining an inner space therein, a mounting surface which is formed on an outer wall of the housing main body so as to be opposed to the heating element in a status where it is attached to the heating element, a port which is opened in the mounting surface and which connects the inner space to the outside of the housing main body, multiple fastening parts formed integrally with the housing main body, and multiple fastening holes formed in correspondence with the respective plurality of fastening parts; and a valve having a valve body which is rotational about a rotational axis in the inner space, and a valve body flow path which is formed inside the valve body and which is communicable with the port, wherein the housing main body is fixed, with a fastening member, passed through the fastening hole and screwed into the heating element, to the heating element, at least three fastening holes are formed, and the opening of the port is formed inside a triangle formed by connecting the three fastening holes.

[A02]

A valve device configured to control cooling water in a heating element of a vehicle, comprising:

a housing having a housing main body defining an inner space therein, a mounting surface which is formed on an outer wall of the housing main body and which is opposite to the heating element in a status where it is attached to the heating element, a port which is opened in the mounting surface and which connects the inner space to the outside of the housing main body, multiple fastening parts formed integrally with the housing main body, and multiple fastening holes formed in correspondence with the respective plurality of fastening parts;

a valve having a valve body which is rotational about a rotational axis in the inner space, a valve body flow path which is formed inside the valve body and which is communicable with the port, and a shaft provided on the rotational axis;

a partition part which partitions the inner space from the outside of the housing main body; and a driving part which is provided on the opposite side to the inner space with respect to the partition part, and which is capable of rotate-driving the valve body via the shaft, wherein the housing main body is fixed, with a fastening member, passed through the fastening hole and screwed into the heating element, to the heating element, and the fastening hole includes a first fastening hole which is formed on the radially outside of the opening of the port, a second fastening hole which is formed so as to hold the opening of the port between the second fastening hole and the first fastening hole, and a third fastening hole which is formed on the driving part side with respect to the first fastening hole and the second fastening hole.

[A03]

The valve device according to [A02], wherein the first fastening hole and the second fastening hole are formed to be in point symmetry with respect to the center of the opening of the port.

[A04]

The valve device according to [A02] or [A03], wherein the housing has a positioning member, which is formed on the mounting surface and which is capable of positioning the housing main body by being engaged with another member, and the positioning member includes a first positioning member which is formed on the radially outside of the opening of the port, and a second positioning member which is formed so as to hold the opening of the port between the second positioning member and the first positioning member.

[A05]

The valve device according to any one of [A01] to [A04], wherein the housing has a mounting surface recess which is dented from the mounting surface to the opposite side to the heating element.

[A06]

The valve device according to [A02], wherein the center of the opening of the port is positioned on a straight line which connects the first fastening hole and the second fastening hole.

[A07]

The valve device according to [A02], wherein the distance between the center of the opening of the port and the first fastening hole is the same as the distance between the center of the opening of the port and the second fastening hole.

[A08]

The valve device according to [A02], wherein the distance between the third fastening hole and the driving part is shorter than the distance between the third fastening hole and the center of the opening of the port.

[A09]

The valve device according to [A02], wherein the third fastening hole is formed such that the center is positioned on the driving part side with respect to a virtual plane which is passed through the center of an outlet port and which is orthogonal to the rotational axis.

[A10]

The valve device according to [A03], wherein the first fastening hole and the second fastening hole, in point symmetry with respect to the center of the opening of the port, are formed such that a straight line which is vertical to the opening surface of the port and which is passed through the center of the opening of the port passes through the rotational axis.

[A11]

The valve device according to [A04], wherein the first positioning member and the second positioning member are formed such that a second straight line which connects the first positioning member and the second positioning member is orthogonal to a first straight line which connects the first fastening hole and the second fastening hole.

[A12]

The valve device according to [A11], wherein the center of the first straight line and the center of the second straight line correspond with each other.

[A13]

The valve device according to [A05], wherein multiple mounting surface recesses are formed, and a rib between recesses is formed between the multiple mounting surface recesses.

[A14]

The valve device according to any one of [A01] to [A13], wherein the housing main body is formed of polyphenylene sulfide resin including a filler.

[B01]

A valve device configured to control cooling water in a heating element of a vehicle, comprising:

a housing having a housing main body defining an inner space therein, a port which connects the inner space to the outside of the housing main body, and a housing opening which connects the inner space to the outside of the housing main body;

a valve having a valve body which is rotational about a rotational axis in the inner space, a valve body flow path which is formed inside the valve body, a valve body opening which connects the valve body flow path to the outside of the valve body, and a shaft which is provided on the rotational axis, being configured to change a communication status between the valve body flow path and the port via the valve body opening with a rotational position of the valve body;

a partition part which is provided in the housing opening so as to partition the inner space from the outside of the housing main body, and which is capable of bearing-supporting the shaft;

a driving part cover which is provided on the opposite side to the inner space with respect to the partition part, and which forms driving part space between the driving part cover and the partition part; and a driving part which is provided in the driving part space, and which is capable of rotate-driving the valve body via the shaft.

[B02]

The valve device according to [B01], further comprising a ring seal member which is provided between the housing opening and the partition part, and is configured to seal fluid-tightly between the housing opening and the partition part, wherein the ring seal member is compressed in a radial direction between the housing opening and the partition part.

[B03]

The valve device according to [B01] or [B02], further comprising a fixing member which is capable of fixing the housing main body and the driving part cover in a status where the partition part is held between the housing main body and the driving part cover.

[B04]

The valve device according to any one of [B01] to [B03], wherein the partition part has a shaft insertion hole through which one end of the shaft can be inserted, and the valve device further comprises: a metal ring insert-molded in the partition part in the shaft insertion hole; and a bearing which is provided inside the metal ring and which bearing-supports one end of the shaft.

[B05]

The valve device according to [B04], wherein the partition part has a partition recess dented from a surface on the driving part cover side to the opposite side to the driving part cover on the radially outside of the metal ring.

[B06]

The valve device according to any one of [B01] to [B05], wherein the driving part has a motor which is capable of rotate-driving the shaft.

[B07]

The valve device according to [B06], further comprising an elastic member which is provided in a compressed status between the motor and the partition part.

[B08]

The valve device according to [B06] or [B07], wherein the motor is provided such that an axis is orthogonal to the axis of the shaft.

[B09]

The valve device according to any one of [B06] to [B08], further comprising a U-shaped feeding terminal, which is provided in the driving part cover, the end of which on the opening side faces the partition part side, and through which an electric current to be supplied to the motor flows, wherein the motor has a motor-side terminal which is connected to the opening of the feeding terminal at an end in an axial direction, and is provided such that the axis is parallel to a surface of the driving part cover which faces the partition part side.

[B10]

The valve device according to any one of [B06] to [B09], wherein the driving part has a gear part which is capable of transmitting a driving force of the motor to the shaft, and has a snap fit part which is snap-fittable to the driving part cover, and the valve device further comprises a holding member which holds the motor and the gear part between the holding member and the driving part cover.

[B11]

The valve device according to any one of [B06] to [B10], wherein the housing has a mounting surface which is formed on an outer wall of the housing main body so as to be opposed to the heating element in a status where it is attached to the heating element, and the motor has a motor shaft which outputs the driving force and a worm gear which is provided at an end of the motor shaft, and the motor is provided such that the motor shaft is vertical to the mounting surface and the worm gear faces to the opposite side to the mounting surface.

[B12]

The valve device according to [B01], further comprising a ring seal member which is provided between the housing opening and the partition part, and which is configured to seal fluid-tightly between the housing opening and the partition part, wherein in the housing opening, the inner wall is formed in a cylindrical shape, the partition part has a partition part main body which is positioned inside the housing opening and the outer wall of which is formed in a cylindrical shape, the ring seal member is provided between the housing opening and the partition part main body, and the difference between the inner diameter of the housing opening and the outer diameter of the partition part main body is smaller than the difference between the inner diameter and the outer diameter of the ring seal member in a free status.

[B13]

The valve device according to [B02], wherein in the axial direction of the ring seal member, an axial direction gap is formed between the ring seal member and at least one of the housing main body and the partition part.

[C01]

A valve device configured to control cooling water in a heating element of a vehicle, comprising:

a housing having a port which connects inner space to the outside;

a valve having a valve body which is rotational about a rotational axis in the inner space, a valve body flow path which is formed inside the valve body, a valve body opening which connects the valve body flow path to the outside of the valve body, and a shaft which is provided on the rotational axis, being configured to change a communication status between the valve body flow path and the port via the valve body opening with a rotational position of the valve body; and a valve seal in a ring shape which is provided in a position corresponding to the port so as to be abuttable on an outer peripheral wall of the valve body, defining a seal opening therein that is communicable with the valve body opening in accordance with the rotational position of the valve body is formed, and which is configured to seal fluid-tightly between the valve seal and the outer peripheral wall of the valve body, wherein in the valve body, at least a part of the outer peripheral wall is formed in a spherical shape, and at least a part of an inner peripheral wall is formed to be dented outward.

[C02]

The valve device according to [C01], wherein in the valve body, at least a part of the inner peripheral wall is formed in a spherical shape.

[C03]

The valve device according to [C02], wherein in the valve body, the distance between the inner peripheral wall and the outer peripheral wall is the same within a range of at least a part of a rotational axis direction and a circumferential direction.

[C04]

The valve device according to [C03], wherein in the valve body, the distance between the inner peripheral wall and the outer peripheral wall is the same within a range which corresponds to at least a seal opening in the rotational axis direction and the circumferential direction.

[C05]

The valve device according to any one of [C01] to [C04], wherein the valve body is formed of resin, and the shaft is provided integrally with the valve body by insert molding.

[C06]

The valve device according to any one of [C01] to [C05], wherein the valve body has a first split body and a second split body which are divided into two in a virtual plane including the rotational axis, and the first split body and the second split body are bonded in respective bonding surfaces.

[C07]

The valve device according to [C06] further comprising a partition part having a partition part main body which partitions the inner space from the outside of the housing, a shaft insertion hole which is formed in the partition part main body such that one end of the shaft can be inserted through, and a regulation recess which is dented from a surface of the partition part main body on the inner space side to the opposite side to the inner space, wherein the first split body has a first regulation convex member which extends from a surface on the partition part side to the regulation recess side, and an end of which is positioned in the regulation recess, and the second split body has a second regulation convex member which extends from the surface on the partition part side to the regulation recess side, and an end of which is positioned in the regulation recess.

[C08]

The valve device according to [C07], wherein the first regulation convex member extends along a surface direction of the bonding surface to the regulation recess side, and the second regulation convex member extends along the surface direction of the bonding surface to the regulation recess side while abuts on the first regulation convex member.

[C09]

The valve device according to any one of [C06] to [C08], wherein the valve body has a valve body opening rib which connects an inner edge of the valve body opening, and the valve body opening rib is formed in a position away from a virtual spherical surface along the outer peripheral wall of the valve body to the radially inside.

[C10]

The valve device according to [C09], wherein the valve body opening rib is formed in a linear shape.

[C11]

The valve device according to any one of [C06] to [C10], wherein when all the seal openings are covered with the outer peripheral wall of the valve body and in a fully closed status, the bonding surface is in a position away from the valve seal.

[C12]

The valve device according to any one of [C06] to [C11], wherein the valve body has a ball valve the outer peripheral wall of which is formed in a spherical shape, a cylindrical member which is positioned in the rotational axis direction with respect to the ball valve and the outer peripheral wall of which is formed in a cylindrical shape, and a specific shape part which is formed on the bonding surface in the cylindrical member and which has an outer wall with a curvature different from the curvature of the outer peripheral wall of the cylindrical member.

[C13]

The valve device according to any one of [C06] to [C12], wherein the valve body has a first ball valve the outer peripheral wall of which is formed in a spherical shape, a cylindrical connection part which is connected to the first ball valve in the rotational axis direction and the outer peripheral wall of which is formed in a cylindrical shape, a second ball valve which is connected to the cylindrical connection part on the opposite side to the first ball valve with respect to the cylindrical connection part and the outer peripheral wall of which is formed in the cylindrical shape, a first end surface opening which is formed in an end surface of the first ball valve in the rotational axis direction so as to connect space between valves formed between the first ball valve and the second ball valve on the radially outside of the cylindrical connection part to the valve body flow path of the first ball valve, and a second end surface opening which is formed in an end surface of the second ball valve in the rotational axis direction so as to connect the space between valves to the valve body flow path of the second ball valve, and the port communicates with the space between valves.

[C14]

The valve device according to any one of [C13], wherein the valve body is formed of resin, and the shaft is formed integrally with the valve body by insert molding in the cylindrical connection part.

[C15]

The valve device according to [C14], wherein the shaft has a rotation stop member which is capable of regulating relative rotation with respect to the cylindrical connection part, and the rotation stop member is formed to have a polygonal or non-round cross-sectional shape.

[C16]

The valve device according to any one of [C13] to [C15], wherein the valve body has a cylindrical valve connection part which is connected to the second ball valve on the opposite side to the cylindrical valve connection part with respect to the second ball valve, the outer peripheral wall and the inner peripheral wall of which are formed in the cylindrical shape, and inside of which the valve body flow path is formed, and a third ball valve which is connected to the cylindrical valve connection part on the opposite side to the second ball valve with respect to the cylindrical valve connection part, and the outer peripheral wall of which is formed in the spherical shape.

[C17]

The valve device according to [C16], wherein the outer diameter of the outer peripheral wall of the first ball valve is the same as the outer diameter of the outer peripheral wall of the third ball valve, and the area of a first outermost end surface as an end surface of the first ball valve on the opposite side to the third ball valve in the rotational axis direction is different from the area of a second outermost end surface as an end surface of the third ball valve on the opposite side to the first ball valve in the rotational axis direction.

[C18]

The valve device according to [C16] to [C17], wherein the valve body has a second valve body opening rib which connects the inner edge of the valve body opening of the second ball valve, and a third valve body opening rib which connects the inner edge of the valve body opening of the third ball valve, and the second valve body opening rib and the third valve body opening rib are formed in the same position in the circumferential direction of the valve body.

[C19]

The valve device according to any one of [C13] to [C18], wherein the valve body has a first end surface opening rib which connects the cylindrical connection part to the first ball valve over the first end surface opening, and a second end surface opening rib which connects the cylindrical connection part to the second ball valve over the second end surface opening.

[C20]

The valve device according to [C19], wherein the first end surface opening rib forms a first rib end surface gap between the first end surface opening rib and the end surface of the first ball valve in the rotational axis direction, and the second end surface opening rib forms a second rib end surface gap between the second end surface opening rib and the end surface of the second ball valve in the rotational axis direction.

[C21]

The valve device according to [C19] or [C20], wherein the first end surface opening rib is formed such that a surface on the second ball valve side is inclined with respect to the rotational axis, and the second end surface opening rib is formed such that a surface on the first ball valve side is inclined with respect to the rotational axis.

[C22]

A manufacturing method of a valve having a valve body which is rotational about a rotational axis, and a valve body flow path which is formed inside the valve body, wherein in the valve body, at least a part of an outer peripheral wall is formed in a spherical shape, at least a part of an inner peripheral wall is formed to be dented outward, the valve body has a first split body and a second split body divided into two in a virtual plane including the rotational axis, and the first split body and the second split body are bonded in respective bonding surfaces, the method including:

a primary molding process of resin-molding the first split body and the second split body respectively with a first mold and a second mold; and a secondary molding process of injecting resin between a welded part in the bonding surface of the first split body and a welded part in the bonding surface of the second split body, to weld the first split body and the second split body together.

[C23]

The valve manufacturing method according to [C22] further including a slide process of sliding the first split body or the second split body, in the first mold or the second mold, such that the respective bonding surfaces of the first split body and the second split body face each other, between the primary molding process and the secondary molding process.

[C24]

The manufacturing method of the valve according to [C22] or [C23], wherein the valve has a shaft provided on the rotational axis, and the method further includes a shaft placement process of placing the shaft on the rotational axis, between the primary molding process and the secondary molding process.

[C25]

A manufacturing method of a valve having a valve body which is rotational about a rotational axis and a valve body flow path which is formed inside the valve body, wherein in the valve body, at least a part of an outer peripheral wall is formed in a spherical shape, and at least a part of an inner peripheral wall is formed to be dented outward, the method including:

a resin molding process of resin-molding the valve body between an outer mold and an inner mold provided inside the outer mold; and a mold moving process of moving the inner mold to the inside of the valve body after the resin molding process.

[C26]

The manufacturing method of the valve according to [C25], wherein the inner mold has a convex surface corresponding to the shape of the inner peripheral wall of the valve body, and a projection height of the convex surface is set to be smaller than a movable distance of the inner mold in the mold moving process.

[C27]

The valve device according to [C04], wherein in the valve body, when all the seal openings are covered with the outer peripheral wall of the valve body and in a closed status, the distance between the inner peripheral wall and the outer peripheral wall is the same within a range corresponding to at least the seal opening in the rotational axis direction and the circumferential direction.

[C28]

The valve device according to [C07], wherein the first regulation convex member is formed in a position away from the second regulation convex member.

[C29]

The valve device according to [C07], wherein the distance between the first regulation convex member and the rotational axis is the same as the distance between the second regulation convex member and the rotational axis.

[C30]

The valve device according to [C09], wherein the valve body opening rib is formed in an arc shape with a predetermined distance from the virtual spherical surface.

[C31]

The valve device according to [C12], wherein the specific shape part is formed such that the outer wall projects outward from the outer peripheral wall of the cylindrical member.

[C32]
The valve device according to [C12], wherein the specific shape part is formed such that the outer wall is dented inward from the outer peripheral wall of the cylindrical member.

[C33]
The valve device according to [C12], wherein in the specific shape part, the outer wall is formed in a planar shape.

[C34]
The valve device according to [C17] further comprising a driving part which is capable of rotate-driving the valve body via one end of the shaft, wherein the valve is provided such that the second outermost end surface faces the driving part side, and the area of the second outermost end surface is larger than the area of the first outermost end surface.

[C35]
The valve device according to [C19], wherein the first end surface opening rib and the second end surface opening rib, and the second valve body opening rib and the third valve body opening rib are formed in the same position in the circumferential direction of the valve body.

[C36]
The manufacturing method of the valve according to any one of [C22] to [C24], wherein the first mold has a first outer mold in which a first concave surface corresponding to the shape of the outer peripheral wall of the first split body is formed, and a first inner mold in which a first convex surface corresponding to the shape of the inner peripheral wall of the first split body is formed, the second mold has a second outer mold in which a second concave surface corresponding to the shape of the outer peripheral wall of the second split body is formed, and a second inner mold in which a second convex surface corresponding to the shape of the inner peripheral wall of the second split body is formed, and in the primary molding process, when the first split body and the second split body are resin-molded, the distance between the first concave surface and the first convex surface, and the distance between the second concave surface and the second convex surface are the same within a range of at least a part of the rotational axis direction and the circumferential direction.

[C37]
The manufacturing method of the valve according to [C25] or [C26], wherein the outer mold has a concave surface corresponding to the shape of the outer peripheral wall of the valve body, the inner mold has a convex surface corresponding to the shape of the inner peripheral wall of the valve body, and in the resin molding process, when the valve body is resin-molded, the distance between the concave surface and the convex surface is the same within a range of at least a part of the rotational axis direction and the circumferential direction.

[D01]
A valve device configured to control cooling water in a heating element of a vehicle, comprising:

a housing having a housing main body defining an inner space therein, a mounting surface which is formed on an outer wall of the housing main body so as to be opposed to the heating element in a status where it is attached to the heating element, and the port which connects the inner space to the outside of the housing main body;

a valve having a valve body which is rotational about a rotational axis in the inner space, a valve body flow path which is formed inside the valve body, a valve body opening which connects the valve body flow path to the outside of the valve body, and a shaft provided on the rotational axis, the valve being configured to change a communication status between the valve body flow path and the port via the valve body opening with a rotational position of the valve body;

a partition part which is provided so as to partition the inner space from the outside of the housing main body and which has a shaft insertion hole formed such that one end of the shaft can be inserted through;

a driving part cover which is provided on the opposite side to the inner space with respect to the partition part, and which forms driving part space between the driving part cover and the partition part; and a driving part which is provided in the driving part space and which is capable of rotate-driving the valve body via the one end of the shaft, wherein the driving part cover has a cover main body which forms the driving part space, and a cover fixing part which is formed at an outer edge of the cover main body and is fixed to the housing main body, and the cover fixing part is formed so as not to project outward from at least one of both ends of the housing main body in a direction vertical to the mounting surface of the housing main body.

[D02]
The valve device according to [D01], wherein an end of the housing main body on the opposite side to the mounting surface is formed so as not to project outward from an end of the cover main body on the opposite side to the mounting surface.

[D03]
The valve device according to [D01] or [D02], wherein the driving part cover has a connector which is formed at an outer edge of the cover main body and which has a terminal electrically connected to the outside, and the connector is formed so as not to project outward from at least one of both ends of the cover main body in a direction vertical to the mounting surface.

[D04]
The valve device according to [D01], wherein multiple cover fixing parts are formed, and the multiple cover fixing parts are positioned on a virtual plane vertical to the mounting surface.

[D05]
The valve device according to [D02], wherein the partition part is formed separately from the housing main body, and the housing main body has a notch to expose the partition part at the end on the opposite side to the mounting surface.

[D06]
The valve device according to [D03], wherein the connector is formed so as to project from the outer edge of the cover main body in other direction than the direction vertical to the mounting surface.

[D07]
The valve device according to [D03], wherein the connector is formed so as to project from the outer edge of the cover main body in a direction parallel to the mounting surface.

[E01]
A valve device configured to control cooling water in a heating element of a vehicle, comprising:

a housing having a housing main body defining an inner space therein, a housing-side fixing part which is formed integrally with the housing main body, a housing-side fastening hole which is formed in the housing-side fixing part, and a port which connects the inner space to the outside of the housing main body;

a valve having a valve body which is rotational about a rotational axis in the inner space, a valve body flow path which is formed inside the valve body, and a valve body opening which connects the valve body flow path to the outside of the valve body, the valve being configured to change a communication status between the valve body flow path and the port via the valve body opening with a rotational position of the valve body;

a pipe member having a cylindrical pipe inner space of which communicates with the port, a pipe-side fixing part which is formed integrally with the pipe and fixed to the housing-side fixing part, and a pipe-side fastening hole formed in the pipe-side fixing part; and a pipe fastening member which is passed through the pipe-side fastening hole to be screwed into the housing-side fastening hole, to fix the pipe-side fixing part to the housing-side fixing part, wherein the housing-side fixing part forms a gap between the housing-side fixing part and an outer wall of the housing main body.

[E02]

The valve device according to [E01], wherein the housing has multiple ports, the pipe member has multiple pipes connected to each other, and the valve device comprises multiple seal units which are respectively provided in the multiple pipes and are configured to seal fluid-tightly between the seal units and the outer peripheral wall of the valve body.

[E03]

The valve device according to [E02] comprising a gasket which is provided between the pipe member and the housing main body on the radially outside of the respective plurality of pipes, and is configured to seal fluid-tightly between the pipe member and the housing main body.

[E04]

The valve device according to any one of [E01] to [E03], wherein the housing has multiple housing-side fastening holes, and the port is formed such that the center of the port is positioned on a straight line which connects two housing-side fastening holes of the multiple housing-side fastening holes or inside a triangle formed by connecting three housing fastening holes.

[E05]

The valve device according to any one of [E01] to [E04], wherein the housing has a pipe mounting surface which is formed on the outer wall of the housing main body so as to be opposed to the pipe member in a status where the pipe member is attached to the housing main body, the port includes three outlet ports which are opened in the pipe mounting surface, and one relief port, the valve device further comprises a relief valve which is provided in the relief port and which allows or blocks communication between the inner space and the outside of the housing main body via the relief port in accordance with condition, at least two of the three outlet ports are formed such that the center of the respective openings is positioned on a port array straight line as one straight line on the pipe mounting surface, and the relief port is formed such that the center of the opening is positioned at a position away from the port array straight line.

[E06]

The valve device according to [E05], wherein, when viewed along the direction of the port array straight line, at least two of the three outlet ports and the relief port are formed to be partially overlapped with each other.

[E07]

The valve device according to [E05] or [E06], wherein the relief port is formed such that the center of the opening is positioned on a relief array straight line that is a straight line on the pipe mounting surface parallel to the port array straight line, and when viewed along the direction of the port array straight line, a part of at least two of the three outlet ports on the relief array straight line side with respect to the port array straight line, and a part of the relief port on the port array straight line side with respect to the relief array straight line are formed so as to be partially overlapped with each other.

[E08]

The valve device according to any one of [E05] to [E07], wherein the housing has multiple housing-side fastening holes, at least two of the multiple housing-side fastening holes are formed on a fastening hole array straight line that is a straight line positioned on the relief port side with respect to the port array straight line, and the relief port is formed so as to be overlapped with a part of the fastening hole array straight line.

[E09]

The valve device according to any one of [E01] to [E08], wherein the pipe has a pipe main body, and a pipe end which is formed on the opposite side to the port of the pipe main body, the inner diameter of which is larger than the inner diameter of the pipe main body, and the outer diameter of which is larger than the outer diameter of the pipe main body.

[E10]

The valve device according to any one of [E01] to [E09], wherein the pipe has the pipe main body and a pipe projection which projects outward from the outer wall of the pipe main body.

[E11]

The valve device according to [E10], wherein the housing has a mounting surface which is formed on an outer wall of the housing main body so as to be opposed to the heating element in a status where the housing is attached to the heating element, and the pipe projection is formed on a virtual plane parallel to the mounting surface.

[E12]

The valve device according to any one of [E01] to [E11], wherein the pipe member has multiple pipes, and a pipe connection part which connects parts of the multiple pipes on the housing main body side.

[E13]

The valve device according to any one of [E01] to [E12], wherein the housing has a housing opening which connects the inner space and the outside of the housing main body, and a cylindrical housing inner wall in which one end is connected to the housing opening to form the inner space, the valve has a shaft provided on the rotational axis, the valve device further comprises a partition part having a partition part main body which is provided in the housing opening so as to partition the inner space from the outside of the housing main body, and a shaft insertion hole which is formed in the partition part main body such that one end of the shaft can be inserted through, and the inner diameter of the housing opening is larger than the inner diameter of the end of the housing inner wall on the opposite side to the housing opening.

[E14]
The valve device according to [E13], wherein the housing inner wall is formed in a tapered shape such that the inner diameter becomes smaller from the housing opening side toward the opposite side to the housing opening.

[E15]
The valve device according to any one of [E01] to [E14], wherein the housing has multiple ports, and a mounting surface which is formed on the outer wall of the housing main body so as to be opposed to the heating element in a status where the housing is attached to the heating element, and
at least two of the multiple ports are formed so as to be arrayed in a direction parallel to the mounting surface.

[E16]
The valve device according to any one of [E01] to [E15], wherein the pipe fastening member is a tapping screw which can be screwed, while tapping is performed, into the housing-side fastening hole.

[E17]
The valve device according to [E2], wherein at least ports, provided with the seal unit, of the multiple ports, are formed such that the axes are parallel to each other.

[E18]
The valve device according to [E13] comprising a ring seal member which is provided between the housing opening and the partition part, and is configured to seal fluid-tightly between the housing opening and the partition part.

[F01]
A valve device configured to control cooling water in a heating element of a vehicle, comprising:
a housing having a housing main body defining an inner space therein, a port which connects the inner space to the outside of the housing main body, and a housing opening which connects the inner space to the outside of the housing main body;
a valve having a valve body which is rotational about a rotational axis in the inner space, a valve body flow path which is formed inside the valve body, a valve body opening which connects the valve body flow path to the outside of the valve body, and a shaft provided on the rotational axis, the valve being configured to change a communication status between the valve body flow path and the port via the valve body opening with a rotational position of the valve body;
a partition part having a partition part main body which is provided in the housing opening so as to partition the inner space from the outside of the housing main body, and a shaft insertion hole which is formed in the partition part main body such that one end of the shaft can be inserted through; and
a driving part which is provided on the opposite side to the inner space with respect to the partition part, and which is capable of rotate-driving the valve body via one end of the shaft,
wherein the partition part has a partition through hole which extends outward from the shaft insertion hole and which is opened in the outer wall of the partition part main body.

[F02]
The valve device according to [F01], wherein the housing has a housing through hole which extends outward from the inner wall of the housing opening, and is opened in an outer wall of the housing main body, and which is formed to be communicable with the partition through hole.

[F03]
The valve device according to [F02] further comprising:
a first seal member which is provided on the inner space side with respect to the partition through hole, and which is configured to seal fluid-tightly between the shaft and the shaft insertion hole; and
a second seal member which is provided on the inner space side with respect to the housing through hole, and which is configured to seal fluid-tightly between the partition part main body and the inner wall of the housing opening.

[F04]
The valve device according to [F03], wherein a distance between the first seal member and the partition through hole is shorter than a distance between the second seal member and the housing through hole.

[F05]
The valve device according to [F03] or [F04], wherein the partition part has a partition inner step surface which forms a step between the partition through hole of the shaft insertion hole and the first seal member, and
the housing has a housing step surface which forms a step between the housing through hole in the inner wall of the housing opening and the second seal member.

[F06]
The valve device according to [F05], wherein the housing step surface is formed in a tapered shape such that the inner diameter becomes larger from the inner space side toward the driving part side.

[F07]
The valve device according to any one of [F02] to [F06], wherein the housing has a mounting surface which is formed on the outer wall of the housing main body so as to be opposed to the heating element in a status where the housing is attached to the heating element, and the housing through hole is opened in the mounting surface.

[F08]
The valve device according to any one of [F02] to [F07], wherein in a status where the housing is attached to the heating element, the partition through hole is positioned on the lower side in the vertical direction to the shaft.

[F09]
The valve device according to any one of [F02] to [F08], wherein in a status where the housing is attached to the heating element, the housing through hole is positioned on the lower side in the vertical direction to the shaft.

[F10]
The valve device according to any one of [F02] to [F09], wherein the partition through hole and the housing through hole have cross-sectional areas different from each other.

[F11]
The valve device according to any one of [F02] to [F10], wherein the partition through hole and the housing through hole have axial positions different from each other in the axial direction of the shaft insertion hole.

[F12]
The valve device according to [F11], wherein the partition part has a partition outer step surface which forms a step between the partition through hole in the outer wall of the partition part main body and the housing through hole.

[F13]
The valve device according to any one of [F02] to [F12] further comprising a bearing which is provided on the driving part side with respect to the partition through hole of the shaft insertion hole, and which bearing-supports one end of the shaft.

[F14]

The valve device according to [F13], wherein the shaft insertion hole has a small diameter part accommodating the bearing therein, a large diameter part which has an inner diameter larger than the small diameter part and in which the partition through hole is opened, and an insertion-hole step surface which is formed between the small diameter part and the large diameter part.

[F15]

The valve device according to any one of [F02] to [F14], wherein the partition part has a partition through hole step surface which forms a step between one end and the other end in the partition through hole.

[F16]

The valve device according to any one of [F02] to [F15], wherein the partition through hole and the housing through hole are formed such that the respective axes are not orthogonal to the axis of the shaft insertion hole.

[F17]

The valve device according to any one of [F01] to [F16], wherein the partition through hole is formed such that the cross-sectional area becomes gradually increased from the radially inside toward the radially outside in the shaft insertion hole.

[F18]

The valve device according to [F01], wherein the partition through hole is formed such that the cross-sectional shape is an elliptical or rectangular shape.

[F19]

The valve device according to [F02], wherein the housing through hole is formed such that the cross-sectional shape is an elliptical or rectangular shape.

[F20]

The valve device according to [F02], wherein the partition through hole and the housing through hole are coaxially formed with each other.

[F21]

The valve device according to [F11], wherein, assuming that a distance between the axis of the partition through hole and the axis of the housing through hole is L, and a size of the housing through hole in the axial direction of the shaft insertion hole is D, the partition through hole and the housing through hole are formed so as to satisfy the relationship $D \leq L \leq 10D$.

[F22]

The valve device according to any one of [F01] to [F16], wherein the partition through hole is formed such that the cross-sectional area is gradually increased from the radially outside toward the radially inside in the shaft insertion hole.

The present disclosure has been described based on the embodiments. However, the present disclosure is not limited to the embodiments and the structures. The present disclosure includes various modifications and further includes modifications within the range of equivalency. Further, various combinations and forms, further, other combinations and forms including only one element or more, or less of them, are also included in the category and range of idea of the present disclosure.

The invention claimed is:

1. A valve device configured to control cooling water in a heating element of a vehicle, comprising:
    a housing including a housing main body defining an inner space therein, a housing-side fixing part formed integrally with the housing main body, a housing-side fastening hole formed in the housing-side fixing part, and a port connecting the inner space to an outside of the housing main body;
    a valve including a valve body rotational about a rotational axis in the inner space, a valve body flow path inside the valve body, and a valve body opening connecting the valve body flow path to an outside of the valve body, the valve configured to change a communication status between the valve body flow path and the port via the valve body opening with a rotational position of the valve body;
    a pipe member including a cylindrical pipe having an inner space that communicates with the port, a pipe-side fixing part formed integrally with the pipe and fixed to the housing-side fixing part, and a pipe-side fastening hole formed in the pipe-side fixing part; and
    a pipe fastening member passed through the pipe-side fastening hole and screwed in the housing-side fastening hole to fix the pipe-side fixing part to the housing-side fixing part, wherein
    the housing-side fixing part defines a housing gap between the housing-side fixing part and an outer wall of the housing main body,
    the housing has a pipe mounting surface on the outer wall of the housing main body,
    the pipe mounting surface is opposed to the pipe member when the pipe member is attached to the housing main body, and
    the housing gap is formed between the housing-side fixing part and the pipe mounting surface.

2. The valve device according to claim 1, wherein
    the housing has a plurality of the ports,
    the pipe member includes a plurality of the pipes connected to each other, and
    the valve device further comprising:
    a plurality of seal units provided to the pipes and configured to fluid-tightly seal an outer peripheral wall of the valve body.

3. The valve device according to claim 2 further comprising:
    a gasket provided between the pipe member and the housing main body on a radially outside of the pipes and configured to seal fluid-tightly between the pipe member and the housing main body.

4. The valve device according to claim 1, wherein
    the housing has a plurality of the housing-side fastening holes, and
    a center of the port is positioned on a straight line that connects two of the plurality of housing-side fastening holes or is positioned inside a triangle formed by connecting three of the housing-side fastening holes.

5. The valve device according to claim 1, wherein
    the port includes three outlet ports, which are opened in the pipe mounting surface, and one relief port,
    the valve device further comprising:
    a relief valve provided to the relief port and configured to allow and to block communication between the inner space of the housing main body and the outside of the housing main body via the relief port in accordance with a condition,
    at least two of the three outlet ports are formed such that centers of those openings are positioned on a port array straight line that is one straight line on the pipe mounting surface, and
    the relief port is formed such that a center of its opening is positioned at a position away from the port array straight line.

6. The valve device according to claim 5, wherein,
when viewed along a direction of the port array straight line, at least two of the three outlet ports and the relief port are partially overlapped with each other.

7. The valve device according to claim 5, wherein
the relief port is formed such that a center of its opening is positioned on a relief array straight line that is a straight line on the pipe mounting surface and is parallel to the port array straight line, and
when viewed along a direction of the port array straight line, parts of at least two of the three outlet ports, which are closer to the relief array straight line than the port array straight line, and a part of the relief port closer to the port array straight line than the relief array straight line are partially overlapped with each other.

8. The valve device according to claim 1, wherein
the housing has a plurality of the housing-side fastening holes,
at least two of the plurality of housing-side fastening holes are on a fastening hole array straight line that is a straight line positioned on a side of a relief port with respect to the port array straight line, and
the relief port is overlapped with a part of the fastening hole array straight line.

9. The valve device according to claim 1, wherein
the pipe has a pipe main body and a pipe end on an opposite side of a port of the pipe main body, and
the pipe end has an inner diameter larger than an inner diameter of the pipe main body and has an outer diameter larger than an outer diameter of the pipe main body.

10. The valve device according to claim 1, wherein
the pipe has a pipe main body and a pipe projection, and
the pipe projection projects outward from an outer wall of the pipe main body.

11. The valve device according to claim 10, wherein
the housing has a mounting surface on an outer wall of the housing main body,
the mounting surface is configured to be opposed to the heating element in a status where the housing is attached to the heating element, and
the pipe projection is on a virtual plane that is parallel to the mounting surface.

12. The valve device according to claim 1, wherein
the pipe member includes a plurality of the pipes and a pipe connection part, and
the pipe connection part connects parts of the plurality of pipes on a side of the housing main body.

13. The valve device according to claim 1, wherein
the housing has a housing opening, which connects the inner space of the housing main body with the outside of the housing main body, and a cylindrical housing inner wall having one end connected to the housing opening and defining the inner space,
the valve has a shaft on the rotational axis,
the valve device further comprises:
a partition part having a partition part main body, which is in the housing opening and partitions the inner space from the outside of the housing main body, and a shaft insertion hole which is defined in the partition part main body and enables insertion of one end of the shaft therethrough, and
an inner diameter of the housing opening is larger than an inner diameter of an end of the housing inner wall on an opposite side of the housing opening.

14. The valve device according to claim 13, wherein the housing inner wall is in a tapered shape such that the inner diameter becomes smaller from the housing opening toward an opposite side of the housing opening.

15. The valve device according to claim 1, wherein
the housing has a plurality of the ports and a mounting surface,
the mounting surface is on the outer wall of the housing main body and is configured to be opposed to the heating element in a status where the housing is attached to the heating element, and
at least two of the plurality of ports are arrayed in a direction parallel to the mounting surface.

16. The valve device according to claim 1, wherein the pipe fastening member is a tapping screw configured to be screwed into the housing-side fastening hole while performing tapping on the housing-side fastening hole.

17. The valve device according to claim 1, wherein
the housing-side fixing part includes an extending portion that extends along the outer wall of the housing main body.

18. The valve device according to claim 17, wherein
the extending portion extends in a direction toward the pipe member.

19. The valve device according to claim 1, wherein
the housing-side fixing part is connected with the housing main body at an end portion on a side of the housing main body via a housing connection part, and
the housing gap is formed among a lateral surface of the extending portion of the housing-side fixing part, an end surface of the housing connection part on a side of the pipe member, and the outer wall of the housing main body that extends from the pipe mounting surface toward the housing main body.

20. The valve device according to claim 1, wherein
an end surface of the housing-side fixing part on a side of the pipe member is located at a same plane as the pipe mounting surface, and
the end surface of the housing-side fixing part on the side of the pipe member and the pipe mounting surface define the housing gap therebetween.

21. The valve device according to claim 1, wherein
an end portion of the housing-side fastening hole on a side of the housing main body is located closer to the pipe member than a housing connection part.

22. The valve device according to claim 1, wherein
the housing-side fixing part is connected with the housing main body at an end portion on a side of the housing main body via a housing connection part, and
an end portion of the housing-side fastening hole on a side of the housing main body is located closer to the pipe member than the housing connection part.

* * * * *